(12) United States Patent
Doll et al.

(10) Patent No.: US 11,115,757 B2
(45) Date of Patent: Sep. 7, 2021

(54) OPTICAL MANDREL, OPTICAL-FIBER ASSEMBLY INCLUDING AN OPTICAL MANDREL, AND SYSTEM FOR DETECTING AN ACOUSTIC SIGNAL INCIDENT ON AN OPTICAL-FIBER ASSEMBLY

(71) Applicant: Adelos, Inc., Polson, MT (US)

(72) Inventors: Stephen Timothy Doll, Big Arm, MT (US); Peter S. Lovely, Portland, OR (US); James Alexander Philip, Missoula, MT (US); John R. Providenza, Beaverton, OR (US); Timothy N. Roberts, Tigard, OR (US); Leon J. Stevens, Polson, MT (US); Philip J. Stimac, Montpelier, VT (US)

(73) Assignee: Adelos, Inc., Polson, MT (US)

( * ) Notice: Subject to any disclaimer, the term of this patent is extended or adjusted under 35 U.S.C. 154(b) by 0 days.

(21) Appl. No.: 16/563,578

(22) Filed: Sep. 6, 2019

(65) Prior Publication Data
US 2020/0092661 A1    Mar. 19, 2020

Related U.S. Application Data

(60) Provisional application No. 62/728,031, filed on Sep. 6, 2018.

(51) Int. Cl.
*H04R 29/00* (2006.01)
*H04R 23/00* (2006.01)
*G01H 9/00* (2006.01)

(52) U.S. Cl.
CPC ........... *H04R 23/008* (2013.01); *G01H 9/006* (2013.01)

(58) Field of Classification Search
CPC ....... H04R 23/008; G01H 9/004; G01H 9/006
See application file for complete search history.

(56) References Cited

U.S. PATENT DOCUMENTS

| 5,155,548 A | 10/1992 | Danver et al. |
| 6,072,921 A * | 6/2000 | Frederick ............... G01H 9/004 367/140 |

(Continued)

FOREIGN PATENT DOCUMENTS

| CN | 106772562 B | 8/2018 |
| EP | 1096272 A2 | 5/2001 |

(Continued)

OTHER PUBLICATIONS

"Fiber Couplers", RP Photonics Encyclopedia, pp. 13, www.rp-photonics.com/fiber_couplers.html.

(Continued)

*Primary Examiner* — Ryan Robinson
(74) *Attorney, Agent, or Firm* — Fogg & Powers LLC

(57) ABSTRACT

An embodiment of a system includes a light source, an optical assembly, and an electronic circuit. The light source (e.g., a laser) is configured to generate a source optical signal. The optical assembly is configured to direct the source optical signal into an end of an optical-fiber assembly that includes an optical fiber having a section wrapped multiple turns around a mandrel and including mandrel zones, and to receive, from the end of the optical-fiber assembly, a return optical signal. The electronic circuit is configured to select at least one mandrel zone in response to a component of the return optical signal from the at least one mandrel zone, and to detect an acoustic signal incident on the mandrel in response to the component of the return optical signal.

32 Claims, 21 Drawing Sheets

(56) References Cited

U.S. PATENT DOCUMENTS

| | | | |
|---|---|---|---|
| 6,525,992 | B1 | 2/2003 | Olivier et al. |
| 6,785,004 | B2 * | 8/2004 | Kersey ............... G01D 5/35383 356/478 |
| 7,028,543 | B2 * | 4/2006 | Hardage ................ E21B 47/00 73/152.01 |
| 8,000,609 | B2 * | 8/2011 | Healey ................ H04B 10/548 398/141 |
| 8,983,287 | B2 * | 3/2015 | Goldner ............... H04R 23/008 398/25 |
| 9,766,141 | B2 | 9/2017 | Preston et al. |
| 9,772,238 | B2 | 9/2017 | Preston et al. |
| 10,650,648 | B2 * | 5/2020 | Englund .............. H04R 23/008 |
| 2002/0064330 | A1 | 5/2002 | Croteau et al. |
| 2004/0202401 | A1 | 10/2004 | Berg et al. |
| 2005/0174887 | A1 | 8/2005 | Nash et al. |
| 2006/0066839 | A1 | 3/2006 | Payton |
| 2008/0066960 | A1 | 3/2008 | Mathiszik et al. |
| 2010/0067018 | A1 | 3/2010 | Crickmore et al. |
| 2017/0023385 | A1 | 1/2017 | Andersen et al. |
| 2017/0238101 | A1 * | 8/2017 | Spiegelberg ........... H04R 1/406 381/92 |
| 2017/0284895 | A9 | 10/2017 | Preston et al. |

FOREIGN PATENT DOCUMENTS

| | | |
|---|---|---|
| WO | 2015127109 A1 | 8/2015 |
| WO | 2016033192 A1 | 6/2016 |

OTHER PUBLICATIONS

"Frequency Modulation", Fiber Optics.Info, pp. 1-2, http://www.fiber-optics.info/articles/frequency_modulation_fm.

Hughes et al., "Static pressure sensitivity amplification in interferometric fiber-optic hydrophones", Applied Optics, Jan. 1, 1980, pp. 98-107, vol. 19, No. 1.

International Searching Authority, "Invitation to Pay Additional Fees from PCT Application No. PCT/US2019/050072", from Foreign Counterpart to U.S. Appl. No. 16/563,578, dated Dec. 17, 2019, pp. 1-19, Published: WO.

Maughan et al., "Novel distributed fibre sensor using microwave heterodyne detection of spontaneous Brillouin backscatter", Fourteenth International Conference on Optical Fiber Sensors, 2000, pp. 1-5, vol. 4185, SPIE.

Liokumovich et al., "Fundamentals of optical fiber sensing schemes based on coherent optical time domain reflectometry: Signal model under static fiber conditions", Journal of Lightwave Technology, 2015, pp. 1-11, vol. 33, Issue 17.

International Searching Authority, "International Search Report and Written Opinion from PCT Application No. PCT/US2019/050072", from Foreign Counterpart to U.S. Appl. No. 16/563,578, dated Mar. 20, 2020, pp. 1-27, Published: WO.

* cited by examiner

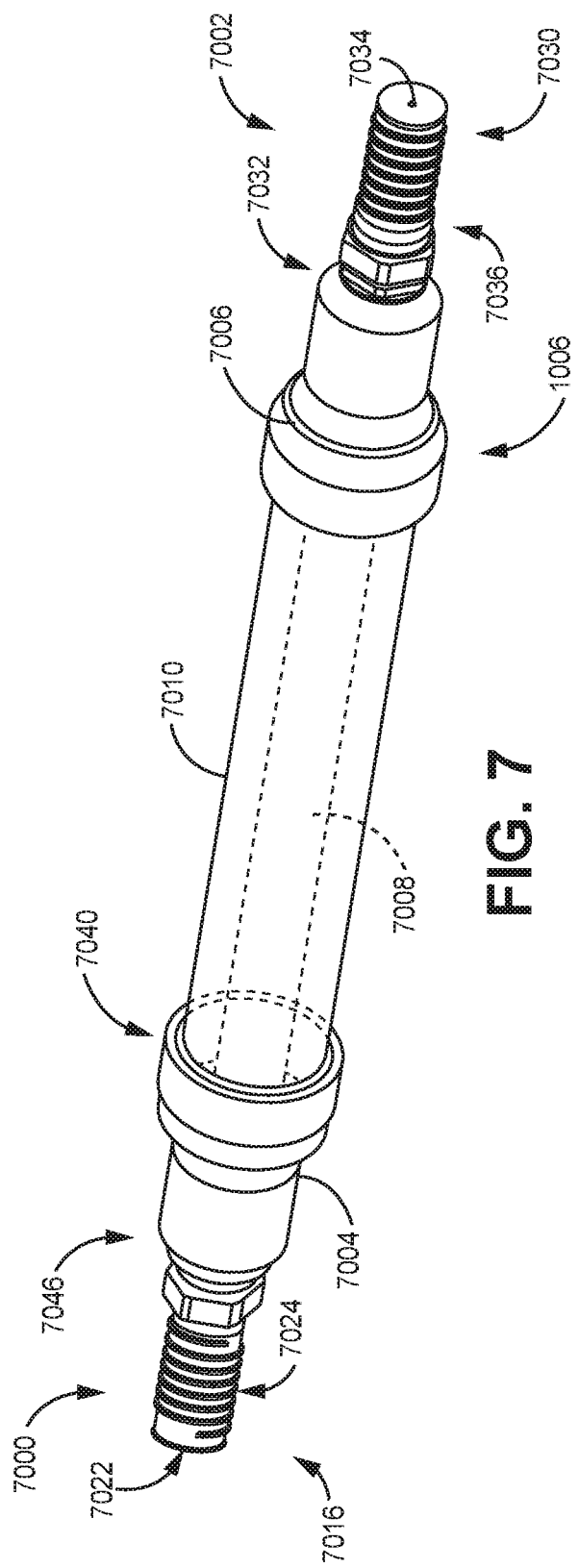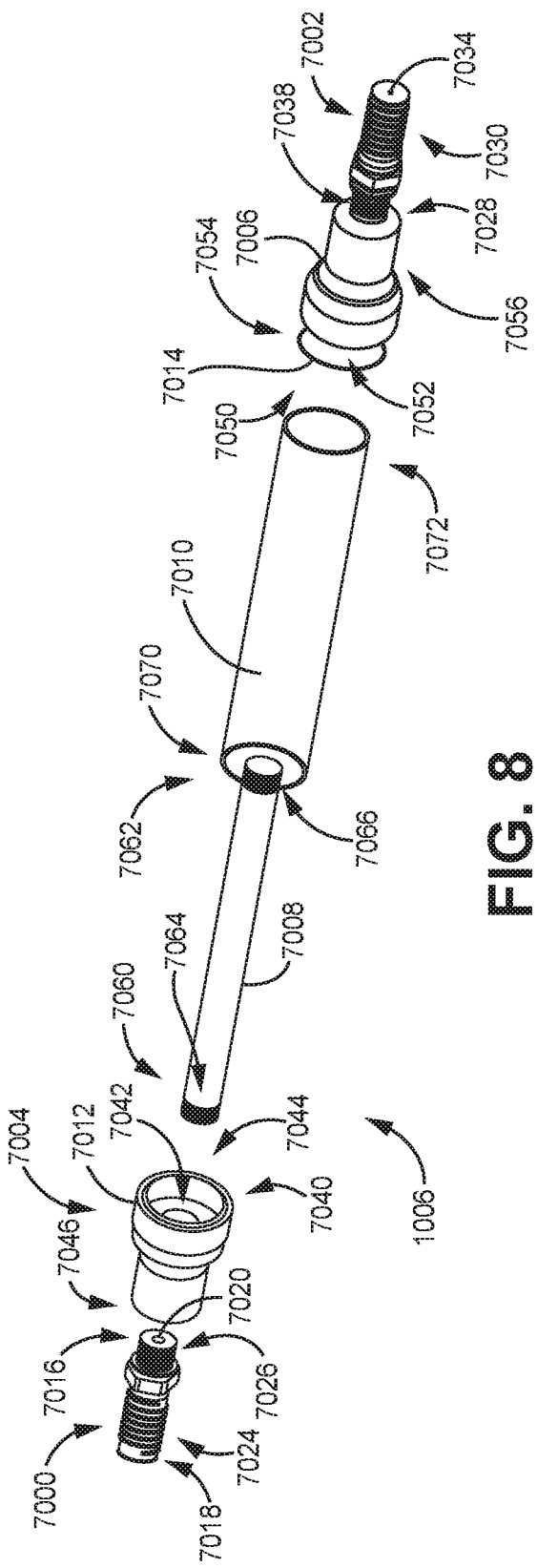

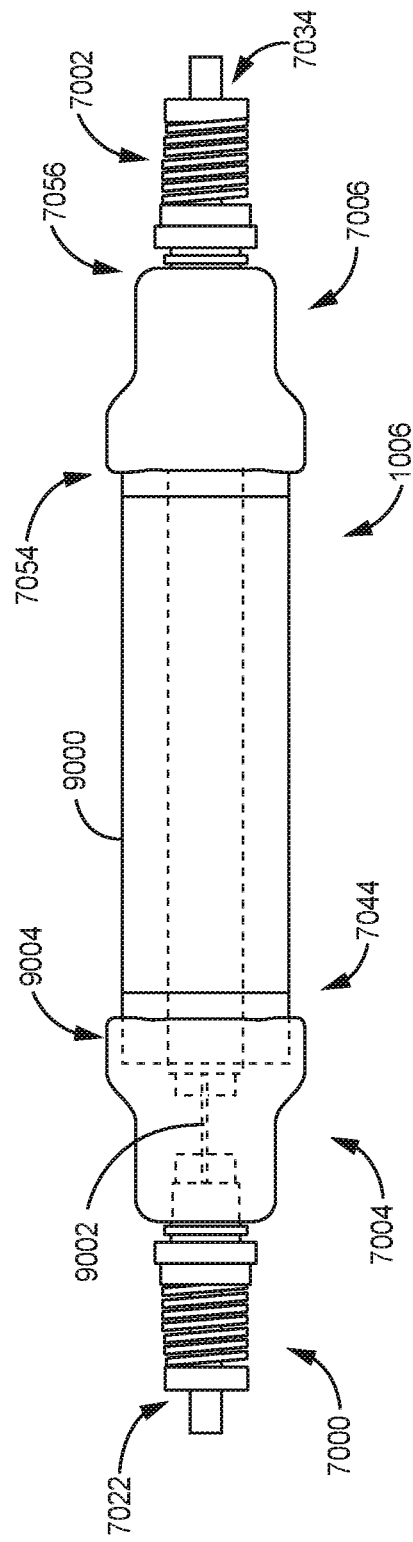
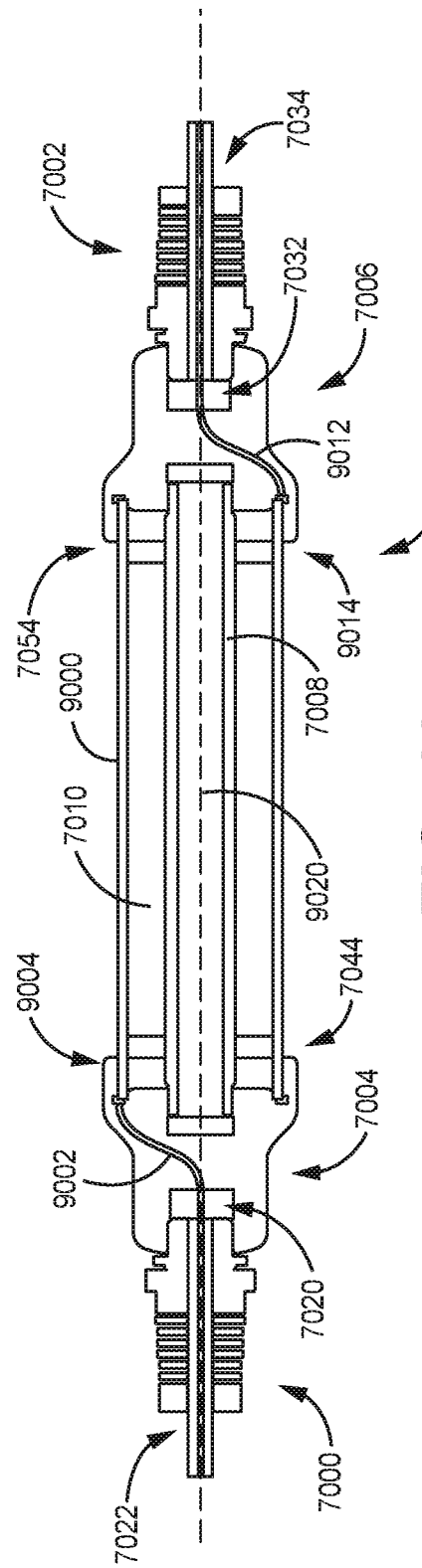
FIG. 9
FIG. 10

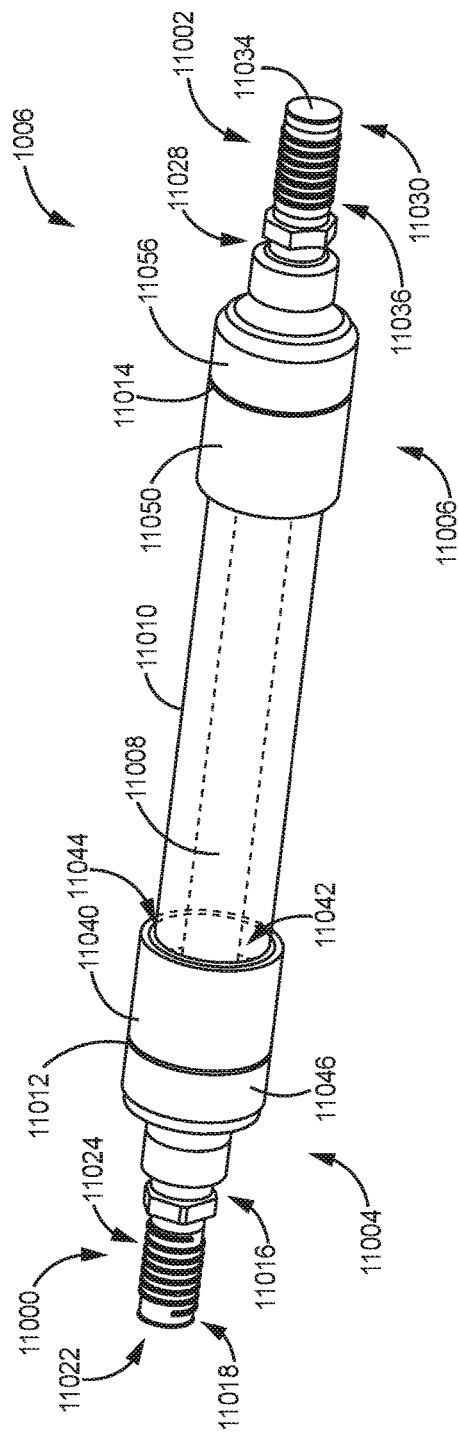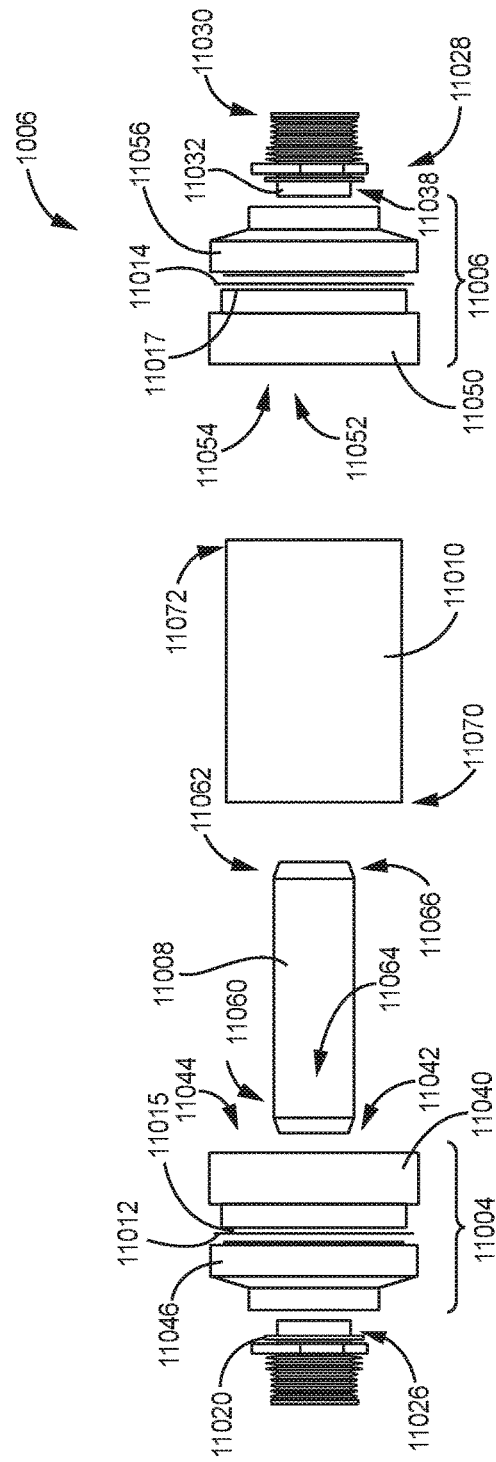
FIG. 11
FIG. 12

OPTICAL MANDREL, OPTICAL-FIBER ASSEMBLY INCLUDING AN OPTICAL MANDREL, AND SYSTEM FOR DETECTING AN ACOUSTIC SIGNAL INCIDENT ON AN OPTICAL-FIBER ASSEMBLY

PRIORITY

This patent application claims priority to U.S. Provisional Application Ser. No. 62/728,031, which was filed 6 Sep. 2018, which is titled OPTICAL MANDREL, AND FIBER-OPTIC-SENSING SYSTEM THAT INCLUDES THE MANDREL, and which is incorporated by reference.

SUMMARY

This disclosure applies to a class of optical-fiber sensors that launch light into one end of an optical-fiber assembly and use the light reflected or scattered back from different locations or zones in the fiber to detect a disturbance and to determine where along the fiber the disturbance occurs. A system is configured for sensing an acoustic signal incident on an optical-fiber assembly. For example, if the system is ground based, then the acoustic signal may be generated by a vibration caused by a walking human or animal or by a moving vehicle.

Applications for such a system include providing perimeter security for a ground-based location such as a nuclear power plant, monitoring oil, natural gas, and other types of wells, and detecting and localizing unauthorized crossings of a land border between two or more jurisdictions.

To improve the ability of such a system to sense an acoustic signal, an optical-fiber assembly may include, in addition to an optical fiber, optical mandrels spaced apart along the optical fiber. The optical mandrels may be "in line" with the optical fiber, meaning that the optical fiber passes through, and is wound about a form of, each mandrel.

Each mandrel is configured to amplify an acoustic signal incident on the mandrel as compared to an acoustic signal incident on a linear span (e.g., a span not located on a mandrel) of the optical fiber. For example, a mandrel may include a coating or covering, such as shrink wrap, which increases the acoustic gain of the mandrel.

In further detail, a mandrel acts as a microphone with sensitivity that is much higher than a typical zone (e.g., a one-meter long zone) of a linear span, or segment, of fiber. An acoustic disturbance can distort a fiber segment directly, causing optical phase shifts, but the distortion is relatively small because the fiber is very stiff, so the resulting phase shifts are relatively small. A mandrel can be made of a material that is much more compliant than a glass optical fiber, so that an acoustic disturbance will distort the mandrel much more than it will distort a segment of fiber; and the mandrel can impart this higher distortion to a thin fiber because the fiber, being only part of the mandrel, does not completely dominate the stiffness of the mandrel assembly. Effectively, the mandrel amplifies the distortion imparted to the fiber by an acoustic disturbance. Furthermore, for acoustic frequencies low enough so that the wavelength of sound in the surrounding medium is considerably longer than the mandrel's dimensions, all of the fiber wrapped around the mandrel will experience approximately the same compression or extension simultaneously. For this reason, the phase changes across the individual mandrel zones (the zones along the segment of fiber wrapped around the mandrel) in the fiber add coherently, creating a large phase change across the entire length of the fiber wound about the mandrel.

As described below, embodiments of a mandrel include one or more features that improve the mandrel as compared to a conventional mandrel.

For example, the mandrel can include an optical-fiber path that transitions an optical fiber from a linear span to a wound span gradually enough so that any bend along the optical-fiber path does not cause the optical-fiber to exhibit an undesirable characteristic in the region of the bend.

Furthermore, the span of the optical fiber wound around the mandrel can include one or more reflectors to increase the signal-to-noise ratio (SNR), and the overall optical power, of an optical signal that a respective one or more zones of the wound optical-fiber span redirect back to signal-analysis circuitry.

In addition, the mandrel can be configured to allow an optical-fiber support member to pass though the mandrel, thus eliminating the need to cut or remove the support member.

Also as described below, embodiments of the system include one or more features that improve the system as compared to a conventional system for sensing an acoustic signal incident on an optical fiber.

For example, the system can be configured to select the "best" optical-fiber zones along a mandrel for detecting an incident acoustic signal. Further in example, the system can be configured to select the best zones as the zones redirecting signals having the lowest noise components or the highest optical powers. Still further in example, the system can be configured to select the two best zones near the respective ends of the mandrel, and to determine whether an acoustic signal is incident on the mandrel in response to respective components of a return optical signal redirected by the two selected zones. Alternatively, the system can be configured to select the best d zones near each of the respective ends of the mandrel, and to determine whether an acoustic signal is incident on the mandrel in response to the respective components of a return optical signal redirected by the 2·d selected zones.

An embodiment of a mandrel includes a connector and a form. The connector has first and second aligned openings and a third opening between the first and second openings. And the form is coupled to the connector at the third opening, has an outer surface, a cavity, an end, and fourth and fifth openings between the cavity and the outer surface, and is configured to receive an optical fiber that extends into the first opening of the connector, through the third opening of the connector, into the cavity at the end of the form, and through the fourth opening of the form, that forms one or more turns around the outer surface of the form, and that extends through the fifth opening of the form into the cavity, out from the cavity at the end, into the third opening of the connector, and out from the second opening of the connector.

Another embodiment of a mandrel includes an outer conduit, an inner conduit, and first and second end caps. The outer conduit has first and second ends, and the inner conduit is disposed inside of the outer conduit and has first and second ends. The first end cap has an outer end, an inner end coupled to the first end of the inner conduit and having a perimeter, and an optical-fiber path extending between the outer end and the perimeter, and the second end cap has an outer end, an inner end coupled to the second end of the inner conduit and having a perimeter, and an optical-fiber path extending between the outer end and the perimeter.

An embodiment of an optical-fiber assembly includes an optical fiber and at least one mandrel each including a respective outer conduit having first and second ends and about which a respective portion of the optical fiber is wound, a respective inner conduit disposed inside of the outer conduit and having first and second ends, a respective first end cap having an outer end, an inner end coupled to the first end of the inner conduit and having a perimeter, and an optical-fiber path extending between the outer end and the perimeter and within which a respective portion of the optical fiber is disposed, and a respective second end cap having an outer end, an inner end coupled to the second end of the inner conduit and having a perimeter, and an optical-fiber path extending between the outer end and the perimeter and within which a respective portion of the optical fiber is disposed.

An embodiment of a system includes an optical fiber having an end, at least one mandrel, and a signal detector. Each of the at least one mandrel includes a respective outer conduit having first and second ends and about which a respective portion of the optical fiber is wound, a respective inner conduit disposed inside of the outer conduit and having first and second ends, a respective first end cap having an outer end, an inner end coupled to the first end of the inner conduit and having a perimeter, and an optical-fiber path extending between the outer end and the perimeter and within which a respective portion of the optical fiber is disposed, and a respective second end cap having an outer end, an inner end coupled to the second end of the inner conduit and having a perimeter, and an optical-fiber path extending between the outer end and the perimeter and within which a respective portion of the optical fiber is disposed. And the signal detector is configured to direct a source optical beam into the end of the optical fiber, to receive a redirected optical beam from the end of the optical fiber, and to detect an acoustic signal incident on at least one of the at least one mandrel in response to the redirected optical beam.

Another embodiment of a system includes a light source, an optical assembly, and an electronic circuit. The light source is configured to generate a source optical signal. The optical assembly is configured to direct the source optical signal into an end of an optical-fiber assembly that includes an optical fiber having at least one section each wrapped multiple turns around a respective one of at least one mandrel and each including respective mandrel zones, and to receive, from the end of the optical-fiber assembly, a return optical signal. And the electronic circuit is configured to select a first mandrel zone of one of the at least one section of the optical fiber in response to a first component of the return optical signal redirected by the first mandrel zone, and to detect an acoustic signal incident on the one of the at least one mandrel around which the one of the at least one section of the optical fiber is wound in response to the first component of the return optical signal.

BRIEF DESCRIPTION OF THE DRAWINGS

FIG. 7 is an isometric view of an optical mandrel, according to another embodiment.

FIG. 8 is an exploded view of the optical mandrel of FIG. 7, according to an embodiment.

FIG. 9 is a side view of the optical mandrel of FIGS. 7-8 with optical fiber installed, according to an embodiment.

FIG. 10 is a cutaway side view of the optical mandrel of FIGS. 7-9, according to an embodiment.

FIG. 11 is an isometric view of an optical mandrel, according to yet another embodiment.

FIG. 12 is an exploded view of the optical mandrel of FIG. 11, according to an embodiment.

DETAILED DESCRIPTION

"Approximately," "substantially," and similar words, as used herein, indicate that a given quantity b can be within a range b±10% of b, or b±1 if |10% of b|<1. "Approximately," "substantially," and similar words, as used herein, also indicate that a range b-c can be from b-0.10(c-b) to c+0.10 (c-b). Regarding the planarity of a surface or other region, "approximately," "substantially," and similar words, as used herein, indicate that a difference in thickness between a highest point and a lowest point of the surface/region does not exceed 0.20 millimeters (mm).

Figure 1:
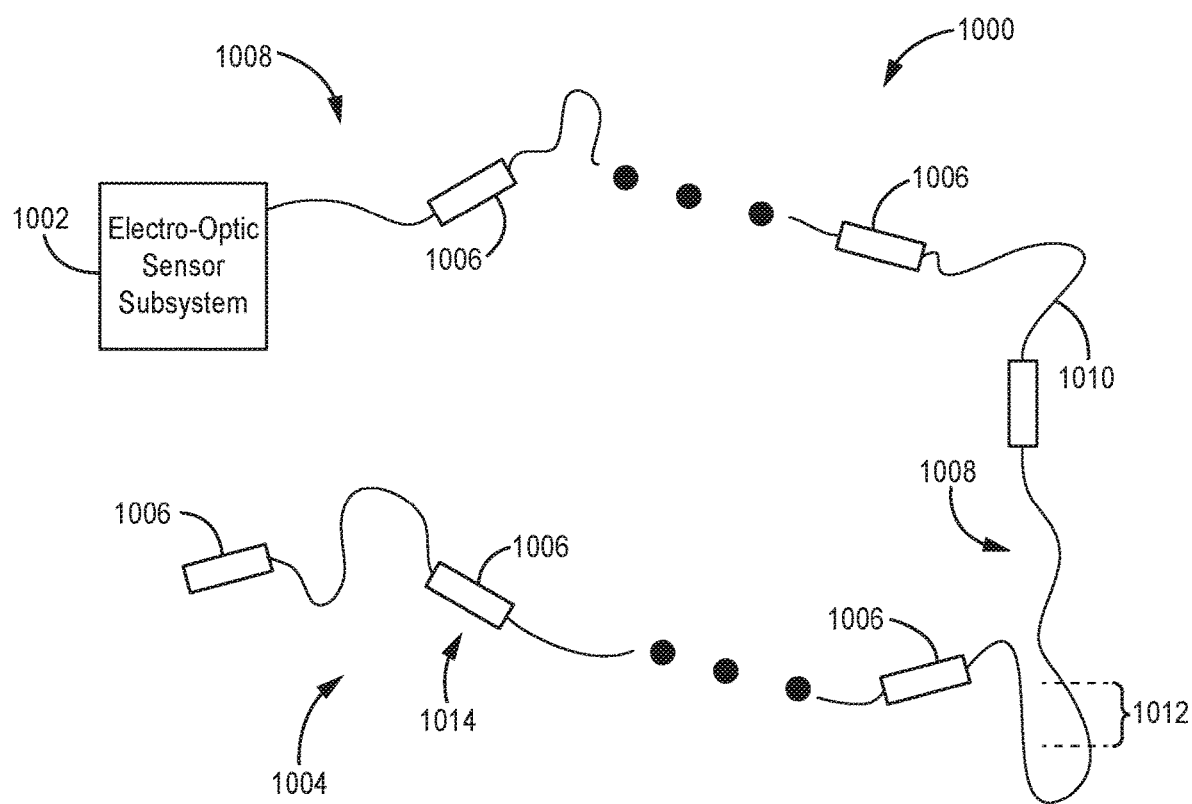
FIG. 1 is a diagram of an optical-sensor system that includes an optical-fiber system with one or more optical mandrels, according to an embodiment.

FIG. 1 is a diagram of an acoustic-signal detection system 1000, which includes an electro-optic sensor subsystem 1002, and which includes an optical-fiber assembly 1004 having one or more optical mandrels 1006 and one or more non-mandrel spans 1008 of an optical fiber 1010, according to an embodiment. For example, the linear length (the length along a longitudinal axis) of the optical fiber 1010 can range from a few meters to tens of kilometers (km), the lengths of the mandrels 1006 can range from about six inches to about twenty inches, and the linear lengths of the non-mandrel spans 1008 can range from about one meter to tens or hundreds of meters. Although the mandrels 1006 can have different lengths, the mandrels each typically have a uniform length (e.g., twelve inches); similarly, although the non-mandrel spans 1008 can have different linear lengths, the non-mandrel spans each typically have a uniform linear length (e.g., fifty meters). Furthermore, the non-mandrel spans 1008 of the optical fiber 1010 each include one or more sections, hereinafter non-mandrel sensor zones, or non-mandrel zones, 1012, and the spans of the optical fiber disposed on the mandrels 1006 each include one or more mandrel zones 1014. Each non-mandrel zone 1012 and each mandrel zone 1014 of the optical fiber encompasses a respective linear length, e.g., 1.0 m, of the optical fiber. Although the zones 1012 and 1014 typically each have a same, uniform length, one may configure the sensor subsystem 1002 to combine zones into sensing regions each having a length that is an integer multiple of the uniform zone length. For example, if the zones 1012 and 1014 each have a uniform length of one meter, then one can configure the subsystem 1002 to combine ten contiguous zones into a sensing region that has a length of ten meters. Furthermore, one can configure the subsystem 1002 to combine only non-mandrel zones 1012 or only mandrel zones 1014 into such a sensing region, or one can configure the subsystem to combine non-mandrel zones and mandrel zones into a same sensing region. Furthermore, the uniform linear lengths of the zones 1012 and 1014 are typically not fixed, and typically are configurable by configuring certain operational characteristics of the electro-optic sensor subsystem 1002, as explained below.

The sensor subsystem 1002 is configured to detect a vibration, hereinafter an acoustic signal, incident on one or more of the non-mandrel and mandrel zones 1012 and 1014, and to determine one or more of the following: on which zone(s) the detected acoustic signal is incident, parameters (e.g., amplitude, frequency, and phase) of the detected acoustic signal, a location of a source of the detected acoustic signal, and a classification of the source of the acoustic signal. An example of a classification is that the source of the acoustic signal is a vehicle moving at thirty miles per hour (mph), or a human walking at four feet per second.

Still referring to FIG. 1, operation of the system 1000 is described, according to an embodiment.

The sensor subsystem 1002 generates a source optical signal, such as a modulated laser beam, and directs the optical signal into the optical fiber 1010.

As the optical signal propagates along the optical fiber 1010, each region, which has a tiny linear length, e.g., on the order of nanometers, redirects a respective portion, or component, of the source optical signal back along the optical fiber toward the sensor subsystem 1002. For example, a mechanism that causes this redirection, also called backscattering, is the well-known mechanism of Rayleigh backscattering.

To reduce, to a suitable, or to an otherwise practical, value, the number of redirected components of the source optical signal that the sensor subsystem 1002 processes, the sensor subsystem uses coding, sampling, and correlation techniques to isolate, to monitor, and to analyze only redirected components generated by zones of the optical fiber 1010 that typically are each significantly longer than the above-described regions of the optical fiber. For example, each fiber zone may be in the approximate range of one half to ten meters long in a linear length along the optical fiber 1010. Although the fiber zones typically have a common length, one or more of the fiber zones can have a different length than one or more of the other fiber zones. Furthermore, using these same techniques, the sensor subsystem 1002 can select which of the one or more fiber zones to monitor at any given time, and can dynamically change the lengths of the fiber zones to vary the acoustic-signal-detecting resolution. Some of the coding, sampling, correlation, and other techniques that the sensor subsystem 1002 can implement are described below in conjunction with FIGS. 15-25.

The optical fiber 1010 superimposes the redirected components of the source optical signal (also "redirected components") on one another to form a redirected optical signal that propagates along the optical fiber back toward the sensor subsystem 1002; that is, the redirected optical signal propagates in a direction that is opposite to the direction of the propagation of the source optical signal.

Assuming that no acoustic signal is incident on the optical fiber 1010, each redirected component has a different phase than the redirected components from the fiber zones near the fiber zone that generated the redirected component. That is, there is a phase difference, or phase delta (also called "delta phase"), between the phases of two redirected components from immediately adjacent fiber zones.

In the absence of an acoustic signal incident on the optical fiber 1010, the phase deltas between respective pairs of fiber zones remain relatively constant.

An acoustic signal incident on a zone of the optical fiber 1010 causes that zone of the optical fiber to vibrate, and, therefore, to experience stress (e.g., compressive or extensive force) and strain (e.g., compressive or extensive length change).

The vibration-induced stress and strain causes the redirected component of the source optical signal generated by the fiber zone and all zones beyond the fiber zone to have a phase alteration that is related to, and that varies with, the amplitude of the incident acoustic signal. For example, if the incident acoustic signal is sinusoidal, then the phase of the redirected component from the fiber zone also varies sinusoidally.

Therefore, by determining and monitoring, over time, the phase of the redirected component from the zone of the optical fiber 1010 on which the acoustic signal is incident, the sensor subsystem 1002 determines the wave form of the acoustic signal, the wave form being proportional to the time-dependent optical phase change.

Furthermore, by determining a phase difference between the redirected components from two zones along the optical fiber 1010, the sensor subsystem 1002 can determine the acoustical disturbance on the region of the fiber between the two zones, permitting the location of the disturbance to be determined. As indicated above, in the absence of an incident acoustic signal, the phase difference between first and second redirected components from first and second adjacent zones of the optical fiber 1010 is approximately constant. Furthermore, if the acoustic signal is incident on a zone of the optical fiber 1010 that is past the first and second zones in a direction in which the source optical signal propagates along the fiber, then the phases of the first and second redirected components are, at least ideally, unchanged, so that the phase difference between the first and second redirected components remains constant. Similarly, if the acoustic signal is incident on a zone of the optical fiber 1010 that is before the first and second zones, then although the phases of the first and second redirected components are changed because the phase change imparted to the source optical signal by the acoustic signal propagates down the fiber to the first and second fiber zones, the phases of the first and second redirected components are, at least ideally, changed by a same amount, so that the phase difference between the first and second redirected components still remains constant. But if the acoustic signal is incident on the first zone of the optical fiber 1010 but not on the second zone of the optical fiber, or if the amplitude of the acoustic signal at the first zone is significantly different than the amplitude of the acoustic signal at the second zone, then the acoustic signal imparts different optical phase changes to the first and second redirected components, such that the phase difference between the first and second redirected components is no longer constant, i.e., the phase difference varies with respect to time. Therefore, the sensor subsystem 1002 detecting a non-constant phase difference between two zones along the optical fiber 1010 indicates that an acoustic signal is incident at some point of the optical fiber at, or between, the two zones. For example, if the sensor subsystem 1002 detects, over time, a non-constant phase difference between two one-meter-long zones that are immediately adjacent to one another in a non-mandrel span 1008 of the optical fiber 1010, then this indicates that an acoustic signal is incident on the fiber at one of the two zones, thus providing an acoustic-signal-location resolution of two meters. Or if the sensor subsystem 1002 detects, over time, a non-constant phase difference between two one-meter-long zones that are spaced apart by ten other one-meter-long zones in a non-mandrel span 1008 of the optical fiber 1010, then this indicates that an acoustic signal is incident to the fiber at one of the two zones, or at some location between the two zones, thus providing an acoustic-signal-location resolution of twelve meters.

Figure 2:
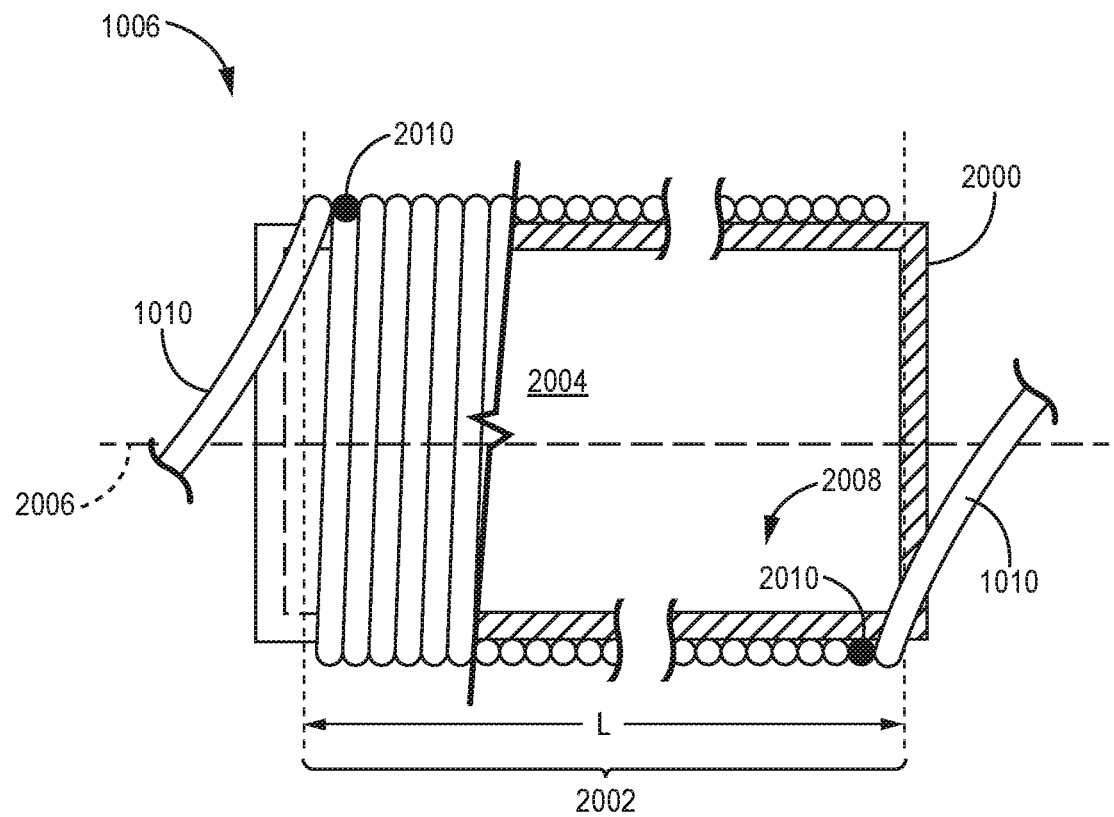
FIG. 2 is a diagram, with portions broken away, of an optical mandrel, according to an embodiment.

FIG. 2 is a cutaway side view, with portions broken away, of a portion of a mandrel 1006 of FIG. 1, according to an embodiment.

As described below, the mandrel 1006 can be configured to do one or more of the following: amplify an acoustic signal incident on the mandrel, increase the acoustic-signal-location-determination resolution of the system 1000 (FIG. 1), and increase the signal-to-noise ratio (SNR) of components of the source optical signal redirected by at least some of the fiber zones along the mandrel.

The mandrel 1006 includes a hollow form 2000 about which is wound a mandrel span 2002 of the optical fiber 1010; one may consider the mandrel span of the optical fiber to be a part of the mandrel, or to be separate from the mandrel. An interior, or cavity, 2004 of the form 2000 can be filled with air, another gas, or a liquid depending on the application in which the mandrel 1006 is to be used. The form 2000 can be configured, and can be filled with a fluid, so as to amplify an acoustic signal incident on the mandrel 1006 and, therefore, to provide a stronger signal for the sensor subsystem 1002 (FIG. 1) to detect and to analyze; the mandrel 1006 may also include a covering, such as shrink wrap, over the fiber 1010 and the form to protect the fiber and parts of the mandrel such as the form, and to further amplify an acoustic signal incident on the mandrel. Furthermore, the cavity 2004 can be configured to allow an optional fiber support member 2006 to pass through so that the support member need not be cut at the mandrel. The support member 2006 is, for example, a steel cable about which the optical fiber 1010 is wrapped or otherwise attached or secured, and is configured to absorb stress, strain, and other forces during installation of the optical-fiber assembly 1004 (FIG. 1) to prevent such forces from snapping, or otherwise breaking, the fiber. Alternatively, the optical fiber 1010 can be disposed inside a protective coating or covering (not shown in FIG. 2) made from, e.g., rubber, along with fibrous strands (not shown in FIG. 2) of, e.g., Kevlar®, Nylon®, or plastic-reinforced fiber glass that is wrapped, or that is otherwise disposed, around the optical fiber; it is these fibrous strands that form the support member 2006. Furthermore, the optical fiber may be coated with, e.g., a polymer (coating not shown in FIG. 2), which alone (e.g., in the absence of the fibrous strands) may form the support member 2006, or the combination of the coating and the fibrous strands may form the support member.

The mandrel 1006 increases the acoustic-signal-location-determination resolution by effectively increasing the number of optical-fiber zones in a given length L along the optical-fiber assembly 1004 (FIG. 1).

Referring to FIG. 1, in a non-mandrel span 1008 of the optical fiber 1010, there is typically one non-mandrel zone per a given linear length of the optical fiber. For example, if a zone is one meter of the optical fiber 1010 in a non-mandrel span 1008, then there is one non-mandrel zone per linear one meter of the optical fiber, and, therefore, per linear one meter of the optical-fiber assembly 1004.

But, referring to FIG. 2, because the mandrel optical span 2002 of the fiber 1010 is wound around the form 2000, the mandrel 1006 effectively increases the sensitivity of the of fiber zones within the mandrel optical span. As described above, the mandrel 1006 acts as a microphone with sensitivity that is much higher than a typical zone (e.g., a one-meter long zone) of a non-mandrel span of the fiber 1010. An acoustic disturbance can distort a fiber span directly, causing optical phase shifts, but the distortion is relatively small because the fiber is very stiff, so the resulting phase shifts are relatively small. But the mandrel 1006 is made of a material that is much more compliant than the optical fiber 1010, so that an acoustic disturbance will distort the mandrel much more than it will distort a segment of the fiber; and the mandrel can impart this higher distortion to the relatively thin fiber because the fiber, being only part of the mandrel, does not completely dominate the stiffness of the mandrel. Effectively, the mandrel 1006 amplifies the distortion imparted to the mandrel optical span 2002 of the fiber 1010 by an acoustic disturbance. Furthermore, for acoustic frequencies low enough so that the wavelength of sound in the medium (e.g., air or another gas, soil, water or another liquid) is considerably longer than the mandrel's dimensions, all of the fiber 1010 wrapped around the mandrel 1006 experiences approximately the same compression or extension simultaneously. For this reason, the phase changes across the individual mandrel zones (the zones along the span 2002 of fiber 1010 wrapped around the mandrel 1006) in the fiber add coherently, creating, across the entire linear length of the fiber wound about the mandrel, a significantly larger phase change than the acoustic signal would cause in the same length of fiber in a non-mandrel span 1008.

For example, if the electro-optic sensor subsystem 1002 (FIG. 1) detects a non-constant phase difference between redirected components of the source optical signal from two zones of the optical fiber 1010 at each end of the span 2002, and, therefore, at each end of the mandrel 1006, then this indicates that an acoustic signal is incident on the mandrel.

Because, in the above example, L=0.33 m, the mandrel provides an acoustic-signal-location-determination resolution of one third of a meter, which might be on the order of up to six times higher than the resolution provided by a non-mandrel span 1008 (FIG. 1) of optical fiber 1010. That is, in the linear sections of the optical-fiber assembly 1004 (FIG. 1) occupied by mandrels 1006, the optical-fiber assembly has an acoustic-signal-location-determination resolution that is higher than the resolution of the non-mandrel spans 1008.

Consequently, by selecting a suitable linear spacing of the mandrels 1006 along the optical fiber 1010, one can design the system 1000 of FIG. 1 to provide an acoustic-signal-location-determination resolution that is suitable for virtually any application. For example, in an embodiment of the system 1000 in which the optical-fiber assembly 1004 is between five and ten kilometers long, immediately adjacent mandrels 1006 can be spaced apart by a distance in an approximate range of ten meters to one hundred fifty meters, for example fifty meters.

Referring to FIGS. 1-2, operation of the system 1000 is described, according to embodiments in which the system determines a phase difference between different mandrel zones, or between different sections, of a mandrel 1006.

In an embodiment, the sensory subsystem 1002 selects first and second mandrel zones located in first and second halves, respectively, of the mandrel portion 2008.

The sensory subsystem 1002 selects, as the first mandrel zone, the zone generating a redirected component of the source optical signal having the highest optical power as compared to the optical powers of the redirected components generated by the other zones in the first half of the mandrel portion 2008; for example, if ninety zones of the optical fiber 1010 are wrapped around the portion 2008 of the mandrel form 2000, then each half of the mandrel portion 2008 includes forty five mandrel zones. The sensor subsystem 1002 can measure, or otherwise determine, the optical powers of the redirected components of the source optical signal using a conventional technique.

Similarly, the sensory subsystem 1002 selects, as the second mandrel zone, the zone generating a redirected component of the source optical signal having the highest optical power as compared to the optical powers of the redirected components generated by the other zones in the second half of the mandrel portion 2008.

In another embodiment, the sensor subsystem 1002 selects, as the first mandrel zone, the zone generating a redirected component of the source optical signal having the lowest noise content as compared to the noise contents of the redirected components generated by the other zones in the first half of the mandrel portion 2008; for example, if ninety zones of the optical fiber 1010 are wrapped around the portion 2008 of the mandrel form 2000, then each half of the mandrel portion 2008 includes forty five mandrel zones. The sensor subsystem 1002 can measure, or otherwise determine, the noise contents of the redirected components of the source optical signal using a conventional technique, or in the following manner. The sensor subsystem 1002 applies a Fast Fourier Transform (FFT) to the optical phase of each redirected component of the source optical signal from the mandrel zones in the first half of the mandrel portion 2008, and estimates the noise content of the redirected component as the standard deviation of the powers or energies of the frequencies (binned by the FFT) in the upper half of the frequency spectrum that the sensor subsystem is configured to analyze. The number of frequencies available for this power or energy analysis may be limited by the frequencies that the FFT outputs; for example, a 64-point FFT generates powers or energies for only sixty-four frequencies, the fundamental frequency and sixty-three harmonics of the fundamental frequency. For example, if the optical phase of the redirected optical signal is sampled at approximately 12 Khz (sampling, demodulation, and other processing of the redirected optical signal are described below in conjunction with FIGS. 15-25), then 0-6 Khz (i.e., the Nyquist frequency) is the frequency spectrum of an acoustic signal that the sensor subsystem 1002 is configured to analyze. The sensor subsystem 1002, therefore, identifies the noise content of the redirected component of the source optical signal from the mandrel zone as the standard deviation of the acoustic power or energy in the phase of the redirected component at frequencies (e.g., at the frequencies that the FFT bins out outputs) within the range of 3 Khz-6 Khz, which is the upper half of a 0-6 Khz frequency spectrum. The lower the calculated standard deviation, the lower the determined noise content of the corresponding redirected component, and the higher the calculated standard deviation, the higher the determined noise content of the corresponding redirected component.

Similarly, the sensor subsystem 1002 selects, as the second mandrel zone, the zone generating a redirected component of the source optical signal having the lowest noise content as compared to the noise contents of the redirected components generated by the other zones in the second half of the mandrel portion 2008.

Still referring to FIGS. 1-2, operation of the system 1000 is described, according to embodiments in which the system determines an average phase difference, or a difference between summed phase difference, between more than two mandrel zones in different sections of a mandrel 1006.

In an embodiment, the sensory subsystem 1002 selects a number n of first mandrel zones located in a first half of the mandrel portion 2008, and selects a number m of second mandrel zones located in a second half of the mandrel portion. Typically, n=m although this is not required.

The sensory subsystem 1002 can select the number n of first mandrel zones as the n mandrel zones in the first half of the mandrel portion 2008 that generate redirected components of the source optical signal having the lowest noise contents or the highest optical-signal powers as compared to the redirected components generated by the other mandrel zones in the first half of the mandrel portion.

Similarly, the sensor subsystem 1002 can select the number m of second mandrel zones as the m mandrel zones in the second half of the mandrel portion 2008 that generate redirected components of the source optical signal having the lowest noise contents or the highest optical-signal powers as compared to the redirected components generated by the other mandrel zones in the second half of the mandrel portion.

Next, the sensor subsystem 1002 determines the phases of the redirected components of the source optical signal from the selected n first mandrel zones, and averages these phases to generate an average first phase.

Similarly, the sensor subsystem 1002 determines the phases of the redirected components of the source optical signal from the selected m second mandrel zones, and averages these phases to generate an average second phase.

Then, the sensory subsystem 1002 determines the difference between the first and second average phases, and analyzes this phase difference per above to determine whether an acoustic signal is incident on the mandrel 1006.

In a related embodiment where n=m, the sensor subsystem 1002 determines, and sums together, the phases of the redirected components of the source optical signal from the selected n first mandrel zones to generate a total first phase.

Similarly, the sensor subsystem 1002 determines, and sums together, the phases of the redirected components of the source optical signal from the selected m second mandrel zones to generate a total second phase.

Then, the sensor subsystem 1002 determines the difference between the first and second total phases, and analyzes this phase difference per above to determine whether an acoustic signal is incident on the mandrel 1006.

Still referring to FIGS. 1-2, in a variation of the above-described embodiments, the sensor subsystem 1002 partitions the mandrel portion 2008 into other than halves for the above-described phase-differencing techniques. For example, the sensor subsystem 1002 can partition the mandrel portion 2008 into p partitions, and select two mandrel zones for phase differencing, one from each of the end partitions, using one of the above-described lowest-noise and highest-optical-power techniques. Further in example, where p=6 and the number of mandrel zones in the span 2002 is ninety, then the sensor subsystem can be configured to select one mandrel zone from the 90/6=15 mandrel zones at one end of the mandrel portion 2008, and to select another mandrel zone from the fifteen mandrel zones at the other end of the mandrel portion.

In yet another variation of the above-described embodiments, the sensor subsystem 1002 partitions the mandrel portion 2008 into other than halves for the above-described phase-average-differencing and phase-sum-differencing techniques. For example, the sensor subsystem 1002 can partition the mandrel portion 2008 into p partitions, select n mandrel zones for phase-averaging or phase-sum differencing from one of the end partitions, and select m mandrel zones for phase-averaging or phase-sum differencing (m=n for phase-sum differencing) from the other end partition, using one of the above-described lowest-noise and highest-optical-power techniques. Further in example, where p=6 and the number of mandrel zones in the span 2002 is ninety, then the sensor subsystem can be configured to select n mandrel zones from the 90/6=15 mandrel zones at one end of the mandrel portion 2008, and to select m mandrel zones from the fifteen mandrel zones at the other end of the mandrel portion. In general, the methods exemplified here, for computing an effective optical phase change for the fiber on the mandrel, can be described as computing a weighted sum of the phase changes of selected zones in and near the mandrel, where the weights can be both positive and negative. The zones and their weights can be chosen in different ways that optimize the signal-to-noise ratio.

Referring to FIG. 2, in still another embodiment of the mandrel 1006, enhanced redirectors 2010 (for example, enhanced reflectors), can be conventionally formed in respective portions of the optical fiber 1010 forming the two end mandrel zones 1014 to increase the redirection gain of the end mandrel zones, and, therefore, to increase the optical power and optical-signal amplitudes of the components of the source optical signal respectively redirected by the end mandrel zones. That is, the redirectors 2010 are configured to increase the SNR of the redirected components from the end mandrel zones. The sensor subsystem 1002 (FIG. 1) can be configured, a priori, with the "knowledge" of the end mandrel zones having the redirectors 2010 such that the sensor subsystem is configured to use only the redirected components of the source optical signal for phase differencing and other phase analysis. Alternatively, the sensor subsystem 1002 can implement one or more of the above-described phase-differencing techniques, where it is understood that most or all of the time, the two end mandrel zones including the redirectors 2010 generate the redirected components of the source optical signal having the lowest noise contents or the highest optical powers.

Still referring to FIG. 2, in more detail, where the sensor subsystem 1002 (FIG. 1) uses redirected components of the source optical signal due to Rayleigh scattering from only a small number of the zones in the optical fiber 1010 wound about, or located just outside of, the mandrel portion 2008, (e.g. at or near the ends of a mandrel 1006), there are many other mandrel and non-mandrel zones in the fiber producing Rayleigh backscatter light that the sensor subsystem 1002 effectively ignores. Certain imperfections in the optical fiber 1010 or sensor subsystem 1002 (e.g., clock jitter, laser phase noise, or phase shifts due to disturbance of the optical fiber) can cause crosstalk from these ignored zones into the zones generating the redirected components of the source optical signal that the sensor subsystem 1002 processes, resulting in undesirable noise in these latter zones. To mitigate this noise, it is possible to place either discrete reflectors or high-reflection or high-scattering zones (called here "redirectors") in the fiber near the two ends of the mandrel 1006, in which the redirected (e.g., reflected or scattered) optical power is considerably higher than the typical optical power from ignored, or other, mandrel and non-mandrel zones that have only Rayleigh scattering. Therefore, crosstalk from such Rayleigh scattering from these ignored and other zones has a much smaller effect on the redirected components from the used zones that include the redirectors 2010, creating less noise. Furthermore, the redirectors 2010 can be made, for example, with splices containing materials added to the glass of the optical fiber 1010, with Bragg gratings, with fiber-optic connectors that have some reflection, or with segments of fiber with scattering or reflection enhanced by other means, which may be built into the fiber or added by splicing a special segment into the fiber. The redirection gain of such a reflector zone (a zone including a redirector 2010) is typically substantially more than the typical Rayleigh backscattering from an average zone (e.g., a zone non including a redirector 2010) in the fiber, for example, by a factor of four or more, further in example by a factor of one hundred or more. In some applications the redirection coefficient of a redirector 2010 might even be in an approximate range as high as 1% to 10% of the optical power of the incident source optical beam. Alternatively, in a system 1000 (FIG. 10) with many (e.g., ten or more) mandrels, it might be desirable to make the reflection coefficient of each redirector 2010 within an approximate range of 0.01% to 0.1%.

Referring to FIGS. 1-2, a summary of the operation of the system 1002 using mandrels is presented. Details of at least some of the concepts included in this summary are described below in conjunction with FIGS. 15-25.

Mandrel Acoustic Signal Formation

In an embodiment, the electro-optic sensor subsystem 1002 effectively forms an acoustic signal for a mandrel 1006 by selecting a number w, e.g., w=15, best mandrel zones 1014, also called mandrel sensors, in the beginning of the mandrel, and a same number w of the best mandrel sensors at the end of the mandrel. The sensor subsystem 1002 determines the w best mandrel sensors 1014 from the beginning of the mandrel 1006 and the w best sensors from the end of the mandrel by analysis of each sensor's high-frequency noise or by other methods such as optical-power analysis.

In more detail, it is useful to divide time into discrete intervals called "measurement intervals," and to divide the fiber 1010 into discrete regions called "zones" or "sensors." For example, in an embodiment, successive zones might be approximately one meter long, corresponding to a round-trip time increment of approximately ten nanoseconds for light (a modulated source optical signal) in the fiber; and a measurement interval might be 81.91 microseconds (μs) long, corresponding to the round-trip delay for a fiber that is 8,191 zones long, and corresponding to the number of bits in a particular pseudo-random code sequence. With the data produced by the sensor subsystem 1002, the sensor subsystem can compute optical phase information for each zone and for each measurement interval. This phase information can be the effective "absolute optical phase" of the returning light (redirected optical signal) from the zone, relative to the optical phase of the optical local-oscillator signal; or this phase information can be the "phase change" between the current measurement interval and a previous measurement interval (e.g., the immediately prior measurement interval), i.e., the change, or delta, in absolute optical phase. Whichever is used (absolute optical phase or phase change over time), this zone-dependent signal is, at least for purposes of this section, called the "signal."

A disturbance in a section of the fiber 1010 that is close to the launch end of the fiber (the end coupled to the electro-optic sensor subsystem 1002) creates a signal in all of the fiber zones, both non-mandrel zones 1012 and mandrel zones 1014, that are "downstream," or more distant from that zone. Therefore, signals measured for a particular zone may not be representative of fiber disturbances in the vicinity of that zone. For this reason, it is useful to compute the "delta signal," meaning the difference between the signal values for two zones. The two zones may be contiguous with each other, or may be at some distance from each other, but in either case the measured difference is representative of disturbances in the section of the fiber 1010 that is between the two zones.

A mandrel 1006 is designed to subject all mandrel zones 1014 (the zones in the section of the fiber 1010 wound about the mandrel) to approximately the same acoustic disturbance, so that the phase effects accumulate coherently from one end of the mandrel to the other end. This makes the delta signal between a mandrel zone 1014 at the start of the mandrel 1006 and one at the end of the mandrel relatively large. But some zones produce "poor" signals that are noisy, primarily because the statistical nature of Rayleigh scattering can cause the total optical power scattered back from a particular zone to be low. So instead of just looking at the delta signal between the mandrel zones 1014 at precisely the two ends of the mandrel 1006 (which delta signal might be poor because one or both of the mandrel zones is/are poor), the sensor subsystem 1002 can be configured (1) to choose, near each end of the mandrel, a respective mandrel zone that is especially "good" in the sense of having relatively low noise or relatively high optical power or other attributes. Furthermore, instead of just using single mandrel zones, one at each end, the sensor subsystem 1002 can be configured (2) to use several good mandrel zones at each end of the mandrel and average them (e.g., average the phases, amplitudes, or polarizations of the backscattered signals from the zones), since they will have approximately the same signal and such averaging will generally reduce noise.

For these reasons, in an embodiment, the electro-optic sensor subsystem 1002 effectively forms an acoustic signal for a mandrel 1006 by selecting a number of the best mandrel sensors (such as w=15) in the beginning of the mandrel and the same number w, or a similar number (e.g., w−1) of the best mandrel sensors from the end of the mandrel. The sensor subsystem 1002 can be configured to determine the best mandrel sensors from the beginning and the end of the mandrel by analysis of each sensor's high-frequency noise or other methods such as optical-power analysis, such as computing the sum of the squares of the in-phase and quadrature components from the IQ demodulator (see, e.g., FIG. 22). Once the sensor subsystem 1002 identifies the best mandrel sensors (mandrel zones 1014), the sensor subsystem sums, e.g., the phases of the chosen mandrel sensors at the beginning of the mandrel into a variable sum1; similarly, the sensor subsystem 1002 sums, e.g., the signal phases, from the chosen mandrel sensors at the end of the mandrel to form sum2. Next, the sensor subsystem 1002 computes the difference between sum2 and sum1 to represent the "delta signal," or the "delta acoustic signal," between the two ends of the mandrel 1006.

AutoEncoder

The sensor subsystem 1002 can include, or can implement, a machine-learning algorithm to provide a target-detection circuit and algorithm. Machine-learning, or deep-learning, algorithms such as an autoencoder, recurrent neural network, convolutional neural network (CNN), or other neural-network architecture could be used for this purpose. By detection, it is meant the determination of whether an event sensed by the fiber 1010 is statistically significant.

Operationally, the autoencoder is trained using normal operating environmental data from the mandrels 1006, and it learns the background noise signature for each mandrel. When the system 1000 is running and collecting acoustic data, the autoencoder processes "chunks" (e.g., three-second segments) of audio data and reconstructs the acoustic signal using the autoencoder model. The autoencoder, or another part of the subsystem 1002, computes the root-mean-square error between the acoustic signal and the autoencoder's reconstructed signal. If the root-mean-square error exceeds a predefined threshold, the sensor subsystem 1002 determines the acoustic signal to be anomalous. Exceeding the pre-defined root-mean-square-error threshold defines the detection of an acoustic signal of interest. When an anomalous acoustic signal is detected by the autoencoder, the anomalous acoustic signal (e.g., the chunk of the signal) is further processed by a previously trained CNN to determine the target type. That is, the CNN classifies the acoustic signal as, e.g., human activity (walking, running), vehicle, aircraft, drone or background target types.

Still referring to FIGS. 1-2, alternate embodiments of the system 1000 are contemplated. For example, the optical-fiber assembly 1004 can terminate in a non-mandrel span 1008 instead of in a mandrel 1006. Furthermore, embodiments described in conjunction with FIGS. 3-25 may be applicable to the system 1000 of FIG. 1 and the mandrel 1006 of FIG. 2.

Figure 3:
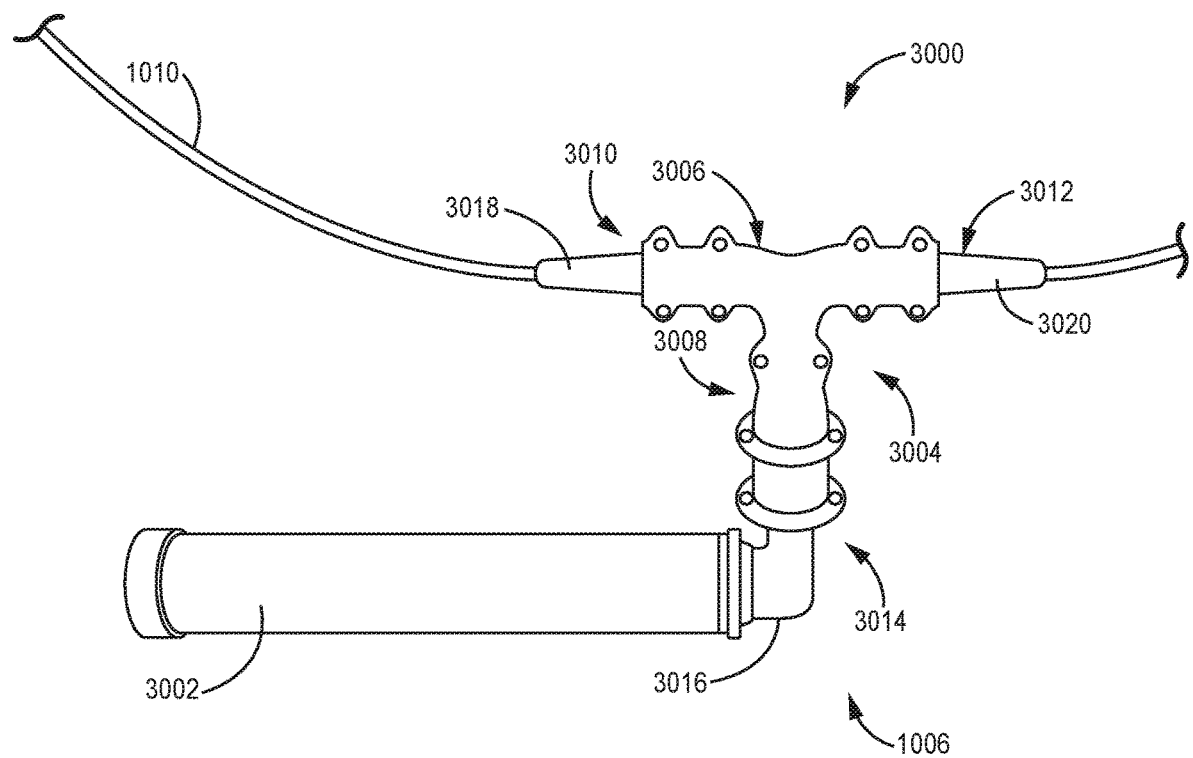
FIG. 3 is a diagram of a portion of an optical assembly including an optical fiber and an optical mandrel with a winding section aligned with the optical fiber, according to an embodiment.

FIG. 3 is a diagram of a portion 3000 of the optical-fiber assembly 1004 of FIG. 1 including a portion of the optical fiber 1010 and an optical mandrel 1006 with a winding section 3002 aligned with the optical fiber, according to an embodiment.

Figure 4:
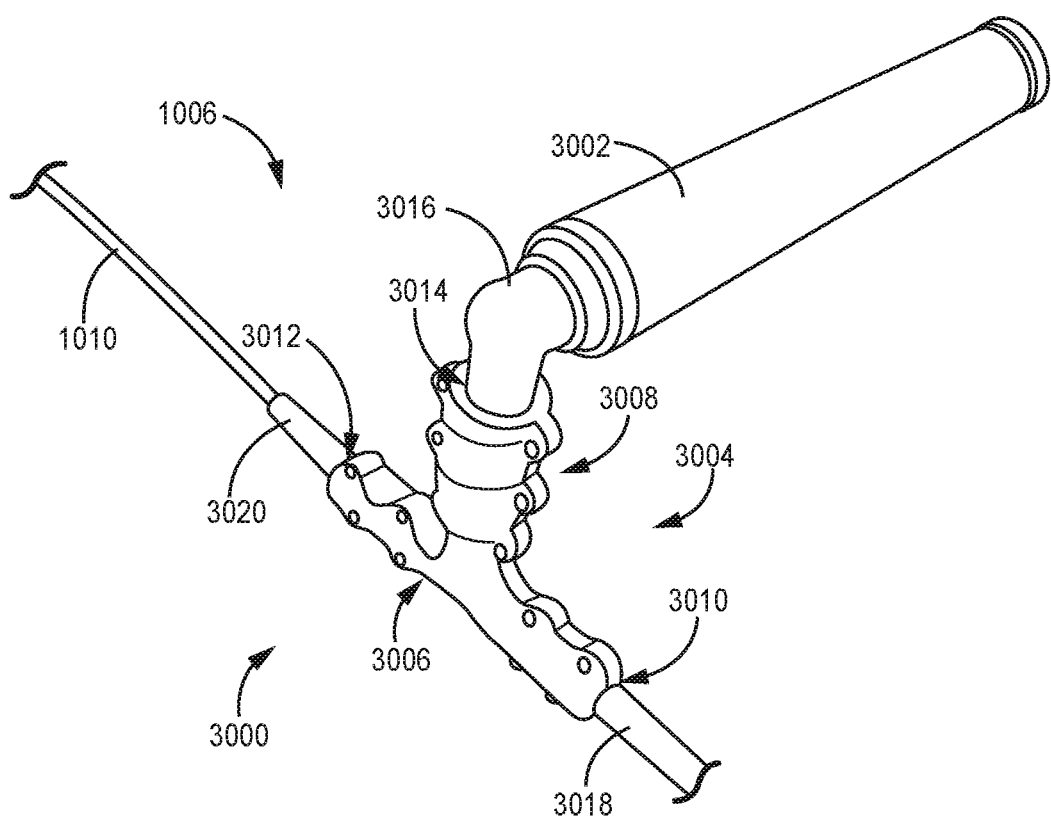
FIG. 4 is a diagram of the portion of the optical assembly of FIG. 3 with the winding section orthogonal to the optical fiber, according to an embodiment.

FIG. 4 is a diagram of the portion 3000 of the optical-fiber assembly 1004 of FIG. 3 with the winding section 3002 of the mandrel 1006 oriented orthogonal to the optical fiber 1010, according to an embodiment.

Referring to FIGS. 3-4, in addition to the winding section 3002, the mandrel 1006 includes a T-connector 3004 having a first section 3006 and a second section 3008, which is orthogonal to the first section. The first section 3006 includes first and second aligned openings 3010 and 3012 via which the optical fiber 1010 enters and exits the mandrel 1006, and the second section 3008 includes a third opening 3014. A right-angle elbow joint 3016 couples the winding section 3002 to the third opening 3014, and allows one to rotate the joint and winding section relative to the second section 3008 in a plane perpendicular to the page of FIG. 3. Although not shown in FIGS. 3-4, the optical fiber 1010 enters one of the first and second openings 3010 and 3012, extends through the second section 3008, the third opening 3014, and the elbow joint 3016, to the winding section 3002, and further extends from the winding section, back through the elbow joint, the third opening, and the second section, through the first section, and exits the other one of the first and second openings. The mandrel 1006 can also include flexible fiber grips 3018 and 3020 for reinforcing the optical fiber 1010, and, therefore, preventing breaking of the optical fiber, at the first and second openings 3010 and 3012; the flexible fiber grips can be attached to the first section 3006 of the T-connector 3004 by engaging the first and second openings.

The winding section 3002, T-connector 3004, elbow join 3016, and fiber grips 3018 and 3020 of the mandrel 1006 each can be formed from any respective suitable material such as metal, plastic, or resin, and can have any suitable sizes.

Furthermore, the winding section 3002 can be configured to amplify acoustic signals incident on the winding section.

Moreover, the first, second, and third openings 3010, 3012, and 3014, as well as the interface between the winding section 3002 and the elbow 3016, can be fitted with sealing members (e.g., with O-rings) that form fluid-tight seals to prevent contaminants from entering inside the mandrel 1006.

In addition, the mandrel 1006 is configured so that any bends that the optical fiber 1010 experiences within, or entering or exiting, the mandrel have bend radii large enough to prevent significant degradation of the optical-signal propagation characteristics of the optical fiber.

Figure 5:
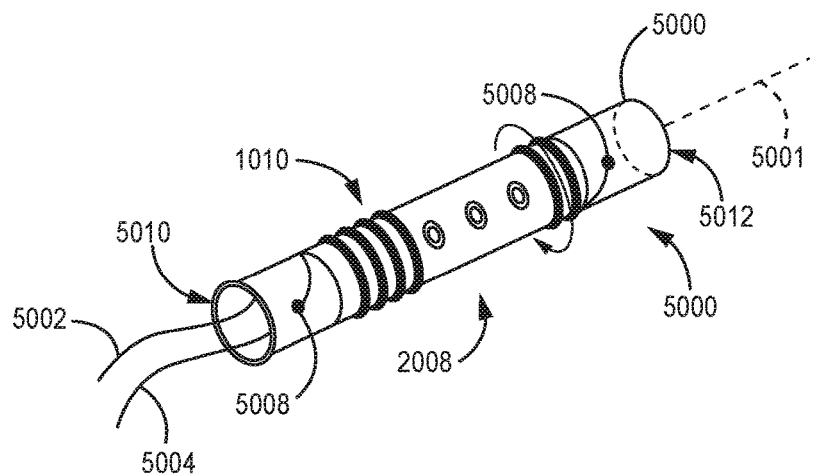
FIGS. 5-6 are isometric views of a winding form of the winding section of the mandrel of FIGS. 3-4, and an optical fiber wrapped around the winding form, according to an embodiment.
Figure 6:
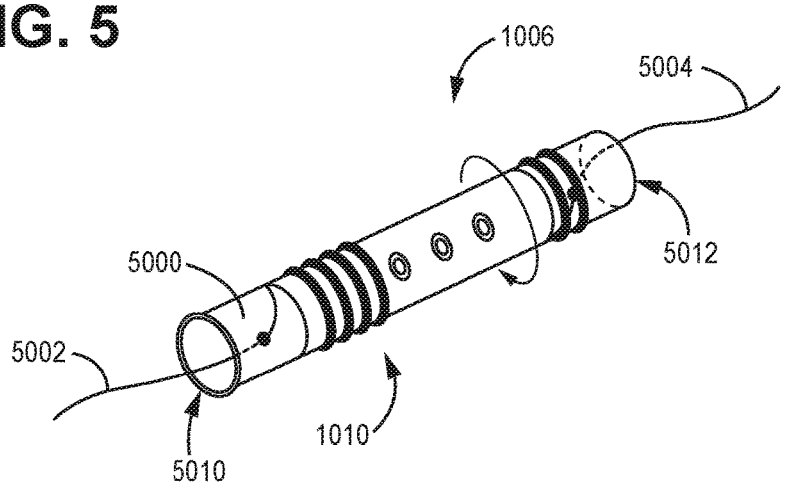

FIGS. 5-6 are isometric views of a winding body or form 5000, which is located inside of the winding section 3002 of the mandrel 1006 of FIGS. 3-4, and a portion of the optical fiber 1010 wrapped around the portion 2008 of the winding form, according to an embodiment. The mandrel 1006 also can include a covering (not shown in FIGS. 5-6) over the form 5000 and the optical fiber 1010.

The form 5000 has a longitudinal axis 5001, can be made from any suitable material, can have any suitable dimensions, and can have any suitable cross-sectional shape. For example, the form 5000 can be made from a material (e.g., a polymer) that is sufficiently flexible so as not to restrict the winding of the optical fiber 1010 from sensing vibrations, or that is configured to amplify a vibration by distributing a vibration directed to one or more points of the winding across the entire winding. Because the form 5000 is cylindrical, it does not impart sharp bends to the fiber 1010 wound about the portion 2008 so as to limit bending signal losses in in the wound fiber (to further limit bending losses, an optical fiber with low bending loss can be used for the optical fiber 1010). Furthermore, low- or zero-bend-loss fibers and fusion splicing can be used for the section of the fiber wound about the mandrel portion 2002 to minimize back reflections as a result of fiber turns and splice loss. But the form 5000 can have another other cross-sectional shape, even a shape (e.g., square, triangular) that does impart sharp bends to the wound fiber 1010. Furthermore, the shorter the form 5000, the higher the resolution of vibration-source-location determination that the form can provide, but the smaller the vibration-beam-forming aperture that the form can provide. Conversely, the longer the form 5000, the lower the vibration-source-location determination that the form can provide, but the larger the vibration-beam-forming aperture that the form can provide. Moreover, one or both ends of the form 5000 can be capped, e.g., with respective plugs of vulcanized rubber, and openings for the wound fiber 1010 to extend from the form can be formed in the end caps or in the form itself. For example, the cylindrical form 5000 can be made from any suitable material such as an acrylic or polyvinyl chloride (PVC), polycarbonate, carbon-fiber, or glass, can have an air core (e.g., an air-filled cavity), can have a length of approximately 12 inches (~0.33 m), and can have an outside diameter of approximately 1.6 inches. Additional details of an embodiment of the form 5000 are set forth below.

Instead of being formed from a length of the optical fiber 1010, the wound portion of the optical fiber also can be formed from a separate span of optical fiber that is spliced to the optical fiber 1010 at or near winding ends 5002 and 5004. If a separate optical fiber forms the fiber section wound about the portion 2008, then the separate optical fiber can be the same as, or different than, the optical fiber 1010. For example, the separate optical fiber can be a low-bending-loss fiber as described above, such as Corning ZBL or the AFL equivalent. Furthermore, each turn of the optical fiber wound about the form portion 2008 can contact the one or two adjacent turns, or can be separated from the one or two adjacent turns by a uniform or respective spacing (end turns are each adjacent only to one other turn, intermediate turns are each adjacent to two other turns, one other turn on each side of the intermediate turns); for example, the spacing between a pair of adjacent turns can be the same as, or different from, the spacing between another pair of adjacent turns. Moreover, the wound section of the fiber 1010 can be unsecured relative to the form 5000, or can be secured with, for example, an adhesive that bonds the fiber to the form. Alternatively, channels or grooves (not shown in FIGS. 5-6) can be formed in the form 5000 to receive turns of the wound optical fiber 1010. In addition, the wound fiber 1010 can have any suitable number of partial or full turns. Furthermore, the wound section of the fiber 1010 can have only one, or can have more than one, layer of turns. Moreover, the wound section of the fiber 1010 can occupy any portion of the length of the form 5000 up to the entire length of the form; that is, the portion 2008 of the form about which the fiber is would can have any suitable length up to the entire length of the form. And any portion of the fiber 1010 inside of the form 5000 (e.g., so that the winding ends 5002 and 5004 can exit via the ends of the form) can be secured to the inside of the form, e.g., with an adhesive such as epoxy. In an embodiment, for a form 5000 having an outside diameter of approximately 1.6 inches and a length of approximately 12 inches, the length of the optical fiber 1010 (or of a separate span of fiber) that wraps around the form is approximately 96 meters (approximately 315 feet), and the number of turns that the wound fiber makes about the form is approximately seven-hundred-fifty (750) turns. If each mandrel zone is approximately one meter in linear length along the optical fiber 1010, then the mandrel 1006 includes approximately 96 non-overlapping mandrel zones.

The covering (not shown in FIGS. 5-6) over the fiber 1010 and form 5000 can be any suitable material, such as heat-shrink tubing or adhesive-backed heat-shrink tubing. The covering can protect the form 5000, the section of the optical fiber wound about the form portion 2008, and other portions of the mandrel 1006 from contaminants such as dirt and moisture, and can hold the turns of the optical fiber in place. Such protection can be sufficient to allow one to use the mandrel 1006 in virtually any medium or substance, for example, to bury the mandrel underground, and to embed the mandrel in a building material such as concrete. Furthermore, the covering can have a flexibility sufficient to allow the optical fiber wound about the form 5000 to distort, and to experiences force, in response to vibrations so that the system 1000 (FIG. 1) can detect and classify the vibrations. In addition, the covering can protect against moisture buildup inside of the mandrel 1006 and can minimize damage to the wound section of the optical fiber that may occur during freeze/thaw cycles. Fiber internal to the form 5000 can be secured to the inner wall of the form to prevent excessive movement of the fiber during and after deployment. The mandrel 1006 can be fastened, or otherwise coupled, to the optical fiber 1010 external to the mandrel in a manner that reduces the chances of fiber pull out and that provides strain relief to wound fiber if the wound fiber is spliced to the optical fiber 1010.

Referring to FIG. 5, in an embodiment the mandrel 1006 includes an air core, with a low-bend-loss single-mode fiber 1010 (or a separate span of optical fiber) wrapped around a thin-wall form 5000, which can be formed from a thin-wall acrylic, or thin-wall PVC, at an outside diameter (O.D.) of approximately 1.6 inches. The low-bend-loss fiber 1010 wrapped around the form 5000 can be, for example, Corning ZBL or the AFL equivalent. The form 5000 is approximately 12 inches in length (the dimension along the axis 5001), with two bevel-edged holes 5008 machined, one at each end of the form approximately 1.6 inches in from the respective end of the form. The wound section of the fiber 1010 is wrapped around the portion 2008 of the form 5000 with consistent tension and spacing accomplished with a customized lathe/tensioner (not shown in FIGS. 5-6) to turn and advance the feed as more fiber is wrapped around the form. This results in an approximately uniformly tensioned and spaced wrapping with each turn of the fiber 1010 touching the adjacent and previous turns with minimal deformation of the fiber geometry. For example, the fiber 1010 is wrapped around the form 5000 seven-hundred-fifty-eight (758) times and is secured to the form as described above, and then the mandrel 1006 removed from the lathe.

Still referring to FIG. 5, an end 5010 of the mandrel 1006 is set into the third opening 3014 (FIGS. 3-4) of the T-coupler 3004 to allow for directionality for suitable detection and sensitivity, while an end 5012 is capped with a vulcanized rubber seal. The wound fiber at the end 5010 of the form 5000 is removed by three (3) turns and fed back through the adjacent opening 5008 into the cavity of the form 5000, exiting out the end 5010 into the T connector 3004 (FIGS. 3-4) to be prepared for fusion splicing into the optical fiber 1010 if the span of fiber wrapped around the form is not integral with the fiber 1010. Similarly, the wound fiber at the end 5012 of the form 5000 is removed by five turns and fed back through the adjacent opening 5008 into the cavity of the form, exiting out the end 5010 into the T connector 3014 to be prepared for fusion splicing into the optical fiber 1010 if the fiber wrapped around the form 6000 is not integral with the fiber 1010 (e.g., the fiber external to and internal to the mandrel 1006 is not a single piece).

The mandrel of FIG. 6 is similar except that the fiber 1010 (or separate section of fiber spliced to the fiber 1010) enters one of the form 5000 ends 5010 and 5012 and exits the other of the ends 5010 and 5012.

Referring to FIGS. 3-6, alternate embodiments of the mandrel 1006 are contemplated. For example, one or more embodiments described in conjunction with FIGS. 1-2 and 7-25 may be applicable to the mandrel 1006 of FIGS. 3-6.

FIG. 7 is an isometric view of an optical mandrel 1006 of FIG. 1, according to another embodiment.

FIG. 8 is an exploded view of the optical mandrel 1006 of FIG. 7, according to an embodiment.

Referring to FIGS. 7-8, as described below, the optical mandrel 1006 is configured to be disposed "in-line" with the optical fiber 1010 in the optical-fiber assembly 1004 of FIG. 1, and includes optical-fiber paths (not visible in FIGS. 7-8) that are configured to bend the optical fiber gradually enough to prevent the fiber bends from changing the propagating and redirecting (e.g., backscattering) characteristics of the optical fiber as compared the redirecting characteristics of a straight span of the fiber. Furthermore, the optical mandrel 1006 is designed to amplify acoustic signals incident on the mandrel such that the acoustic signals that the electro-optic sensor subsystem 1002 of FIG. 1 recovers from the redirected optical signal are more likely to have a higher optical power and a higher SNR as compared to acoustic signals that the sensor subsystem 1002 recovers from non-mandrel zones of the optical fiber 1010 of FIG. 1.

The optical mandrel 1006 includes first and second fiber grips 7000 and 7002, first and second end caps 7004 and 7006, an inner conduit 7008, and outer conduit 7010, and first and second O-rings 7012 and 7014.

The first fiber grip 7000 has inner and outer ends 7016 and 7018 with respective inner and outer openings 7020 (not visible in FIGS. 7-8) and 7022 configured to receive an optical fiber (not shown in FIGS. 7-8), is made from a flexible material such as a rubber and is otherwise configured to be flexible, and is configured to prevent the optical fiber from breaking, or from otherwise becoming damaged, as the fiber transitions between a non-mandrel span and the mandrel 1006; for example, the first fiber grip 7000 can include spaced segments 7024, which increase the flexibility of the first fiber grip as compared to a segment-less fiber grip. Furthermore, the inner end 7016 is configured for attachment to the first end cap 7004; for example, the inner end can include male threads 7026 for engaging female threads (not visible in FIGS. 7-8) of the first end cap. Moreover, the inner and outer openings 7020 and 7022 are configured to make a fluid-tight, or liquid-tight, seal with the optical fiber that extends through the first and second openings. In addition, the first fiber grip 700 can have a length of approximately 1.5-2.5 inches (e.g., 2.0 inches), an inner diameter of approximately 0.1-0.2 (e.g., 0.16 inches), and an outer diameter of approximately 0.6-1.0 inches (e.g., 0.8 inches).

Similarly, the second fiber grip 7002 has inner and outer ends 7028 and 7030 with respective inner and outer openings 7032 (not visible in FIGS. 7-8) and 7034 configured to receive an optical fiber (not shown in FIGS. 7-8), is made from a flexible material such as a rubber and is otherwise configured to be flexible, and is configured to prevent the optical fiber from breaking, or from otherwise becoming damaged, as the fiber transitions between a non-mandrel span and the mandrel 1006; for example, the second fiber grip 7002 can include spaced segments 7036, which increase the flexibility of the first fiber grip as compared to a segment-less fiber grip. Furthermore, the inner end 7028 is configured for attachment to the second end cap 7006; for example, the inner end can include male threads 7038 for engaging female threads (not visible in FIGS. 7-8) of the first end cap. Moreover, the inner and outer openings 7032 and 7034 are configured to make a fluid-tight, or liquid-tight, seal with the optical fiber that extends through the first and second openings. In addition, the second fiber grip 7002 can have a length of approximately 1.5-2.5 inches (e.g., 2.0 inches), an inner diameter of approximately 0.1-0.2 (e.g., 0.16 inches), and an outer diameter of approximately 0.6-1.0 inches (e.g., 0.8 inches).

The first end cap 7004 includes an inner end 7040, which includes an inner receptacle 7042 and an outer receptacle 7044, and includes an outer end 7046. The first end cap 7004 can be formed from any suitable material such as metal, plastic, or resin. The inner receptacle 7042 is configured for attachment to an end of the inner conduit 7008; for example, the inner receptacle may include female threads configured to engage male threads on the end of the inner conduit. The outer receptacle 7044 is configured to hold the O-ring 7012 and for receiving an end of the outer conduit 7010; for example, the outer receptacle can be flanged so as to fit snugly around the end of the outer conduit, which, when installed, presses against the O-ring inside a back of the outer receptacle to provide a fluid-tight or liquid-tight seal that prevents contaminants such as dirt and water from entering the inner cavity formed by the outer conduit. The outer end 7046 is configured for receiving and attaching to the inner end 7016 of the first fiber grip 7000; for example, as described above, the outer end may include female threads configured for engaging male threads 7026 of the first fiber grip. In addition, the first end cap 7004 can have a length of approximately 2.0-3.0 inches (e.g., 2.5 inches) inner receptacle 7042 can have a diameter of approximately 0.4-0.8 inches (e.g., 0.6 inches), the outer receptacle 7044 can have a diameter of approximately 1.3-1.7 inches (e.g., 1.5 inches), and the outer end 7046 can have an inner diameter approximately equal to the diameter of the inner receptacle and can have an outer diameter of approximately 1.0-2.0 inches (e.g., 1.25 inches).

Similarly, the second end cap 7006 includes an inner end 7050, which includes an inner receptacle 7052 and an outer receptacle 7054, and includes an outer end 7056. The second end cap 7006 can be formed from any suitable material such as metal, plastic, or resin. The inner receptacle 7052 is configured for attachment to an end of the inner conduit 7008; for example, the inner receptacle may include female threads configured to engage male threads on the end of the inner conduit. The outer receptacle 7054 is configured to hold the O-ring 7014 and for receiving an end of the outer conduit 7010; for example, the outer receptacle can be flanged so as to fit snugly around the end of the outer conduit, which, when installed, presses against the O-ring inside a back of the outer receptacle to provide a fluid-tight or liquid-tight seal that prevents contaminants such as dirt and water from entering the inner cavity formed by the outer conduit. The outer end 7056 is configured for receiving and attaching to the inner end 7028 of the second fiber grip 7002; for example, as described above, the outer end may include female threads configured for engaging male threads 7038 of the second fiber grip. In addition, the second end cap 7006 can have a length of approximately 2.0-3.0 inches (e.g., 2.5 inches) inner receptacle 7052 can have a diameter of approximately 0.4-0.8 inches (e.g., 0.6 inches), the outer receptacle 7054 can have a diameter of approximately 1.3-1.7 inches (e.g., 1.5 inches), and the outer end 7056 can have an inner diameter approximately equal to the diameter of the inner receptacle and can have an outer diameter of approximately 1.0-2.0 inches (e.g., 1.25 inches).

The inner conduit 7008 is a hollow pipe nipple that includes first and second ends 7060 and 7062. The inner conduit 7008 can be made from any suitable material, such as metal or plastic. Each of the first and second ends 7060 and 7062 are configured for attachment to the inner receptacles 7042 and 7052 of the first and second end caps 7004 and 7006, respectively; for example, as described above, the first and second ends of the inner conduit 7008 can have male threads 7064 and 7066 configured to engage female threads of the inner receptacles 7042 and 7052, respectively. It is the inner conduit 7008 that couples together the first and second end caps 7004 and 7006, and, therefore, that "holds the mandrel 1006 together." The first and second ends 7060 and 7062 can be configured to make a fluid-tight or a liquid-tight seal with the inner receptacles 7042 and 7052 of the first and second end caps 7004 and 7006, respectively. Furthermore, the inner conduit 7008 can have a length of approximately 8.0-10.0 inches (e.g., 8.8 inches), an outer diameter of approximately 0.6-0.8 inches (e.g., 0.7 inches), and an inner diameter of approximately 0.5-0.7 inches (e.g., 0.6 inches).

The outer conduit 7010 is a cylinder or tube that includes first and second ends 7070 and 7072 and is the component of the mandrel 1006 about which an optical fiber (e.g., the optical fiber 1010 of FIG. 1) is wound. The outer conduit 7010 can be made from any suitable material, such as metal or plastic. And although shown as being transparent to light, the outer conduit 7010 may be opaque. Each of the first and second ends 7070 and 7072 are configured for fitting into the outer receptacles 7044 and 7054 of the first and second end caps 7004 and 7006 and pressing against the O-rings 7012 and 7014, respectively. The first and second ends 7070 and 7072, therefore, make a fluid-tight or a liquid-tight seal with the O-rings 7012 and 7014, respectively, to prevent contaminants such as water and dirt from entering the cavity formed by the outer conduit 7010. Furthermore, the outer conduit 7010 can have a length of approximately 8.0-10.0 inches (e.g., 8.8 inches), an outer diameter of approximately 1.0-2.0 inches (e.g., 1.5 inches), and an inner diameter of approximately 0.9-1.9 inches (e.g., 1.4 inches).

And the O-rings 7012 and 7014 can be conventional and made from any suitable material such as a rubber. Furthermore, each of the O-rings 7012 and 7014 can have inner and outer diameters that are approximately the same as the inner and outer diameter of the outer conduit 7010, that is, an outer of approximately 1.0-2.0 inches (e.g., 1.5 inches), and an inner diameter of approximately 0.9-1.9 inches (e.g., 1.4 inches).

FIG. 9 is a side view of the optical mandrel 1006 of FIGS. 7-8 with optical fiber 9000 installed, according to an embodiment.

FIG. 10 is a cutaway side view of the optical mandrel 1006 of FIG. 9, according to an embodiment.

Referring to FIGS. 9-10, the first end cap 7004 includes an optical-fiber path 9002 that extends from the opening 7020 of the first fiber grip 7000 to an outer perimeter 9004 of the outer receptacle 7044. The optical-fiber path 9002 provides, between the opening 7020 and the outer conduit 7010, a transition that is gradual enough so the bend(s) that the path imparts to an optical fiber within the path do not alter, at least significantly, the propagation or redirection (e.g., backscattering) properties of the fiber. The optical-fiber path 9002 may be closed like a conduit, or may be significantly wider than the optical fiber 9000 in a circumferential direction within the first end cap 7004.

Similarly, the second end cap 7006 includes an optical-fiber path 9012 that extends from the opening 7032 of the second fiber grip 7002 to an outer perimeter 9014 of the outer receptacle 7054. The optical-fiber path 9012 provides, between the opening 7032 and the outer conduit 7010, a transition that is gradual enough so the bend(s) that the path imparts to an optical fiber within the path do not alter, at least significantly, the propagation or redirection (e.g., backscattering) properties of the fiber. The optical-fiber path 9012 may be closed like a conduit, or may be significantly wider than the optical fiber 9000 in a circumferential direction within the second end cap 7006.

And the mandrel 1006 can include a covering, such as shrink wrap, over the fiber 9000 and outer conduit 7010, and optionally over other parts of the mandrel such as the end caps 7004 and 7006, to protect the mandrel and to increase coupling of an acoustic signal incident on the mandrel to the optical fiber.

Still referring to FIGS. 9-10, a method for wrapping the fiber 9000 about the mandrel is described according to an embodiment in which the fiber 9000 is integral with, that is, forms a single fiber with, the optical fiber 1010 of the optical-fiber assembly 1004 of FIG. 1, and where the optical fiber is conventionally secured to a support member 9020, which may be the same as, or similar to, the support member 2006 described above in conjunction with FIG. 2. For example purposes, the method is described where the fiber 9000 is first inserted into the opening of the first fiber grip 7000, it being understood that the method is similar where the fiber is first inserted into the opening of the second fiber grip 7002.

A person, or a machine, inserts the fiber 9000 into the outer opening 7022 of the first fiber grip 7000, through the first fiber grip, out of the inner opening 7020 of the first fiber grip, into and through the outer end 7046 of the first end cap 7004, into the optical-fiber path 9002 of the first end cap, and out of the optical fiber path at the perimeter 9004 of the outer receptacle 7044. The person or machine also inserts the support member 9020 through the first fiber grip 7000, through the first end cap 7004, the inner conduit 7008, the second end cap 7006, and the second fiber grip 7002, and out from the outer opening 7034 of the second fiber grip.

Next, the person or machine wraps the fiber 9000 around the outer surface of the outer conduit 7010 a number of times that was determined beforehand by a designer of the mandrel 1006.

Then, the person or machine inserts the end of the fiber 9000 into the end of the optical-fiber path 9012 at the perimeter 9014 of the outer receptacle 7054 of the second end cap 7006, through the optical-fiber path and out the outer end 7056 of the second end cap, into the inner opening 7032 of the second fiber grip 7002, through the second fiber grip, and out from the outer opening 7034 of the second fiber grip.

The person or machine next re-secures the optical fiber 9000 to the support member 9020.

In an alternate embodiment, the person or machine may assemble the mandrel 1006 after installing the optical fiber 9000 and support member 9020 per above.

And where the fiber 9000 is separate, and later spliced to, the optical fiber 1010 (FIG. 1) of the optical-fiber assembly 1004 (FIG. 1), or where the mandrel 1006 is installed at an end of the optical fiber, the person or machine can wind the fiber 9000 about the outer conduit 7010 before inserting either end of the fiber into the respective optical-fiber paths 9002 and 9012.

Still referring to FIGS. 9-10, a method for wrapping the fiber 9000 about the mandrel is described according to an embodiment in which the fiber 9000 (mandrel fiber) is separate from the optical fiber 1010 (non-mandrel fiber) of the optical-fiber assembly 1004 of FIG. 1, where each of the optical fibers 1010 and 9000 is coated with a respective polymer and is disposed inside of a respective rubber covering along with a respective support member 9020 of fibrous strands as described above in conjunction with FIG. 2, and where each of the fiber grips 7000 and 7002 is made from multiple (e.g., four) respective pieces.

The fiber 9000 is to be wound about the outer conduit 7010 with approximately seven hundred fifty turns.

The first fiber grip 7000 is placed over an intact end of one piece of the non-mandrel optical fiber 1010 (FIG. 1) to begin assembly of a corresponding first end of the mandrel 1006. Similarly, the second fiber grip 7002 is placed over an intact end of another piece of the non-mandrel optical fiber 1010 (the mandrel 1006 will be disposed in line with the non-mandrel fiber 1010 between the two pieces) to being assembly of a corresponding second end of the mandrel.

In this embodiment, each fiber grip 7000 and 7002 is made of four pieces. A human or machine places a segment 7024 piece of the first fiber grip 7000 onto the non-mandrel fiber end first, followed by a rubber "barrel" piece of the first fiber grip, followed by a piece of the first fiber grip with the threads 7026, followed by an O-ring (not shown in FIGS. 7-10) that goes over the threads 7026 such that the O-ring creates a liquid-tight barrier between a hexagonal wall behind the threads 7026 on which the first fiber grip sits, and the wall against which the first fiber grip effectively is forced against when the mail threads 7026 are engaged with female threads inside the outer opening 7046 of the first end cap 7004. When assembled, the rubber "barrel" fits into a compression area of the final piece mentioned, and the flexible, springy piece with the segments 7024 is threaded such that it goes over the rubber "barrel" inside the compression area. The tighter the piece with segments 7024 is tightened over the compression area, the tighter the rubber "barrel" squeezes on the rubber coating of the non-mandrel fiber optic fiber 1010 (FIG. 1). This gives a liquid-tight seal between the rubber coating of the non-mandrel optical fiber 1010 and the walls of the opening through the middle of the first fiber grip 7000. These pieces, however, are not tightened at this time, and remain "loose" (e.g., threads not fully engaged until a time as described below.

The person or machine removes the protective rubber coating (e.g., from a section of the non-mandrel fiber about fourteen inches long) from an end of the non-mandrel fiber 1010 that goes in between the mandrel 1006 and another adjacent mandrel to expose the support member 9020 (e.g., fibrous strands). The non-mandrel optical fiber is coated with a polymer that makes the outside diameter of the fiber-coating combination about 900 μm.

Next, the person or the machine pushes the end of the coated non-mandrel fiber 1010 into and through the fiber path 9002 until it exits the fiber path at perimeter 9004 of the outer receptacle 7044 of the first end cap 7004; but the person or machine need not push the entire length (e.g., fourteen inches) of the exposed section of the non-mandrel fiber through the optical-fiber path during this step.

The person or machine trims the support member 9020 of the non-mandrel fiber 1010 to approximately 0.5 inches in length from the end of the previously cut rubber fiber cover.

That is, the support member 9020 is trimmed such that about one-half inch extends out from the fiber cover.

The person or machine folds the remaining portion (e.g., one-half inch) of the support member 9020 over the threads 7026 of the first fiber grip 7000 such that the end of the previously trimmed rubber cover is not quite flush with the end of the threads 7026 (e.g., the previously cut end of the rubber cover is recessed from the inner end 7016 of the first fiber grip about 0.1 inches)). The rubber covering not being flush with the end 7016 of the first fiber grip 7000 helps to keep the non-mandrel optical fiber 1010 from becoming twisted in the next step.

After the person or machine folds the end of the support member 9020 over the threads 7026 the first fiber grip 7000, the person or machine pushes the non-mandrel fiber 1010 further through the optical-fiber path 9002 while the person or machine screws the first fiber grip 7000 into the outer end 7046 of the first end cap 7004 (thereby capturing the exposed end of the support member 9020 in between the male threads 7026 and the female threads of the inner opening 7046 of the first end cap 7004). The first fiber grip 7000 is fully engaged with the first end cap 7004 when the O-ring (not shown in FIGS. 9-10) that sits on the threads 7026 is adequately compressed between the hexagonal wall behind the threads 7026 and the outer end 7046 of the first end cap 7004. The exposed end of the support member 9020 being folded over the threads 7026, and thus being held between the threads 7026 and the threads inside the outer end 7046 of the first end cap 7004, keeps the non-mandrel fiber 1010 from pulling out of the first fiber grip 7000 and possibly allowing damage to the non-mandrel fiber. While turning the first fiber grip 7000 to engage the threads 7026 with the threads inside of the outer end 7046 of the first end cap 7004, the person or machine turn the first fiber grip in a manner such that the portion of the non-mandrel fiber 1010 inside the optical-fiber path 9002 does not kink. That is, the portion of the non-mandrel fiber 1010 inside the optical-fiber path 9002 should be turning freely with each turn of the first fiber grip 7000 while "screwing" the first fiber grip into the first end cap 7004.

After the male threads 7026 are fully engaged with the female threads inside of the outer end 7046 of the end cap 7004 (i.e., the O-ring between the first fiber grip 7000 and the first end cap is sufficiently compressed), the person or machine screws the section of the first fiber grip with the segments 7024 onto the compression area (over the rubber "barrel" and end piece of the first fiber grip) until the rubber "barrel" is snuggly squeezing the rubber coating of the non-mandrel optic fiber 1010.

The person or machine may pull the rubber cover of the non-mandrel optic fiber 1010 (FIG. 1) slightly in a direction away from the first end cap 7004 while the rubber "barrel" is being compressed onto the rubber cover. This biases the non-mandrel fiber such that if it is subsequently pulled or strained during deployment, the fiber 1010 is already stressed against the support member 9020 (being held by the first-fiber-grip threads 7026), and won't experience a sudden "jerk" (for example, imagine railroad cars spread apart (tensioned) such that when the engine takes off, it doesn't cause a series of jerks and jolts down the line of cars).

The person or machine can now strip the coating off of the portion of the non-mandrel optical fiber 1010 extending from the path 9002 at the perimeter 9004 of the inner receptacle 7044 of the first end cap 7004, and splice the end of the non-mandrel fiber to a corresponding end of the mandrel fiber 9000, which the person or machine has already wound about the outer conduit 7010 per above. The person or machine may first need to unwind about five turns of the mandrel winding 9000 at the corresponding end of the outer conduit 7010 so that there is "room" to fit the ends of the mandrel and non-mandrel fibers 9000 and 1010 into the fusion splicing machine, which splices together the ends of the mandrel and non-mandrel fibers.

After splicing the non-mandrel fiber 1010 with the mandrel fiber 9000, there is a significant amount of fiber that is now "hanging free" (i.e., it isn't wrapped around the outer conduit 7010). As the person or machine inserts the corresponding end of the outer conduit 7010 into the outer receptacle 7044 of the inner end 7040 of the first end cap 7004, he/she/it spins the outer conduit along its longitudinal axis "to take up all the slack" in the spliced optical fiber, thereby wrapping all of the fiber slack onto the outer conduit.

Next, the person or machine screws the inner conduit 7008 into the inner receptacle 7052 of the inner end 7050 of the second end cap 7006.

The person or machine repeats the above steps (but for screwing the inner conduit 7008 into the inner receptacle 7052) for the second fiber grip 7002, the second end cap 7006, the other end of the mandrel optical fiber 9000, and the end of another section of the non-mandrel optical fiber 1010 (FIG. 1) to assemble the second end of the mandrel 1006 and to splice the other end of the mandrel optical fiber to the other section of the non-mandrel optical fiber.

As the person or machine inserts the corresponding end of the outer conduit 7010 into the outer receptacle 7054 of the inner end 7050 of the second end cap 7006, and spins the outer conduit along its longitudinal axis "to take up all the slack" in the spliced optical fiber, the person or machine is also simultaneously screwing the other end of the inner conduit 7008 into the inner receptacle 7042 of the inner end 7040 of the first end cap 7004. A snug fit is achieved in all fittings, with the inner conduit 7008 securely screwed into both end caps 7004 and 7006, and the O-rings 7012 and 7014 well seated between the ends of the outer conduit 7010 and a channel or slot inside the outer receptacles 7040 and 7050 at the respective perimeters 9004 and 9014.

The person or machine rotates first and second end caps 7004 and 7006 such that the spliced fiber ends do not experience excessive strain; that is, the person or machine winds the fiber tight enough so that there are no overlapping fiber turns, but just loose enough so that the turns of the fiber can "glide" slightly over the outer conduit 7010.

Next, the person or machine applies a single, protective layer of standard electrical tape (not shown in FIGS. 7-10), with a minimum of overlap between each turn of the tape, over the entire outer conduit 7010. The purpose of this protective layer is to protect, during the next assembly step, the fragile glass optical fiber wound around the outer conduit 7010.

The person or machine then covers the mandrel 1006 with a no-heat shrink wrap (not shown in FIGS. 7-10), which is made from an expanded rubber tube that has been expanded and that is supported by a rigid, spiral, plastic member that is disposed inside of, and that extends the length of, the rubber tube. Shrinking of the wrap occurs when the person or machine pulls (e.g., rip-cord style) the rigid, spiral plastic member from the inside of the rubber tube. As the person or machine removes the internal plastic member, the shrink wrap starts to shrink around the outer conduit 7010 (and possibly other sections such as the end caps 7004 and 7006 and the fiber grips 7000 and 7002) of the mandrel 1006. The electrical tape covering the optical fiber wound around the outer conduit 7010 protects the fiber from the rigid plastic member passing over the fiber, sometimes rather vigorously.

The end result is a fluid-tight, or a liquid-tight, mandrel.

This above-described process for assembling a mandrel 1006 is repeated for every other mandrel in the optical-fiber assembly 1004 (FIG. 1).

Referring to FIGS. 7-10, alternate embodiments of the mandrel 1006 are contemplated. For example, the components of the mandrel 1006 can have any suitable dimensions other than those described above. Furthermore, the mandrel 1006 can be used with an optical fiber 9000 that is not secured to a support member 9020. Moreover, embodiments described in conjunction with FIGS. 1-6 and 11-25 may be applicable to the mandrel 1006 of FIGS. 7-10.

FIG. 11 is an isometric view of an optical mandrel 1006 of FIG. 1, according to another embodiment.

FIG. 12 is an exploded view of the optical mandrel 1006 of FIG. 11, according to an embodiment.

Referring to FIGS. 11-12, as described below, like the optical mandrel 1006 of FIGS. 7-10, the optical mandrel 1006 of FIGS. 11-12 is configured to be disposed "in-line" with the optical fiber 1010 in the optical-fiber assembly 1004 of FIG. 1, and includes optical-fiber paths (not visible in FIGS. 11-12) that are configured to bend the optical fiber gradually enough to prevent the fiber bends from changing the propagating and redirecting (e.g., backscattering) characteristics of the optical fiber as compared the redirecting characteristics of a straight span of the fiber. Furthermore, the optical mandrel 1006 is designed to amplify acoustic signals incident on the mandrel such that the acoustic signals that the electro-optic sensor subsystem 1002 of FIG. 1 recovers from the redirected optical signal are more likely to have a higher optical power and a higher SNR as compared to acoustic signals that the sensor subsystem 1002 recovers from non-mandrel zones of the optical fiber 1010 of FIG. 1.

The optical mandrel 1006 includes first and second fiber grips 11000 and 11002, first and second end caps 11004 and 11006, an inner conduit 11008, and outer conduit 11010, first and second O-rings 11012 and 11014, and third and fourth O-rings 11015 and 11017.

The first fiber grip 11000 has inner and outer ends 11016 and 11018 with respective inner and outer openings 11020 (not visible in FIGS. 11-12) and 11022 configured to receive an optical fiber (not shown in FIGS. 11-12), is made from a flexible material such as a rubber and is otherwise configured to be flexible, and is configured to prevent the optical fiber from breaking, or from otherwise becoming damaged, as the fiber transitions between a non-mandrel span and the mandrel 1006; for example, the first fiber grip 11000 can include spaced segments 11024, which increase the flexibility of the first fiber grip as compared to a segment-less fiber grip. Furthermore, the inner end 11016 is configured for attachment to the first end cap 11004; for example, the inner end can include male threads 11026 for engaging female threads (not visible in FIGS. 11-12) of the first end cap. Moreover, the inner and outer openings 11020 and 11022 are configured to make a fluid-tight, or liquid-tight, seal with the optical fiber that extends through the first and second openings. In addition, the first fiber grip 11000 can have a length of approximately 1.5-2.5 inches (e.g., 2.0 inches), an inner diameter of approximately 0.1-0.2 (e.g., 0.16 inches), and an outer diameter of approximately 0.6-1.0 inches (e.g., 0.8 inches).

Similarly, the second fiber grip 11002 has inner and outer ends 11028 and 11030 with respective inner and outer openings 11032 (not visible in FIGS. 11-12) and 11034 configured to receive an optical fiber (not shown in FIGS. 11-12), is made from a flexible material such as a rubber and is otherwise configured to be flexible, and is configured to prevent the optical fiber from breaking, or from otherwise becoming damaged, as the fiber transitions between a non-mandrel span and the mandrel 1006; for example, the second fiber grip 11002 can include spaced segments 11036, which increase the flexibility of the first fiber grip as compared to a segment-less fiber grip. Furthermore, the inner end 11028 is configured for attachment to the second end cap 11006; for example, the inner end can include male threads 11038 for engaging female threads (not visible in FIGS. 11-12) of the first end cap. Moreover, the inner and outer openings 11032 and 11034 are configured to make a fluid-tight, or liquid-tight, seal with the optical fiber that extends through the first and second openings. In addition, the second fiber grip 11002 can have a length of approximately 1.5-2.5 inches (e.g., 2.0 inches), an inner diameter of approximately 0.1-0.2 (e.g., 0.16 inches), and an outer diameter of approximately 0.6-1.0 inches (e.g., 0.8 inches).

The first end cap 11004 includes an inner end 11040, which includes an inner receptacle 11042 and an outer receptacle 11044, and includes an outer end 11046, which is a separate piece from the inner end. The first end cap 11004 can be formed from any suitable material such as metal, plastic, or resin. The inner receptacle 11042 is configured for attachment to an end of the inner conduit 11008; for example, the inner receptacle may include female threads configured to engage male threads on the end of the inner conduit. The outer receptacle 11044 is configured for receiving an end of the outer conduit 11010; for example, the outer receptacle can be flanged so as to fit snugly around the end of the outer conduit, which, when installed, presses against a back of the outer receptacle to provide a fluid-tight or liquid-tight seal that prevents contaminants such as dirt and water from entering the inner cavity formed by the outer conduit. The outer end 11046 is configured for receiving and attaching to the inner end 11016 of the first fiber grip 11000; for example, as described above, the outer end may include female threads configured for engaging male threads 11026 of the first fiber grip. The inner end 11040 is configured to fit into, and attach to, the outer end 11046; for example, the inner and outer ends may include male and female threads, respectively, such that the inner end screws into the outer end. The O-rings 11012 and 11015 are configured to form seals between the abutting surfaces of the connected inner and outer ends 11040 and 11046 of the first end cap 11004. In addition, the first end cap 11004 can have a length of approximately 2.0-3.0 inches (e.g., 2.5 inches), the inner receptacle 11042 can have a diameter of approximately 0.4-0.8 inches (e.g., 0.6 inches), the outer receptacle 11044 can have a diameter of approximately 1.3-1.7 inches (e.g., 1.5 inches), and the outer end 11046 can have an inner diameter approximately equal to the diameter of the inner receptacle and can have an outer diameter of approximately 1.0-2.0 inches (e.g., 1.25 inches).

Similarly, the second end cap 11006 includes an inner end 11050, which includes an inner receptacle 11052 and an outer receptacle 7054, and includes an outer end 11056. The second end cap 11006 can be formed from any suitable material such as metal, plastic, or resin. The inner receptacle 11052 is configured for attachment to an end of the inner conduit 11008; for example, the inner receptacle may include female threads configured to engage male threads on the end of the inner conduit. The outer receptacle 11054 is configured for receiving an end of the outer conduit 11010; for example, the outer receptacle can be flanged so as to fit snugly around the end of the outer conduit, which, when installed, presses against the back of the outer receptacle to provide a fluid-tight or liquid-tight seal that prevents contaminants such as dirt and water from entering the inner cavity formed by the outer conduit. The outer end 11056 is configured for receiving and attaching to the inner end 11028 of the second fiber grip 11002; for example, as described above, the outer end may include female threads configured for engaging male threads 11038 of the second fiber grip. The inner end 11050 is configured to fit into, and attach to, the outer end 11056; for example, the inner and outer ends may include male and female threads, respectively, such that the inner end screws into the outer end. The O-rings 11014 and 11017 are configured to form seals between the abutting surfaces of the connected inner and outer ends 11050 and 11056 of the second end cap 11006. In addition, the second end cap 11006 can have a length of approximately 2.0-3.0 inches (e.g., 2.5 inches), the inner receptacle 11052 can have a diameter of approximately 0.4-0.8 inches (e.g., 0.6 inches), the outer receptacle 11054 can have a diameter of approximately 1.3-1.7 inches (e.g., 1.5 inches), and the outer end 11056 can have an inner diameter approximately equal to the diameter of the inner receptacle and can have an outer diameter of approximately 1.0-2.0 inches (e.g., 1.25 inches).

The inner conduit 11008 is a hollow pipe nipple that includes first and second ends 11060 and 11062. The inner conduit 11008 can be made from any suitable material, such as metal or plastic. Each of the first and second ends 11060 and 11062 are configured for attachment to the inner receptacles 11042 and 11052 of the first and second end caps 11004 and 11006, respectively; for example, as described above, the first and second ends of the inner conduit 11008 can have male threads 11064 and 11066 configured to engage female threads of the inner receptacles 11042 and 11052, respectively. It is the inner conduit 11008 that couples together the first and second end caps 11004 and 11006, and, therefore, that "holds the mandrel 1006 together." The first and second ends 11060 and 11062 can be configured to make a fluid-tight or a liquid-tight seal with the inner receptacles 11042 and 11052 of the first and second end caps 11004 and 11006, respectively. Furthermore, the inner conduit 11008 can have a length of approximately 8.0-10.0 inches (e.g., 8.8 inches), an outer diameter of approximately 0.6-0.8 inches (e.g., 0.7 inches), and an inner diameter of approximately 0.5-0.7 inches (e.g., 0.6 inches).

The outer conduit 11010 is a cylinder or tube that includes first and second ends 11070 and 11072 and is the component of the mandrel 1006 about which an optical fiber (e.g., the optical fiber 1010 of FIG. 1) is wound. The outer conduit 11010 can be made from any suitable material, such as metal or plastic. And although shown as being transparent to light, the outer conduit 11010 may be opaque. Each of the first and second ends 11070 and 11072 are configured for fitting into the outer receptacles 11044 and 11054 of the first and second end caps 11004 and 11006 and pressing against the backs of the outer receptacles, respectively. The first and second ends 11070 and 11072, therefore, make respective fluid-tight or liquid-tight seals with the backs of the outer receptacles 11044 and 11054, respectively, to prevent contaminants such as water and dirt from entering the cavity formed by the outer conduit 11010. Alternatively, O-rings, or other sealing members (not shown in FIGS. 11-12), may be disposed between the ends 11070 and 11072 and the backs of the outer receptacles 11044 and 11054 to assist in forming respective fluid-tight or liquid-tight seals. Furthermore, the outer conduit 11010 can have a length of approximately 8.0-10.0 inches (e.g., 8.8 inches), an outer diameter of approximately 1.0-2.0 inches (e.g., 1.5 inches), and an inner diameter of approximately 0.9-1.9 inches (e.g., 1.4 inches).

And the O-rings 11012, 11014, 11015, and 11017 can be conventional and made from any suitable material such as a rubber. Furthermore, each of the O-rings 11012, 11014, 11015, and 11017 can have inner and outer diameters that are approximately the same as the inner and outer diameter of the outer conduit 11010, that is, an outer of approximately 1.0-2.0 inches (e.g., 1.5 inches), and an inner diameter of approximately 0.9-1.9 inches (e.g., 1.4 inches).

Figure 13:
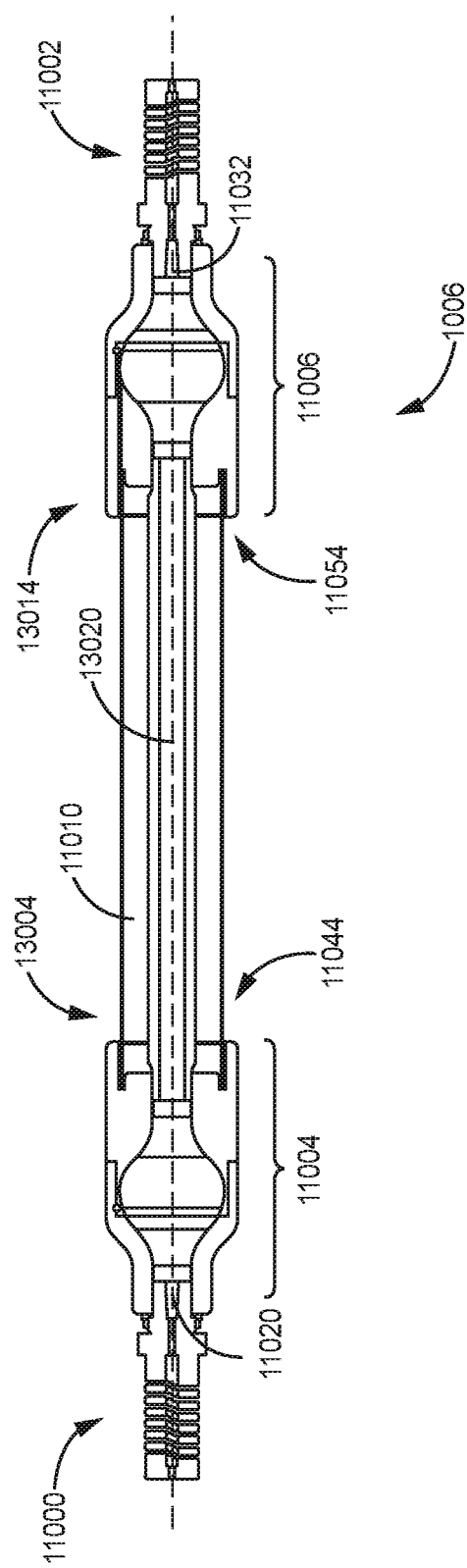
FIG. 13 is a cutaway side view of the optical mandrel of FIGS. 11-12 with optical fiber installed, according to an embodiment.

FIG. 13 is a cutaway side view of the optical mandrel 11006 of FIGS. 11-12 with optical fiber 13000 installed, according to an embodiment.

Figure 14:
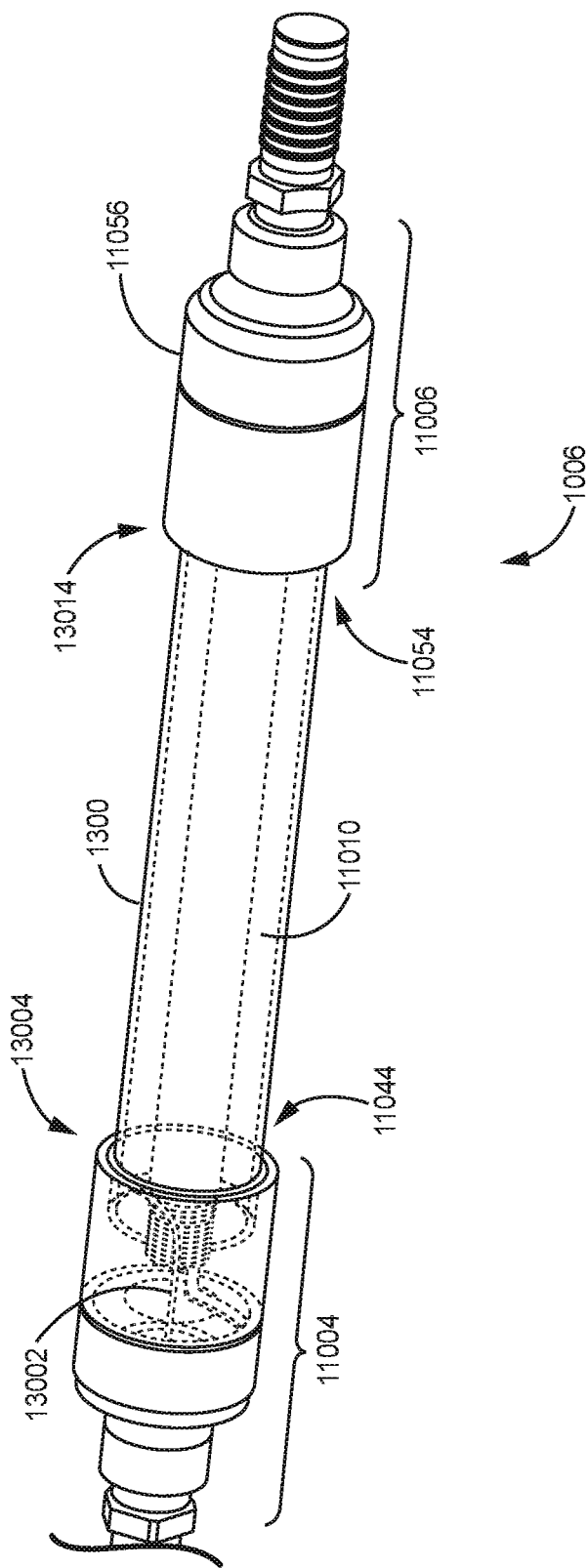
FIG. 14 is an isometric view of the optical mandrel of FIGS. 11-13 with portions transparent, according to an embodiment.
Figure 15:
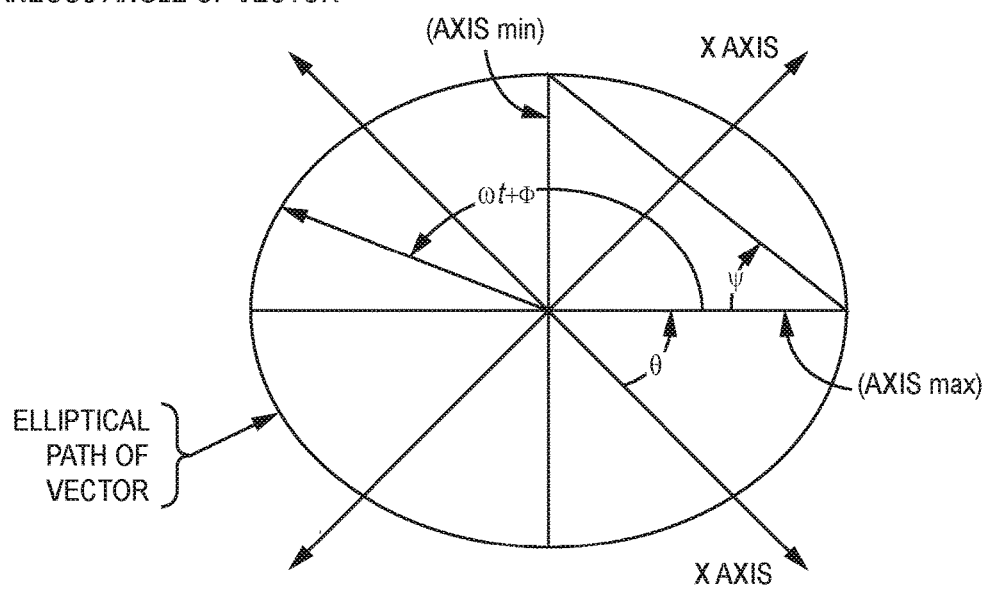
FIG. 15 is a graphical depiction of certain underlying physical mechanisms of optical-signal polarizations.

FIG. 14 is an isometric view of the optical mandrel 1006 of FIGS. 11-13 with portions transparent, according to an embodiment.

Referring to FIGS. 13-14, the first end cap 11004 includes an optical-fiber path 13002 that extends from the opening 11020 (FIGS. 11-12) of the first fiber grip 11000 to an outer perimeter 13004 of the outer receptacle 11044. The optical-fiber path 13002 provides, between the opening 11020 and the outer conduit 11010, a transition that is gradual enough so the bend(s) that the path imparts to an optical fiber within the path do not alter, at least significantly, the propagation or redirection (e.g., backscattering) properties of the fiber. The optical-fiber path 13002 may be closed like a conduit, or may be significantly wider than the optical fiber 13000 in a circumferential direction within the first end cap 11004.

Similarly, the second end cap 11006 includes an optical-fiber path (not visible in FIGS. 13-14) that extends from the opening 11032 of the second fiber grip 11002 to an outer perimeter 13014 of the outer receptacle 11054. The optical-fiber path of the second end cap 11006 provides, between the opening 11032 and the outer conduit 11010, a transition that is gradual enough so the bend(s) that the path imparts to an optical fiber within the path do not alter, at least significantly, the propagation or redirection (e.g., backscattering) properties of the fiber. The optical-fiber path may be closed like a conduit, or may be significantly wider than the optical fiber 13000 in a circumferential direction within the second end cap 11006.

And the mandrel 1006 can include a covering (not shown in FIGS. 13-14), such as shrink wrap, over the fiber 13000 and outer conduit 11010, and optionally over other parts of the mandrel such as the end caps 11004 and 11006, to protect the mandrel and to increase coupling of an acoustic signal incident on the mandrel to the optical fiber.

Still referring to FIGS. 13-14, a method for wrapping the fiber 13000 about the mandrel 1006 is described according to an embodiment in which the fiber 13000 is integral with, that is, forms a single fiber with, the optical fiber 1010 of the optical-fiber assembly 1004 of FIG. 1, and where the optical fiber is conventionally secured to a support member 13020. For example purposes, the method is describe where the fiber 13000 is first inserted into the opening of the first fiber grip 11000, it being understood that the method is similar where the fiber is first inserted into the opening of the second fiber grip 11002.

A person, or a machine, inserts the fiber 13000 into the outer opening 11022 of the first fiber grip 11000, through the first fiber grip, out of the inner opening 11020 of the first fiber grip, into and through the outer end 11046 of the first end cap 11004, into the optical-fiber path 13002 of the first end cap, and out of the optical fiber path at the perimeter 13004 of the outer receptacle 11044. The person or machine also inserts the support member 13020 through the first fiber grip 11000, through the first end cap 11004, the inner conduit 11008, the second end cap 11006, and the second fiber grip 11002, and out from the outer opening 11034 of the second fiber grip.

Next, the person or machine wraps the fiber 13000 around the outer surface of the outer conduit 11010 a number of times that was determined beforehand by a designer of the mandrel 1006.

Then, the person or machine inserts the end of the fiber 13000 into the end of the optical-fiber path (not visible in FIGS. 13-14) of the second end cap 11006 at the perimeter 13014 of the outer receptacle 11054 of the second end cap, through the optical-fiber path and out the outer end 11056 of the second end cap, into the inner opening 11032 of the second fiber grip 11002, through the second fiber grip, and out from the outer opening 11034 of the second fiber grip.

The person or machine next re-secures the optical fiber 13000 to the support member 13020 adjacent to the second fiber grip 11002.

In an alternate embodiment, the person or machine may assembly the mandrel 1006 after installing the optical fiber 13000 and support member 13020 per above.

And where the fiber 13000 is separate, and later spliced to, the optical fiber 1010 (FIG. 1) of the optical-fiber assembly 1004 (FIG. 1), or where the mandrel 1006 is installed at an end of the optical fiber, the person or machine can wind the fiber 13000 about the outer conduit 11010 before inserting either end of the fiber into the respective optical-fiber path 13002 of the first end cap 11004 and the optical fiber path (not visible in FIGS. 13-14) of the second end cap 11006.

Referring to FIGS. 11-14, alternate embodiments of the mandrel 1006 are contemplated. For example, the components of the mandrel 1006 can have any suitable dimensions other than those described above. Furthermore, the mandrel 1006 can be used with an optical fiber 13000 that is not secured to a support member 13020. Moreover, embodiments described in conjunction with FIGS. 1-10 and 15-25 may be applicable to the mandrel 1006 of FIGS. 11-14.

Description of Underlying Theories
Heterodyne Optical Detection

Optical receivers are built around photodetectors which detect optical power rather than instantaneous electric field. Typically, the photodetector output current is proportional to the incident optical power. This relationship severely limits the dynamic range of an incoherent optical receiver because for every decibel of optical power lost in a receiver system two decibels of receiver output current is lost. The square law characteristics of photodetectors limits typical incoherent optical receivers (often called video detection receivers) to dynamic ranges of less than 80 dB and optical detection noise floors to greater than −80 dBm per Hertz bandwidth. As illustration, suppose an electric field $E_s(t)$ [volt/meter] immersed in a material of impedance $\eta$ [Ohms] impinges upon a photodetector of responsivity R [ampere/watt] loaded by resistor $R_1$ and amplified by amplification A, then the optical power $P_s$ by amplification A, is:

$$P_S(t) = \frac{\langle \vec{E}_S(t) \cdot \vec{E}_S(t) \rangle}{\eta} \quad (1)$$

The photodetector output current [amperes] is:

$$i(t) = \Re P_S(t) \quad (2)$$

The photoreceiver output [volts] is thus:

$$v(t) = AR_L i(t) = AR_L \Re P_{S(t)} \quad (3)$$

The output fades only if the optical signal power goes to zero because the vector dot product of an optical signal against itself has no polarization or phase effects. This lack of fading due to polarization or phase comes at a cost: phase information is lost and signal to noise ratios are severely impacted.

A coherent optical receiver takes advantage of the square law characteristics of photodetectors. A coherent optical receiver combines two optical beams, a signal and a local oscillator, together to form an interference. The interference between these optical waves produces a "beat" which allows the measurement of the phase difference between the signal and the local oscillator. This interference produces an amplitude, polarization, and phase sensitive receiver output. In order to consider these effects a discussion of the polarization state of plane waves is in order. A plane wave contains two orthogonal vector components which are also orthogonal to the direction of propagation of the wave. For purposes of discussion we will consider the plane wave to be oriented so that the vector components of the electromagnetic field lie in an X-Y plane and that the wave propagates in the Z direction. However, this choice of axes is completely arbitrary. In practice, the wave can be oriented in any propagation direction. In order to simplify discussions, a simple change of coordinates will make this discussion completely general.

The polarization of an electromagnetic (or optical) plane wave, p, is described by a minimum of five parameters. There are two basic ways of specifying these parameters. The first way leads to a description which is oriented towards that which is directly obtained from physical measurements.

$$\vec{E}(E_{px}, E_{py}, \Phi_{px}, \Phi_{py}, \omega_p, t) = \begin{bmatrix} E_{px}(t)\cos(\omega_p t + \Phi_{px}) \\ E_{py}(t)\cos(\omega_p t + \Phi_{py}) \end{bmatrix} \quad (4)$$

The second manner of describing the polarization state of a wave, p, is oriented more towards the underlying physical mechanisms of polarization. See FIG. 15. The description is made in terms of spatial and temporal parameters:

$$\vec{E}_p(E_p, \theta_p, \psi_p, \phi_p, \omega_p, t) = \quad (5)$$
$$E_p(t) \begin{bmatrix} \cos(\theta_p) & \sin(\theta_p) \\ -\sin(\theta_p) & \cos(\theta_p) \end{bmatrix} \begin{bmatrix} \cos(\psi_p) & 0 \\ 0 & \sin(\psi_p) \end{bmatrix} \begin{bmatrix} \cos(\omega_p t + \phi_p) \\ \sin(\omega_p t + \phi_p) \end{bmatrix}$$

Alternatively, dropping the full variable list in the parentheses and expanding:

$$\vec{E}_p(t) = \begin{matrix} E_p(t) \begin{bmatrix} \cos(\theta_p) & \sin(\theta_p) \\ -\sin(\theta_p) & \cos(\theta_p) \end{bmatrix} \begin{bmatrix} \cos(\psi_p) & 0 \\ 0 & \sin(\psi_p) \end{bmatrix} \\ \begin{bmatrix} \cos(\theta_p) & -\sin(\theta_p) \\ \sin(\theta_p) & \cos(\theta_p) \end{bmatrix} \begin{bmatrix} \cos(\omega_p t) \\ \sin(\omega_p t) \end{bmatrix} \end{matrix} \quad (6)$$

If Ep is constant, the electrical power of this wave can be shown to be constant and equal to:

$$P_p(t) = \frac{\langle \vec{E}_p(t) \cdot \vec{E}_p(t) \rangle}{\eta} = \frac{E_p^2}{2\eta} \quad (7)$$

When two waves, S (signal) and L (local oscillator), interfere at the input of a photoreceiver, the output is:

$$V_{out}(t) = \tag{8}$$

$$AR_L i(t) = AR_L \Re \frac{\langle \vec{E}_S(t) \cdot \vec{E}_S(t) + \vec{E}_L(t) \cdot \vec{E}_L(t) + 2\vec{E}_L(t) \cdot \vec{E}_S(t) \rangle}{\eta}$$

$$V_{out}(t) = V_L(t) + V_S(t) + V_{LS}(t) = AR_L \Re (P_L(t) + P_S(t) + P_{LS}(t))$$

If the optical power of the local oscillator and signal light waves remain constant, a constant photocurrent develops for the self-interference terms ($P_S$ and $P_L$). However, if either the local oscillator or the signal light waves have any temporal variation in polarization or phase, the cross-interference term ($P_{LS}$) will be time dependent even if the power of each light wave remains constant. Solving for the cross-interference term, we obtain:

$$v_{LS}(t) = \frac{AR_L \Re}{\eta} E_L(t) E_S(t) \begin{bmatrix} \cos(\Delta\theta)\cos(\Delta\psi)\cos(\Delta\omega t + \Delta\phi) \\ + \sin(\Delta\theta)\sin(2\bar{\psi})\sin(\Delta\omega t + \Delta\phi) \end{bmatrix} \tag{9}$$

$$v_{LS}(t) = 2AR_L \Re \sqrt{P_L(t) P_S(t)} \begin{bmatrix} \cos(\Delta\theta)\cos(\Delta\psi)\cos(\Delta\omega t + \Delta\phi) + \\ \sin(\Delta\theta)\sin(2\bar{\psi})\sin(\Delta\omega t + \Delta\phi) \end{bmatrix}$$

Where the following definitions are made:

$\Delta\theta = \theta_S - \theta_L$ $\Delta_\psi = \psi_S - \psi_L$ $2\bar{\psi} = \psi_S + \psi_L$ $\Delta\omega = \omega_S - \omega_L$ $\Delta\phi = \phi_S - \phi_L \tag{10}$ The optical cross-interference portion of the receiver output will fade due to polarization even if the local oscillator and the signal light waves both do not have zero optical powers. This condition will occur if:

$$0 = \cos(\Delta\theta)\cos(\Delta\psi)\cos(\Delta\omega t + \Delta\phi) = \sin(\Delta\theta)\sin(2\bar{\psi})\sin(\Delta\omega t + \Delta\Phi) \tag{11}$$

Also, equivalently when the condition will occur:

$$\begin{bmatrix} 0 \\ 0 \end{bmatrix} = \begin{bmatrix} \cos(\Delta\theta)\cos(\Delta\psi)\cos(\Delta\omega t + \Delta\phi) \\ \sin(\Delta\theta)\sin(2\bar{\psi})\sin(\Delta\omega t + \Delta\phi) \end{bmatrix} \tag{12}$$

When heterodyne optical detection is employed ($\Delta\omega$ is non-zero, the local oscillator has a different frequency from the signal), the conditions for a fade are shown in Table 1. When homodyne detection is employed ($\Delta\omega$ is zero), both phase and polarization fading occur. The conditions for a homodyne fade are shown in Table 2. Heterodyne detection is, therefore, seen to be superior to homodyne because the probability of a fade is fully one half as likely.

TABLE 1

Heterodyne Fading Conditions

| Type of Face (k is an integer) | Required Simultaneous Conditions for a Fade to Occur | |
|---|---|---|
| Orthogonal Rotation and Opposite Ellipticity | $\Delta\sigma = (2k+1)\pi/2$ | $\Psi_S + \Psi_L = 0$ |

TABLE 1-continued

Heterodyne Fading Conditions

| Type of Face (k is an integer) | Required Simultaneous Conditions for a Fade to Occur | |
|---|---|---|
| Orthogonal Rotation and Equal Circular Ellipticity | $\Delta\sigma = (2k+1)\pi/2$ | $\Psi_S + \Psi_L \pm \pi$ |
| Equal Rotation and Orthogonal Ellipticity | $\Delta\sigma = 0$ | $\Delta\Psi = \pm \pi/2$ |
| Opposite Rotation and Orthogonal Ellipticity | $\Delta\sigma = \pm \pi$ | $\Delta\Psi = \pm \pi/2$ |

TABLE 2

Homodyne Fading Conditions

| Type of Face (k and m are integers) | Required Simultaneous Conditions for a Fade to Occur | |
|---|---|---|
| Orthogonal Rotation and Opposite Ellipticity | $\Delta\sigma = (2k+1)\pi/2$ | $\Psi_S + \Psi_L = 0$ |
| Orthogonal Rotation and Equal Circular Ellipticity | $\Delta\sigma = (2k+1)\pi/2$ | $\Psi_S + \Psi_L \pm \pi$ |
| Equal or Opposite Rotation and Orthogonal Ellipticity | $\Delta\sigma = k\pi$ | $\Delta\Psi = \pm \pi/2$ |
| Opposite Rotation and Equal or Opposite Phase | $\Delta\sigma = (2k+1)\pi/2$ | $\Delta\phi = m\pi$ |

Given the conditions for and the functional relation of a fade, the question now arises as to how a fade can be prevented. Since the signal is being measured, no a prior knowledge is assumed and therefore $E_S$, $\theta_S$, $\Psi_S$, $\Phi_S$ are all probably unknown quantities. If fading is prevented, then no loss of information occurs and determination of these four parameters is possible. In order to decode the optical receiver output into these parameters, at least four independent measurements must be made to uniquely determine these four independent variables. However, if the interfering optical beam (or beams) of the local oscillator are unknown, then additional independent measurements are made (four additional measurements for each unknown beam) to determine the $E_L$, $\theta_L$, $\Psi_L$, $\Phi_L$ for each optical beam of the local oscillator. The cross-reference output of the photoreceiver, $V_{LS}(t)$, offers a means by which to measure these parameters. If the parameters cannot be determined from this output, then an optical fade cannot be ruled out.

We shall now examine the information which can be gleaned from this output. Define the following functions.

$$v_I(E_L, E_S, \Delta\theta, \Delta_\psi) = \frac{AR_L \Re}{2\eta} E_L(t) E_S(t) \cos(\Delta\theta)\cos(\Delta\psi) = \tag{13}$$

$$AR_L \Re \sqrt{P_L(t) P_S(t)} \cos(\Delta\theta)\cos(\Delta\psi)$$

$$v_Q(E_L, E_S, \Delta\theta, 2\bar{\psi}) = \frac{AR_L \Re}{2\eta} E_L(t) E_S(t) \sin(\Delta\theta)\sin(2\bar{\psi}) =$$

$$AR_L \Re \sqrt{P_L(t) P_S(t)} \sin(\Delta\theta)\sin(2\bar{\psi})$$

In the homodyne case ($\Delta\omega$ is zero), we obtain the following output:

$$v_{LS}(t) = 2AR_L \Re \sqrt{P_L(t) P_S(t)} (\cos(\Delta\theta)\cos(\Delta\psi)\cos(\Delta\phi) + \sin(\Delta\theta)\sin(2\bar{\psi})\sin(\Delta\phi))$$

$$v_{LS}(t) = 2v_I(E_L, E_S, \Delta\theta, \Delta\psi)\cos(\Delta\phi) + 2v_Q(E_L, E_S, \Delta\theta, 2\bar{\psi})\sin(\Delta\phi) \tag{14}$$

The homodyne output only allows the measurement of one quantity. The output provides only one independent measurement (one equation) whereas a minimum of four are typically required. In the heterodyne case (Δω is non-zero), the output is:

$$v_{LS}(t) = 2AR_L\Re \sqrt{P_L(t)P_S(t)} \begin{pmatrix} \cos(\Delta\theta)\cos(\Delta\psi)\cos(\Delta\omega t + \Delta\phi) + \\ \sin(\Delta\theta)\sin(2\overline{\psi})\sin(\Delta\omega t + \Delta\phi) \end{pmatrix}$$ (15)

$$v_{LS}(t) = \frac{AR_L\Re}{2\eta} E_L(t)E_S(t)\begin{pmatrix} \cos(\Delta\theta)\cos(\Delta\psi)\cos(\Delta\omega t + \Delta\phi) + \\ \sin(\Delta\theta)\sin(2\overline{\psi})\sin(\Delta\omega t + \Delta\phi) \end{pmatrix}$$

$$v_{LS}(t) = 2v_I(E_L, E_S, \Delta\theta, \Delta\psi)\cos(\Delta\omega t + \Delta\phi) +$$
$$2v_Q(E_L, E_S, \Delta\theta, 2\overline{\psi})\sin(\Delta\omega t + \Delta\phi)$$

Since sine and cosine waves are orthogonal, the heterodyne receiver provides two independent measurements by mixing down to baseband the Δω radian frequency components. Thus, two outputs are obtained:

$$V_I(t) \leq v_{LS}(t)\cos(\Delta\omega t) \geq v_I(E_L(t), E_S(t), \Delta\theta(t), \Delta\psi(t))\cos(\Delta\phi(t))$$

$$V_Q(t) \leq v_{LS}(t)\sin(\Delta\omega t) \geq v_Q(E_L(t), E_S(t), \Delta\theta(t), 2\overline{\psi}(t))\sin(\Delta\phi(t))$$ (16)

Correlation or Time-Delay Multiplexing

In many optical sensor applications, the light-wave signal heterodyne-detected by the photodetector system is a composite optical signal formed from the superposition of many individual optical signals. When the receiver light wave (redirected optical signal) is generated by backscatter (of the source optical signal), the redirected optical signal is the composite, or superposition, of individual light signals generated by a continuum of reflections (redirections) of an interrogation (source) light signal. The temporal and spatial characteristics of each reflector or reflective region in the optical fiber creates a modulation of the source optical signal. The time-delay, amplitude, polarization and phase states control the backscattered-modulation of these individual optical signals arriving at the photodetector with a unique time-delay interval such that these individual optical signals can be separated into channels that sort these redirected optical signals, or components of the redirected optical signal, into time-delay slots or bins. Depending upon how the signals are generated, these channels can represent spatial regions in space or time-delay slots of a time-domain reflectometer mechanism such as an optical fiber.

Let an interrogation light wave source be generated by modulating the amplitude, phase or polarization of a coherent light wave with a time-structured correlation code, c(t). The correlation code, c(t) can be a series of pulses, chirps, binary sequences or any other type of code which provides the required correlation characteristics. If the light-wave source is:

$$E_{SS}(t) = E_{SS}\cos(\omega_S t)$$ (17)

Then an amplitude modulated interrogation source is:

$$E_i(t) = \mu_A c(t)E_{ss}\cos(\omega_s t)$$ (18)

Alternatively, a phase modulated interrogation source is:

$$E_i(t) = E_{SS}\cos(\omega_S t + \mu_P c(t))$$ (19)

If c(t) is chosen to be temporally structured properly, then:

$$R_i(\tau) = \langle E_i(t)E_i(t+\tau) \rangle \approx \begin{cases} \frac{E_{SS}^2}{2}; t \approx 0 \\ 0; \end{cases}$$ (20)

Otherwise, c(t) is typically chosen so that an a priori decoding/demultiplexing function, d(t), exists such that:

$$b(t, \tau) = \langle d(t)E_i(T+\tau) \rangle \approx \begin{cases} \xi E_{SS}\cos(\Delta\omega t + \phi); \tau \approx 0 \\ 0 \end{cases};$$

otherwise

For instance, suppose the interrogation wave is:

$$E_i(t) = \mu_A c(t)E_{SS}\cos(\omega_S t)$$ (22)

and:

$$R_c(\tau) = \langle c(t)c(t-\tau) \rangle \approx \begin{cases} 1; \tau \approx 0 \\ 0; \tau \neq 0 \end{cases}$$ (23)

then a valid decoding and temporal and spatial domains demultiplexing function is:

$$d(t) = \mu_d C(t)E_L\cos((\Delta\omega + \omega_S)t + \phi)$$ (24)

$$b(t, \tau) =$$

$$\langle d(t-\tau)E_i(t) \rangle = \begin{cases} \frac{\mu_d\mu_a E_{SS}E_L}{2}\cos(\Delta\omega(t-\tau) + \phi - \omega_S\tau); \\ 0; \text{ otherwise} \end{cases}$$

$$\tau = 0$$

Therefore, delaying the correlation decoding/demultiplexing function d(t) allows demultiplexing of delay multiplexed signals identifiable by speed of propagation and distance of flyback travel. Suppose an optical wave is formed from a summation of delayed signals modulated onto the interrogation wave $E_i(t)$, then the received wave, $E_b(t)$, is:

$$E_b(t) = \Sigma_{n=1}^N A_n(t-\tau_n)\mu_A c(t-\tau_n)E_{SS}\cos(\omega_S(t-\tau_n)+\Phi_n(t-\tau_n))$$ (25)

Then multiplying by the decoding/demultiplexing function, $d(t-\tau_m)$, we obtain:

$$d(t) = \mu_d c(t)E_L\cos((\Delta\omega + \omega_S)t + \phi)$$ (26)

$$b(t, \tau_m) = \langle d(t-\tau_m)E_b(t) \rangle$$

$$b(t, \tau_m) \approx$$

$$\frac{\mu_d\mu_A E_{SS}E_L}{2}A_m(t-\tau_m)\cos(\Delta\omega(t-\tau_m) + \phi - \omega_S\tau_m + \Phi_m(t-\tau_m))$$

Because $\tau_m$ is unique, the amplitude signal $A_m(t-\tau_m)$ and the phase signal $\Phi_m(t-\tau_m)$ are both extracted from $E_b(t)$ by multiplying by the decoding/demultiplexing function, $d(t-\tau_m)$. The technique is applicable to a wide variety of other optical-signal multiplexing applications. Specifically, the technique can be used to spatially separate optical signals arriving from a temporally varying time-domain-reflectometer optical-backscatter process from an array of fiber-optic acoustic sensors.

Figure 16:
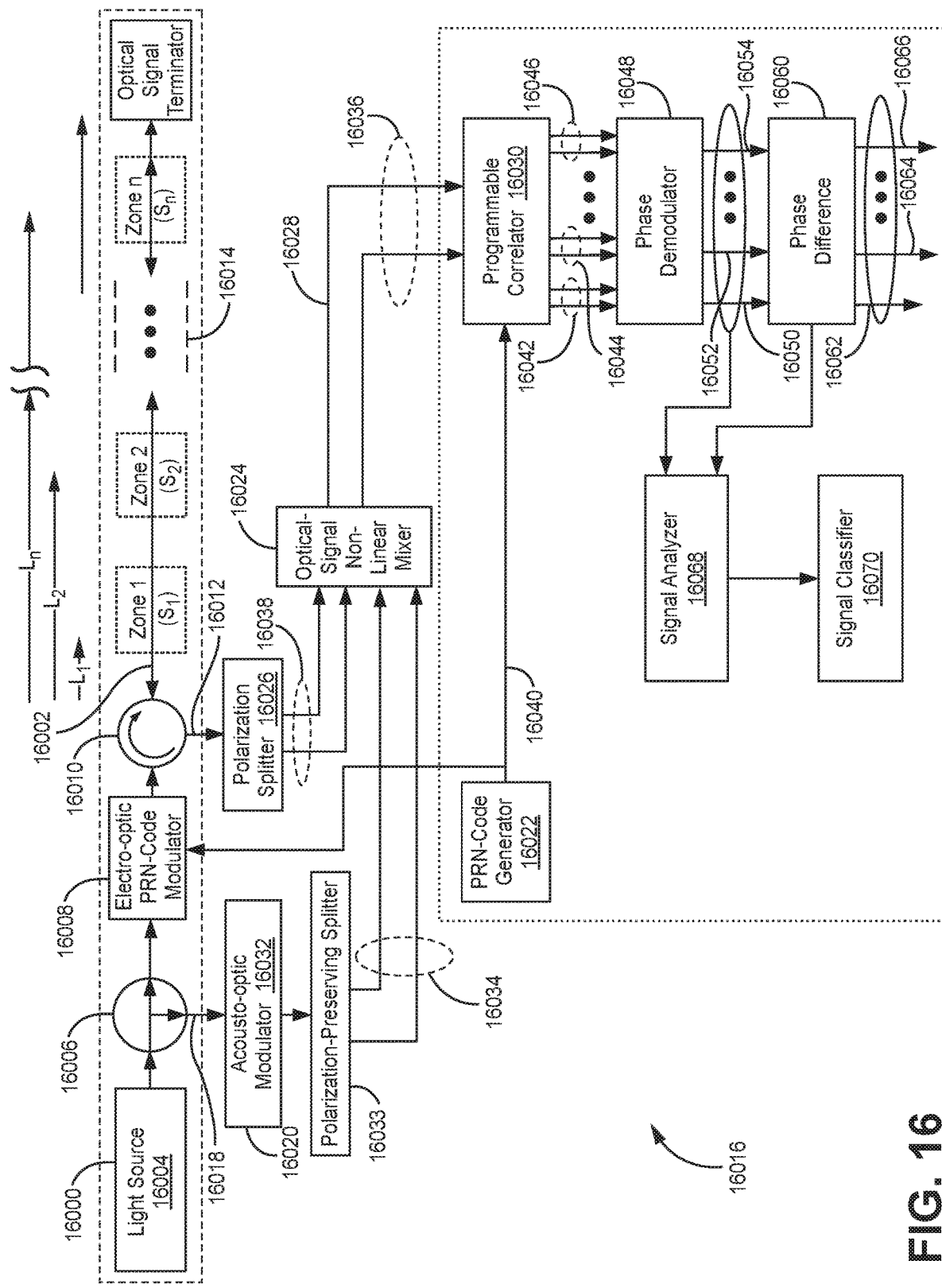
FIG. 16 is a diagram of a system configured to detect an acoustic signal incident on one or more zones of an optical-fiber assembly, and of the optical-fiber assembly, according to an embodiment.

Description and Operation of the Rayleigh Optical Scattering and Encoding (ROSE) System ROSE Optical Phase Sensor Interrogation Enables Sensor Subsystem In order to more fully describe the capabilities and features of techniques and systems disclosed herein, the application of a system to a subsystem 16000, FIG. 16, of ROSE which launches an interrogation signal onto fiber span 16002 and retrieves light-wave back propagation (a redirected optical signal) from a continuum of locations along the span. Back propagation mechanisms may include Rayleigh Optical Scattering (ROS) and other effects generated within the optical fiber. Rayleigh Optical Scattering (ROS) in an optical fiber backscatters light incident upon the fiber. The incident light transverses down the optical fiber to the scattering point/region. At the scattering region the incident light is backscattered back up the optical fiber. As the light transverses the round-trip optical path (i.e., distance of flyback travel), any disturbance of the fiber which increase or decrease the optical path length will cause the phase of the incident and backscattered light to be modulated. Suppose a pressure is applied to the optical fiber. The pressure elongates the path length of the light traversing the region.

Refer to FIG. 16 for the following discussion. In the FIGS. like parts correspond to like numbers. Let $p(t, z)$ be pressure applied to the outside of the optical fiber at time, t, and at point or length, z, along the fiber axis. Then, if an interrogation optical wave (source optical signal), $E_i(t)$, generated by a light source (e.g., a laser) 16004, passed through a polarization-preserving optical coupler 16006 and modulated by optical modulator 16008 is applied to optical coupler 16010, this results in the following output interrogation wave, $E_i(t)$, being transmitted down the fiber 16002:

$$E_i(t) = \mu_A c(t) E_{ss} \cos(\omega_S t) \quad (27)$$

The backscattered wave, $E_b(t)$, arriving back at the optical coupler 16010 from ROSE fiber optic array 16002 passes into an optical path 16012. The backscattered light (redirected optical signal) that arrives at optical path 16012 is the summation of all light backscattered from a continuum of locations (components of the redirected optical signal) along the length of the ROSE fiber optic span 16002. As will later herein be described in detail, fiber 16002 has a longitudinal strain component enhancing coating 16014. If $r(z)$ is the reflection density at point or length z along the fiber and $c_L$ is the optical-wave speed within the fiber, then the backscattered light after a pressure $p(t, z)$ is applied to fiber is represented mathematically as:

$$E_b(t) = \int_0^\infty r(\hat{z}(t,z))\mu_A c\left(t - \frac{2\hat{z}(t,z)}{c_L}\right) E_{SS} \cos\left(\omega_S\left(t - \frac{2\hat{z}(t,z)}{c_L}\right)\right) dz \quad (28)$$

where:

$$\hat{z}(t, z) = z + \mu_L \int_0^z p(t, x) dx \quad (29)$$

If the distributed reflection, $r(z)$, is essentially independent of the applied pressure, $p(t, z)$, then the backscatter is:

$$E_b(t) = \int_0^\infty r(z)\mu_A c\left(t - \frac{2\hat{z}(t,z)}{c_L}\right) E_{SS} \cos\left(\omega_S\left(t - \frac{2\hat{z}(t,z)}{c_L}\right)\right) dz. \quad (30)$$

Since optical path length change caused by the applied pressure, $p(t, z)$ is usually extremely small (on the order of $10^{-6}$ to $10^1$ times an optical wavelength), the backscattered light from each z distance down the fiber arrives at the optical path 16012 with a transversal delay, $\tau(t, z)$, equal to:

$$\tau(t, z) \approx \frac{2z}{c_L} \quad (31)$$

Therefore, to receive the signal $S_1$ backscattered from the fiber region at length-down-the-fiber $z=L_1$, the correlational multiplexing characteristic of the transmitted interrogation light (source optical signal) can be utilized. Multiplication of the total backscattered optical signal (redirected optical signal) by the correlation decoding/demultiplexing function, $d(t-\tau(t, z_1))$, produces an output which contains the signal, $S_1$ (component of the redirected optical signal) backscattered from a distance $L_1$ down the fiber 16002 and rejects signals (other components of the redirected optical signal) originating from other fiber regions, such as $S_2$, $S_n$, etc. Representing this process mathematically, the resulting channel output, $B(t, L_1)$ is obtained as follows:

$$b(t, \tau_1) = \langle d(t - \tau_1) E_b(t) \rangle = \left\langle d\left(t - \frac{2L_1}{c_L}\right) E_b(t) \right\rangle = B(t, L_1) \quad (32)$$

$$d\left(t - \frac{2L_1}{c_L}\right) = \mu_d c\left(t - \frac{2L_1}{c_L}\right) E_L \cos\left((\Delta\omega + \omega_S)\left(t - \frac{2L_1}{c_L}\right) + \phi\right)$$

$$E_b(t) = \int_0^\infty r(z)\mu_A c\left(t - \frac{2z}{c_L}\right) E_{SS} \cos\left(\omega_S\left(t - \frac{2\hat{z}(t,z)}{c_L}\right)\right) dz$$

$$\Phi(z, L_1) = \phi - \frac{2(\Delta\omega + \omega_S)L_1}{c_L} + \Delta\omega \frac{2z}{c_L}$$

$$B(t, L_1) = \mu_d \mu_A E_L E_{SS} \int_0^\infty r(z) R_c\left(\frac{2(z - L_1)}{c_L}\right) \quad (33)$$

$$\cos\left(\Delta\omega t + \Phi(z, L_1) + \frac{2\mu_L \omega_S}{c_L}\int_0^z p(t, x)dx\right) z dz$$

$$\Delta\Phi(t, z) = \Phi(z, L_1) + \frac{2\mu_L \omega_S}{c_L}\int_0^z p(t, x)dx$$

$$B(t, L_1) = v_E \int_0^\infty r(z) R_c\left(\frac{2(z - L_1)}{c_L}\right) \cos(\Delta\omega t + \Delta\Phi(t, z)) dz$$

$$B(t, L_1) = V_E r_{L_1} \cos\left(\Delta\omega t + \Phi_{L_1} + \frac{2\mu_L \omega_S}{c_L}\int_0^{L_1} p(t, x) dx\right)$$

Because of the correlation properties of the interrogation light (modulated source optical signal), the autocorrelation function $R_c(\tau)$ is very small at all spatial locations except those in the vicinity of $z=L_1$. Therefore, all signals (other components of the redirected optical signal) originating anywhere else are rejected. Furthermore, the phase of the channel output at location $L_1$ will be the summation or integration of all pressure changes along the bi-directional transversal path. This unusual phenomenon has been demonstrated with experimental hardware.

Once the correlation process isolates the optical signal originating from a spatial region, the signal is phase demodulated to extract the pressure information. The signal is I (in phase) and Q (quadrature phase) demodulated as follows:

$$B_I(t, L_1) = \langle B(t, L_1)\cos(\Delta\omega t)\rangle \quad (34)$$

$$B_I(t, L_1) \approx V_E r_{L_1} \cos\left(\Phi_{L_1} + \frac{2\mu_L \omega_S}{c_L}\right)$$

$$B_Q(t, L_1) = \langle B(t, L_1)\sin(\Delta\omega t)\rangle$$

$$B_Q(t, L_1) \approx -V_E r_1 \sin\left(\Phi_{L_1} + \frac{2\mu_L \omega_S}{c_L}\right) \int_0^{L_1} p(t, x)dx = V_1 \cos(\phi_1)$$

Then I & Q, or cosine phase and sine phase, outputs are converted into either phase rate or phase outputs with simple analog or digital hardware. The phase, so demodulated, allows the inference of information about the acoustic pressure down the fiber to the measurement point.

Once the I & Q outputs are generated, the temporal phase state of $B(t, L_1)$ can be determined by one of several types of phase-demodulation processes. The phase state of the region of $L_1$ spatial delay is therefore:

$$\Phi_1 = \Phi_{L1} + \frac{2\mu_L \omega_S}{c_L} \int_0^{L_1} p(t, x)dx \quad (35)$$

Likewise, the plurality (which may be a large number, e.g., 5000) of optical signals (components of the redirected optical signal) arising with spatial delays, such as the propagation time for flyback travel to $L_2$ or $L_n$, can be correlated out of the backscattered signal (redirected optical signal) $E_b(t)$. These are:

$$B(t, L_2) \approx V_E r_{L_2} \cos\left(\Delta\omega t + \Phi_{L_2} + \frac{2\mu_L \omega_S}{C_L} \int_0^{L_2} p(t, x)dx\right) \quad (36)$$

$$B(t, L_n) \approx V_E r_{L_n} \cos\left(\Delta\omega t + \phi_{L_n} + \frac{2\mu_L \omega_S}{C_L} \int_0^{L_2} p(t, x)dx\right)$$

With corresponding phase signals of:

$$\Phi_2 = \Phi_{L_2} + \frac{2\mu_L \omega_S}{c_L} \int_0^{L_2} p(t, x)dx \quad (37)$$

$$\Phi_n = \Phi_{L_n} + \frac{2\mu_L \omega_S}{c_L} \int_0^{L_n} p(t, x)dx.$$

The phase signals, obtained by phase demodulation of each $B(t, L_m)$, represent a pressure field $p(t, z)$ which is integrated along the length, z, of the fiber. Therefore, rather than directly measure $p(t, z)$ the sensor provides all of the accumulated pressure effects down the fiber to the measurement point, $L_m$ (where m is an integer corresponding to the measurement point). In sensor arrays, it is usually desired to detect the pressure over a specific measurement region. If two components $S_j$ and $S_k$ of the redirected optical signal are received from measurement lengths $L_j$ and $L_k$, the corresponding demodulated phases $\Phi_j$ and $\Phi_k$ are:

$$\Phi_j = \Phi_{L_j} + \frac{2\mu_L \omega_S}{c_L} \int_0^{L_j} p(t, x)dx \quad (38)$$

$$\Phi_k = \Phi_{L_k} + \frac{2\mu_L \omega_S}{c_L} \int_0^{L_k} p(t, x)dx$$

A sensor between the lengths down the fiber of $L_j$ and $L_k$ ($L_k > L_j$) is formed by subtracting the two phases:

$$\Phi_k - \Phi_j - \Delta\Phi_{kj} = \quad (39)$$

$$\left(\Phi_{L_k} + \frac{2\mu_L \omega_S}{c_L} \int_0^{L_k} p(t, x)dx\right) - \left(\Phi_{L_j} + \frac{2\mu_L \omega_S}{c_L} \int_{c_L}^{L_j} p(t, x)dx\right)$$

$$\Delta\Phi_{kj} = \Phi_{L_k} - \Phi_{L_j} + \frac{2\mu_L \omega_S}{c_L} \left(\int_0^{L_k} p(t, x)dx - \int_0^{L_j} p(t, x)dx\right)$$

$$\Delta\Phi_{kj} = \Phi_{L_k} - \Phi_{L_j} + \frac{2\mu_L \omega_S}{c_L} \int_{L_j}^{L_k} p(t, x)dx$$

$$\Delta\Phi_{kj} = \Delta\Phi_{L_k L_j} + \frac{2\mu_L \omega_S}{c_L} \int_{L_j}^{L_k} p(t, x)dx$$

The resulting sensor is of length $\Delta L = L_k - L_j$ with a center position of $(L_k + L_j)/2$. The differencing of phase signals $\Phi_j$ and $\Phi_k$ into a new phase signal $\Delta\Phi_{kj}$, allows a virtual sensor of arbitrary position and length to be formed. The resulting spatially differential sensor also adds the advantage of minimizing other effects such as lead-in fiber strum or vibration, which create unwanted phase signals.

The above phenomena illustrate that when the interrogation light is properly encoded, a ROSE (Rayleigh Optical Scattering and Encoding) sensor system is enabled. The techniques, components, systems, and features disclosed herein, therefore, enable the ROSE concept. An embodiment of a system disclosed herein enables spatial discrimination of the optical backscatter effects in a ROSE sensor. The spatial-differencing technique rejects unwanted common mode signals inadvertently introduced in optical-fiber leads down to the sensor region. Such a technique also applies in a similar manner to more conventional fiber-optic acoustic-sensor arrays (i.e., those having Bragg reflective grating sensors) or to non-fiber optic remote optical sensors that detect phase.

Pointwise Signal Delay Multiplexing

Embodiments described herein also apply to point-wise non-distributed sensors or artificially generated multiplexing by electronics means. The interrogation light wave (modulated source optical signal) can be intercepted and retransmitted back to the receiver with an artificial, electronically generated delay, as a means of delay/correlation multiplexing many channels.

Description of a Fiber System Implementation

Embodiments can be realized with bulk-optical, fiber-optical or integrated-optical components. For simplicity, a fiber-optic implementation will be presented. However, the fiber-optic embodiment is being presented without intent of limitation. The teachings herein can be used to implement a reflectometer system using the described and other instrumentalities providing a light path that has the innate property of producing back propagation of portions (components) of an interrogation signal (source optical signal) at a continuum of locations along the length of the propagation path therethrough.

Optical Transmitter and Time-Delay Multiplexing Process

FIG. 16 is an illustrative block diagram implementation of the Rayleigh optical scattering and encoding (ROSE) sensor system 16016, which can be, or can be similar to, the system 1000 of FIG. 1, and all components but the optical fiber 16002 can be, or can be the same as, the electro-opto subsystem 1002 of FIG. 1. Like parts correspond to like numbers throughout the figures. A light wave (optical signal) from transmitter laser (optical source) 16004 is propagated through polarization-preserving optical coupler or beam splitter 16006. The smaller portion of the transmitter laser power split off by the optical coupler 16006 is passed by an optical path 16018 to an acousto-optic modulator 16020. The larger portion of the transmitter laser light power is split by optical coupler 16006 and propagated to an electro-optical modulator 16008. The electro-optical modulator 16008 modulates the laser light passing from the optical coupler 16006 with a correlation code c(t) as electronically generated in a master correlation-code generator 16022, and which may be amplified by an amplifier (not shown in FIG. 16). The correlation code c(t) is modulated onto the laser light (i.e., modulates the laser light) by the action of the electro-optical modulator, 16008. This modulated light comprises the optical interrogation light wave (modulated source optical signal) $E_i(t)$. The electro-optical modulator 16008 may modulate the amplitude, polarization, or phase of the laser light (to modulate the source optical signal, and, therefore, generate the modulated source optical signal) subject to the teachings herein. The interrogation light wave (modulated source optical signal) is propagated from the electro-optical modulator 16008 to an optical coupler, beam splitter, or circulator 16010. The interrogation light wave (modulated source optical signal) passes through the optical coupler 16010 into the optical fiber 16002, or another light-propagation medium (not shown in FIG. 16). Hereinafter, "down", indicates a transversal on the optical path 16002 away from the coupler 16010; "up" indicates a transversal on the optical path 16002 toward the optical coupler, beam splitter, or circulator 16010.

The interrogation light wave (modulated source optical signal) which transverses down the optical fiber or other optical medium 16002 is modulated and is backscattered or returned by other means with equivalent optical path lengths (each equivalent to a time delay), $L_1, L_2, \ldots, L_n$ corresponding to sensors, multiplexed channels, or zones $S_1, S_2, \ldots, S_n$. The returned interrogation light wave (redirected optical signal) is a composite optical signal modulated by signals (components of the redirected optical signal) due to the $S_1$ through $S_n$ modulating and time-domain multiplexing actions.

More particularly, the propagation of the optical spread-spectrum interrogation signal (modulated source optical signal) down the continuous full span of the optical fiber 16002, signal launch end to remote end, causes a back-propagating composite optical signal (redirected optical signal), which is the linear summation, or integration spatially, of all of the individual, continuous, or continuum of back-reflections (components of the redirected optical signal) along the entire span of the optical fiber.

One component of this composite signal (redirected optical signal) is comprised of the naturally occurring continuum of optical back reflections (components of the redirected optical signal including Rayleigh optical scattering ((ROS)) effects) of the optical spread-spectrum carrier signal (modulated source optical signal) that is formed by modulating the primary carrier signal by the spectrum-spreading signals. Another component is comprised of the artificially occurring optical back reflections, either-point wise reflections or distributed reflections, of the optical spread-spectrum carrier signal that is formed due to propagation discontinuities as the result of presence of one or more fiber cable couplers along the optical fiber 16002. Still another component comprised of the continuum of modulations at locations along the span of the reflected signals due to longitudinal components of optical-path-length change, causing a delay in the reflected signal, experienced by the optical fiber 16002 along its length.

Such optical-path-length change or delay may be caused by a variety of possible sources including acoustic pressure waves incident to the fiber 16002, electromagnetic fields coupled to the fiber, mechanical strain or pressure on the fiber, thermal strain or pressure induced in the fiber, or other means of causing change in the optical path length. Use of the acoustic-pressure-waves mode of changing path length in perimeter intrusion monitoring systems is the principle, yet nonlimiting, embodiment illustrated herein. In this use, optical-fiber span 16002 is employed to provide an array of virtual geophones buried at a range of depths beneath the surface of the ground of about between six (6) inches and one (1) foot, to sense motion of an object on the surface of the ground. The acoustic-pressure-wave sensing mode is also useful to sense seismic signals, as for example as linear arrays inserted into a casing structure of an existing oil well. Predetermined artificial-pressure-wave-producing shocks are imparted into the ground, and the responses from the sensor are used to locate secondary oil deposits. The acoustic-pressure-wave sensing mode is further useful for employing the span of the optical fiber 16002 as an array of virtual hydrophones, with the media that couples the signals to the hydrophones at least in part being the body of water in which the array is immersed. Such hydrophone arrays find use as naval-undersea-warfare towed arrays, or towed geophysical-exploration arrays. In the latter, the arrays respond to artificially produced shocks of predetermined character and location induced in the body of water, and the responses of the array to bottom return signals are used to locate ocean bottom geophysical features indicating likely presence of an oil deposit. Yet further, a sensing position (zone) on the fiber 16002 could be used to receive, as an input, microphonic signals suitably imparted to the region of the sensing position. The electromagnetic field sensing mode of the optical fiber 16002 could be used for monitoring electronic signals along a telecommunication cable's span to localize malfunctions. Responses of the optical fiber 16002 to mechanical, pressure, or thermal strains can be used in systems for monitoring such strains.

The composite light wave (redirected optical signal) propagates up the optical fiber or medium 16002, passes through optical coupler, beam splitter or circulator, 16010, to optical pathway 16012, which passes the backscattered, time-delay multiplexed, composite light wave (redirected optical signal) $E_b(t)$ to an optical receiver 16024 via an optical polarization splitter 16026. Although not shown in FIG. 16, the system 16016 can include an optical isolator disposed between the circulator 16010 and the polarization splitter 16026 to prevent reflections of the redirected optical signal by the polarization splitter from propagating through the circulator and polarization-preserving coupler 16006 to the light source (e.g., laser) 16004.

In an embodiment, fiber 16002 is of the relatively low-cost, conventional single-mode or multimode, fiber-cable type.

Further, in an embodiment, the fiber 16002 has extruded thereon a coating 16014 of a material which enhances the longitudinal strain which the fiber undergoes from a given radially, or generally laterally, applied pressure-wave strain. Materials that provide such enhancement include extrudable thermoplastic polymers (TPU's) or extrudable thermoplastic elastomers (TPE's) that exhibit a combination of a low Young's modules (E) and a low Poisson's ratio ($\sigma$). The Poisson's ratio is, for example, below 0.5, which is the Poisson's ratio of natural rubber. Examples of such materials include: (i) low-density polyethylene, having characteristic $E=1.31$ dynes/cm$^2 \times 10^{10}$ and $\sigma=0.445$; and (ii) polystyrene, $E=3.78$ dynes/cm$^2$ and $\sigma=0.35$ (values as reported in the paper, R. Hughes and J. Javzynski, *Static Pressure Sensitivity Amplification in Interferometric Fiber-Optic Hydrophones*, Applied Optical/Vol. 19/No. 1/1 Jan. 1980, which is incorporated herein by reference).

An alternate embodiment of fiber 16002, albeit involving significantly greater cost per unit length of the fiber, is a fiber in the more-expensive form of a polarization-preserving, or single-polarization, optical fiber. The polarization-preserving fiber of this type holds the backscattering light (redirected optical signal) in a narrow range of polarization states so that a substantially single RF signal 16028 enters a single set of correlators 16030, reducing the complexity of the system 16016. But in cases involving long surveillance fibers, this alternative embodiment becomes expensive in cost of the fiber 16002. In such an embodiment, a polarization splitter 16026 is included to allow processing of the two polarization components of the redirected optical signal.

The correlation code generator 16022 generates a signal c(t) that has a broad bandwidth. The broadband nature of the correlation code is allows obtaining the desired properties in the signal's autocorrelation function. The calculation and definition of the autocorrelation function of any general signal is well known and defined in available signal-processing literature. The correlation code signal c(t) is so structured that its autocorrelation function is highly peaked at zero delay, and is very small away from zero delay. This criterion is well known to those of skill in the art and is the essence of why the correlation code has a broad bandwidth. Any signal that has the desired autocorrelation function properties can be used as the correlation code in the embodiments described herein. There are many reasons for choosing one correlation code over another: ease of creation; autocorrelation properties; cost of creation hardware; cost of correlation hardware; and effectiveness in producing spread-spectrum signal effects. According to the teachings herein, the correlation code for disclosed embodiments can be a binary sequence with a desired transorthogonal autocorrelation property (sometimes called a pseudonoise sequence), a pseudorandom number (PRN) sequence with the such desired autocorrelation property, chirps, or other types of signals that provide correlation codes having predicable non-repetitive behavior. The foregoing list of types of sequence signals that may be employed to modulate the carrier light-wave signal (source optical signal) includes both "binary pseudonoise sequences" and "pseudorandom number (PRN) sequences." For purposes of construction of this specification, these terms are employed as they are defined under the listings "Pseudonoise (PN) sequence (communication satellite)" and "Pseudorandom number sequence" at pages 747 and 748 of the "IEEE Standard Dictionary of Electrical and Electronic Terms" (Fourth Edition), which listings are incorporated herein by reference. Further for purposes of construction of this specification, it is deemed that "binary pseudonoise sequence" is generic and "pseudorandom number sequence" is a species thereof. Still further for purposes of construction of this specification, both terms are deemed to include analog-signal forms of sequences as well as digital-signal forms.

It is to be appreciated that in addition to its correlation-encoding function, master-correlating-code generator 16022 is a source of a spectrum-spreading signal comprised of a spectrum-spreading signal that produces an autocorrelation that is well behaved. It has one dominant maxima at zero correlation delay, and its spectrum is large enough to provide sampling of said optical fiber 16002 spatially along the length of the fiber with a resolution commensurate with a sub-length $\Delta Z$ of the fiber. These characteristics enable segmentation of the optical fiber 16002 of span length L into n segments in accordance with a relationship:

$$L < \Delta Z \cdot n \qquad (40)$$

In this relationship, $\Delta Z$ is a segment length of a span of the fiber 16002 whose length is one-half the distance traveled by light propagating through one zero delay temporal time span of the autocorrelation maxima, $\Delta T$, such that $C_L$ is the speed of light in the optical fiber and $\Delta T$ is approximately equal to the reciprocal of the spread-signal optical bandwidth.

An illustrative embodiment of the code generator 16022 is a shift-register-type pseudorandom-number-code generator, having n bits, wherein a code is generated that satisfies said resolution-sublength-and-segment-length relationship by choosing an appropriate combination of the number of its bits and the clock time/rate.

The temporal length of the code sequence that is reiteratively produced by the generator 16022 may be either less than the time period for propagation of a light wave to the remote end of fiber 16002 and propagation back of a backscattering redirected optical signal (i.e., the distance of flyback travel), or greater than this time period. It cannot be equal to this period, or else ambiguity may occur.

The predetermined timing base employed by the source of the spectrum-spreading signals, which timing base determines the length of a $\Delta Z$ segment, is so chosen to provide a positive enhancement to the ratio of the power of back-propagating Rayleigh scattering effect $P_R$ to the power of the forward-propagated Rayleigh scattering effect $P_T$, in accordance with the following equation:

$$\frac{P_r}{P_t}[dB] = -70 + 10\log_{10}(\Delta L) - \frac{\Delta Z}{100} \qquad (41)$$

Local Oscillator Generation

Still referring to FIG. 16, the fiber-optic coupler or beam splitter 16006, which is normally a polarization-preserving device, passes a portion of the laser beam (source optical signal) from the laser (light source) 16000 to an acousto-opto modulator 16032; typically the power of the portion of the laser beam that the splitter 16006 passes to the acousto-opto modulator is significantly less than the power of the portion of the laser beam that the splitter passes to optical fiber 16002 via the electro-optic modulator 16008 and the circulator 16010. The acousto-optic modulator 16032 upshifts the frequency of the passed portion of the laser beam by an intermediate frequency, for example, approximately 900 MHz. Furthermore, where the system 16016 is configured to process both polarization components of the redirected optical signal from the fiber 16002, an optical polarization-preserving splitter 16033 splits the polarized frequency-upshifted optical signal from a first-order output of the acousto-optic modulator 16032 into two polarized beams of the frequency-upshifted source optical signal. Optical pathway 16034 propagates the upshifted beams from the polarization-preserving optical splitter 16033 to the optical receiver (signal mixer) 16024. The frequency-upshifted beams on the optical pathway 16034, which couples the frequency-upshifted beams to the optical-receiver assembly 16024, are aligned to have the same polarizations as the composite-light-wave polarization components, respectively, on the optical pathway 16038. Furthermore, although not shown, the acousto-optic modulator 16032 may also generate a zeroth-order output signal that the system 16016 can use, for example, to determine whether the light source 16004 is generating the source optical signal (e.g., to determine whether the light source is "on"), or as an input to a feedback circuit configured to maintain the power of the source optical signal at a desired level.

Still referring to FIG. 16, each of the composite light-wave polarization components on the optical path 16038 is an input into the optical receiver 16024. The polarization components of the local oscillator light wave on the optical path 16034 are also each input to the optical receiver 16024. The local-oscillator and composite-light-wave polarization components are respectively interfered on photodetectors, thus producing an electronic signal which electronically represents the heterodyned optical interference power between the two light waves. The resulting composite radio-frequency polarization signal components on the respective pathways of the path 16036 represent, electronically, the composite light-wave signal components on the pathways of the optical path 16038. The composite polarization-component electronic receiver signals are passed from the path 16036 to the correlator circuit 16030. The local-oscillator light-wave polarization components on optical path 16034 are each interfered with the composite light wave polarization components on optical path 16036. The interference powers are photo detected in optical receiver 16024 by optically interfering each polarization component of the composite back propagating light wave (redirected optical signal) on the respective polarization component of the local oscillator signal. As one of the components of this interfering action, there is produced, for each polarization component, a respective difference beat signal that is a composite radio frequency representation of the corresponding component of the composite light wave on optical path 16038.

This interfering of the polarization components of the local oscillator output light wave 16034 and the polarization components of the composite back-propagating CW light wave (redirected optical signal) 16038 provides the translation of the polarization components from the optical domain to respective CW radio frequency (r.f.) composite difference beat signals 16036, one respective beat signal per polarization component. This reduces the frequencies of the optical polarization components input to the photodiode mixer 16024 into an electronically processable signal frequency range. It is to be appreciated that the r.f. composite difference signals produce by this translation action includes having counterpart components of the aforesaid components of the composite backpropagating light-wave signal, with the phase states of these counterpart r.f. domain signals the same as the phase states of the corresponding components of the back-propagating light wave (the redirected optical signal.

Where a signal-polarization fiber 16010 is used, the polarization splitter 16026 may be omitted from the system 16016, and the acousto-optic modulator 16032 can be configured to output only a single upshifted optical local oscillator signal. This would result in the optical mixer 16024 having only two inputs and a single output. For example purposes, hereinafter it is assumed that the optical mixer 16024 outputs only a single signal, it being understood that in an embodiment in which the optical mixer outputs two polarization components instead of a single signal, the processing steps described below are performed separately on each of the two polarization components.

In accordance with an embodiment, laser 16000 is to have sufficiently stringent high-performance capability with respect to exactness of frequency to enable interference effects therebetween and heterodyne detection of acoustic perturbation signals incident to fiber 16002 to produce beat frequencies within the radio frequency (r.f) range. Also in accordance with an embodiment, laser 16000 has stringent performance criteria with respect to the phase stability, or coherence, of its beam. The beam is to be substantially coherent over at least a propagation path distance substantially equal to twice the length L of sensing fiber 16002. For example, a commercially available non-planar, ring laser (e.g., Lightwave Electronics Corp. Model 125) would be suitable for an intruder-sensing perimeter-intrusion-monitoring fiber 16002 having a length of 8.0 km (approximately 5 miles). The laser beam of this commercially available laser, which is in the near infrared range, has a frequency of 227 terahertz, or a 1319 nanometer wavelength, and has a frequency stability accurate to within one part in a billion over a 1 millisecond period, or 5 KHz in a 1 millisecond period.

In a preceding section, there is a description of "non-zero $\Delta\omega$" and a mathematical demonstration of its importance in the heterodyne mode of interfering. It makes it possible to use relatively simple processes to avoid fading. By way of contrast, fading with the "zero $\Delta\omega$" homodyne mode of interfering typically would entail much more difficult and less effective fade-avoidance processes.

Correlation Time-Delay Demultiplexing

Still referring to FIG. 16, the composite radio frequency signal on electrical path 16036 is input into the correlator circuitry 16030. The correlator circuit delays the master-correlation-code-generator output 16040 an appropriate amount and correlates the delayed correlation code with the composite radio frequency signal. This produces electrical outputs $O_1$, $O_2$, . . . , $O_n$ corresponding to signals $S_1$, $S_2$, . . . , $S_n$, in turn corresponding to spatial delays $L_1$, $L_2$, . . . , $L_n$. The spatial delays $L_1$, $L_2$, . . . , $L_n$ are arbitrary and programmable. The electrical output $O_1$ corresponds to $B(t, L_1)$ referred to in a preceding subsection.

The correlation process is well understood in the literature. The signal that represents the backscattered optical wave (redirected optical signal) in fiber array 16002 that is passed from the optical receiver 16024 to the correlator circuit 16030 contains all of the information for all sensors or channels $S_1$, $S_2$, . . . , $S_n$ at once on the electronic signal path 16036 entering the correlator. Because the backscattered composite signal (redirected optical signal) is modulated with the correlation code by electro-optic modulator 16008, the backscattered light is time structured with the time structure of the correlation code. Because the correlation code is selected to have special autocorrelation code properties, the time structure of the correlation codes allows an electronic representation of the backscattered light at positions $L_1$, $L_2$, . . . , $L_n$ to be obtained via the correlation process in the correlator 16030. In an embodiment, the master-code generator 16022 is a shift-register type pseudorandom-number (PRN) code generator and each correlator of the correlator circuit 16030 is a correlation-type demodulator herein later described in greater depth. Code generator 16022 may alternatively be embodied as a binary sequence having transorthogonal autocorrelation properties (binary pseudonoise sequence) and each correlator of the correlator circuit would then be a correlation-type demodulator for demodulating a binary pseudonoise sequence, whose implementation would be understood by those of skill in the art. The correlator circuit 16030 uses the reference correlation code from correlation-code generator 16022, which correlation code is passed via electronic path 16040 to the correlator circuit, as a "golden ruler" enabling sorting out by temporal and spatial domain demultiplexing electronic representations of the backscattering optical signals (components of the redirected optical signal) at sensors or channels $S_1, S_2, \ldots, S_n$. Various delayed versions of the correlation code are multiplied by the composite signal with all of the sensor or channel signals present simultaneously, from electronic path 16036, so that the electronic representations of the sensors or channels $S_1, S_2, \ldots, S_n$ are output from the correlator circuit 16030 as signals $O_1, O_2, \ldots, \ldots, O_n$ with respect to the index.

Correlator circuit 16030 is an electronic spread-spectrum signal de-spreader and temporal and spatial domain de-multiplexer of the r.f. signal counterpart to the optical composite signal. Its input is coupled to the output 16036 of the heterodyner and photodetector 16024, and it is operative in cooperation with said source of spectrum-spreading signals to perform a coherent signal-correlation process upon the r.f. counterparts of the aforesaid "one" and the aforesaid "still another" components of the composite back-propagating CW light wave (redirected optical signal). This causes the de-spreading of the r.f. counterpart of the optical reflected (redirected) spread-spectrum signal and causes the temporal and spatial demultiplexing of the r.f. counterpart of the "still another" component of the composite r.f. signal. This processing provides signals which temporally and spatially sort the said "still another" component into n virtual sensor signal channels, or stated another way n of each of the $\Delta Z$ length measurement regions, measuring the induced optical path change at each of the n $\Delta Z$-length segments of the optical fiber span 16002.

It will be appreciated that this sorting process is accomplished by the autocorrelation properties of the spectrum-spreading signal and by the time of flight of the optical spectrum-spreading signal down to each $n^{th}$ reflection segment and back to the heterodyne optical receiver 16024. A delayed replica of the spectrum-spreading signal is correlated against the r.f. signal counterpart of the optical composite back-propagating signal, thereby segmenting the optical fiber into n independent segments, or virtual sensors, via the time of flight of the optical composite back-propagating signal and the autocorrelation function of the transmitted spectrum-spreading signal.

It is to be appreciated that system 16016 is operating in the spread-spectrum-transmission-and-reception mode. Namely, by providing optical interrogation light wave $E_f(t)$ with modulation by the correlation code c(t), the continuous-wave carrier signal is temporally structured into a spread-spectrum interrogation light wave that continuously reiterates autocorrelatable code sequences. Then after the correlation subsystem 16030 provides an appropriate time of delay, the correlator subsystem correlates the backscattered light wave $E_b(t)$ with the same output c(t) of the code generator 16022, de-spreading the spread-spectrum signal.

In accordance with well-known communication electronics theory, this has the effect of increasing signal output of the ROSE sensor system while the noise bandwidth remains the same. In temporally and spatially sorting the r.f. counterpart of the aforesaid "still another" component of the composite back-propagation light wave (redirected optical signal), the aforesaid "another" component of undesired noises, such as reflections from couplers in fiber 16002, are materially attenuated.

More particulary, in accordance with this well-known theory, the signal-to-noise ratio (SNR) is enhanced by considerable attenuation of noise mechanisms in frequency ranges outside of the center-frequency lobe of the autocorrelation function and outside the pair of first side lobes to one and the other side of the center-frequency lobe.

An illustrative embodiment of electronic spread-spectrum signal de-spreader and spatial de-multiplexer for cooperation with the previously described shift-register type PRN code generator may comprise a series of n-like shift-register code generators respectively receiving the spectrum-spreading signal through a corresponding series of n feed channels that cause delays that incrementally increase by an amount of time bearing a predetermined relationship to the fiber-span length, and $C_L$, the speed of light through the fiber. The composite r.f. signal is fed to a corresponding series of n multipliers connected to receive as the other multiplier the codes generated by the respective de-spreader and demultiplexer to thereby provide the de-spread and de-multiplexed signal.

Heterodyne Phase Demodulation

Still referring to FIG. 16, after the composite radio-frequency signal on electrical path 16036 is correlation-time-delay demultiplexed by the correlator system 16030, the plurality (which upwardly may include a very large number, for instance 5,000) of outputs $O_1, O_2, \ldots, O_n$, on the plurality of electrical paths 16042, 16044, and 16046 respectively are phase demodulated by a plurality of individual phase demodulations in the phase-demodulator circuit 16048 (the electrical paths 16042, 16044, and 16046 are shown in pairs, one path for each polarization component; but for a system in which there is a single output 16028 from the optical mixer 16024, each of the electrical paths 16042, 16044, and 16046 are single paths). The outputs of the phase-demodulator circuit 16048 are the corresponding plurality of electrical paths 16050, 16052, and 16054. The phase-demodulator outputs 16050, 16052, and 16054 correspond to the correlator outputs $(O_1, O_2, \ldots, O_n)$ 16042, 16044, and 16046 respectively, and to the corresponding plurality of corresponding signals $S_1, S_2, \ldots, S_n$ respectively corresponding to spatial delays $L_1, L_2, \ldots, L_n$, respectively. The outputs 16050, 16052, and 16054 electronically indicate (with tens of kilohertz potential bandwidth) the phase states of optical signals $S_1, S_2, \ldots, S_n$. In particular, output 16050 is proportional to the temporal phase $\Phi_1$ of $B(t, L_1)$ hereinbefore discussed. The phase demodulator outputs 16052 and 16054 indicate the temporal phase states $\Phi_2$ and $\Phi_n$ of $B(t, L_2)$ and $B(t, L_n)$ respectively.

Fading Free Polarization Processing

System 16016 may further include polarization-signal-characteristic processing functions (described above), which are used together with the previously described feature that the heterodyning function provides in reducing fading, of the backscattering signal, $E_b(t)$. These polarization processing functions are disclosed in U.S. Pat. No. 6,043,921 entitled "Fading-Free Optical Phase Rate Receiver," hereby incorporated herein in its entirely. The optical heterodyning feature that provides benefit in reducing fading includes: (i) laser 16004 in the formation of the optical interrogation light wave (source optical signal) $E_f(t)$, applied to optical fiber 16002, or other linearly extended light propagation medium producing Rayleigh effects backscattering, and (ii) the manipulation of this by optical receiver 16024 to provide the composite electronic receive signal as optical receiver output 16036. This takes advantage of the feature of more favorable heterodyne fading conditions in a way, in which polarization and phase-state signal fading is materially reduced in the detected backscattered light wave $E_b(t)$. The electronic decoding module 700 of U.S. Pat. No. 6,043,921 is substantially an equivalent to the correlator system 16030 herein. However, the system disclosed in U.S. Pat. No. 6,043,921 for implementing polarization fading reduction (if not substantially eliminating fading) is a generalized stand-alone system for processing any optical phase signal having temporally varying polarization, phase, and phase frequency. It must be adapted for application to system 16016 by appropriate integration into system 16016 including the two following alternative approaches.

One approach for such adaptation passes the fade-free optical phase rate (FFOPR) photoreceiver RF signal to the correlator 16030, performs the correlation on the RF signal and completes the Phase Demodulation by In phase and Quadrature phase (hereinafter I & Q) demodulating the correlated RF signal into outputs. This method creates low bandwidth I & Q components and therefore uses low-bandwidth analog-to-digital converters (implying a use of a large number of analog RF correlation electronic components). This RF correlator approach uses two correlator circuits for every virtual sensor element, or spatial channel, along fiber 16002. One correlator is used for the vertical polarization RF signal path and one correlator is used for the horizontal polarization RF signal path (i.e., the two polarization components described above).

Another approach applies the I & Q demodulator of FIG. 7 of the U.S. Pat. No. 6,043,921 prior to correlation. This approach, therefore, correlates a wideband set of four I & Q signals. One I, Q, set is for horizontal polarization and the other I, Q, set is for the vertical polarization. In this case the I & Q signals are the I & Q signals for the whole virtual array rather than for one virtual sensor element of the array. Four correlators are used for each sensor element. One correlator is applied to each of the four wide bandwidth I & Q signals for each virtual sensor element. This second approach users very wideband analog-to-digital converters, but allows digital correlators to be used instead of analog RF correlators. The RF correlator or first approach uses far more analog-to-digital converters and RF electronics. The digital-correlator approach enables the correlators to be implemented by the digital approaches of massively integrated logic circuits and/or programmed processors, typically requiring far more digital logic, but substantially reducing the r.f. electronics and number of analog-to-digital converter units in the system.

Phase Differencing

Still referring to FIG. 16, the plurality (which upwardly may include a very large number, for instance 5,000) of signals indicating the phase states $\Phi_1, \Phi_2, \ldots, \Phi_n$ on electrical paths 16050, 16052, and 16054, respectively, are input into a phase-differencer circuit 16060. The phase differencer 16060 forms a corresponding plurality of outputs 16062, 16064, and 16066, which are arbitrarily and programmably assigned as the subtractions of any two pairs of phase signals $\Phi_j$ and $\Phi_k$ (where j and k are selected from 1, 2, ..., n).

Each of the programmably selectable pairs of differenced phase signals form a signal $\Delta\Phi_{kj}$, which is spatially bounded within the region of the fiber between lengths $L_j$ and $L_k$. The phase differencer 16060, therefore, produces differential phase outputs corresponding to a set of programmable-length and -position virtual sensors.

Stated another way, each programmable selection of pairs of phase signals forms a virtual spatial differential sensor that senses the difference between the phases of the $\Delta\omega$ output of the photodetector sub-system (which is the subject of the next subsections) in receiver 16024. Each $\Delta\omega$ is an r.f. difference beat signal representative of the aforesaid "still another" component of the composite back-propagating CW light-wave signal (redirected optical signal), which passes from the launch end of fiber span 16002 to directional coupler 16010. These signals from each pair therefore represent signals of virtual spatial differential sensors along fiber span 16002. As a result of the choice of pairs being selectively programmable, these virtual sensors can be employed to implement adaptive apertures in processing signals incident on the fiber span 16002. This feature would be useful, for example, in enabling security-system operators to classify objects causing acoustic pressure-wave signals incident up a fiber span 16002 used as a perimeter-intrusion monitoring line.

A signal analyzer 16068 is configured to detect and to analyze a recovered acoustic signal in response to the optical phase (from the phase demodulator 16048) of the component of the redirected optical signal from the corresponding fiber zone, and in response to an optical-phase difference (from the phase difference 16060) between the optical phase of the component of the redirected optical signal from the corresponding fiber zone and an optical phase of a component of the redirected optical signal from another fiber zone. For example, the signal analyzer 16068 can be configured to determine a frequency content of the recovered acoustic signal by implementing, e.g., an FFT, thereon. And the signal analyzer 16068 can be configured to determine a location on which the acoustic signal is incident upon the optical fiber 16002 in response to the optical-phase difference. Furthermore, the signal analyzer 16068 can be configured to detect a presence of the acoustic signal in response to the optical phase from the phase demodulator 16048 changing over time.

And a signal classifier 16070 is configured to classify the source of the acoustic wave detected and analyzed by the signal analyzer 16068. For example, the signal classifier 16070 can be, or can include, one or more CNNs configured to use deep-learning techniques to determine, from information that the signal analyzer 16068 generates, the respective probabilities that the source of the detected and analyzed acoustic signal belongs to classes (e.g., walking human, running human, multiple humans, a moving vehicle) for which the one or more CNNs are trained.

Still referring to FIG. 16, alternate embodiments of the system 16016 are contemplated. For example, embodiments described in conjunction with FIGS. 1-15 and 17-25 may be applicable to the system 16016 of FIG. 16.

Optical Detector Sub-System

Figure 17:
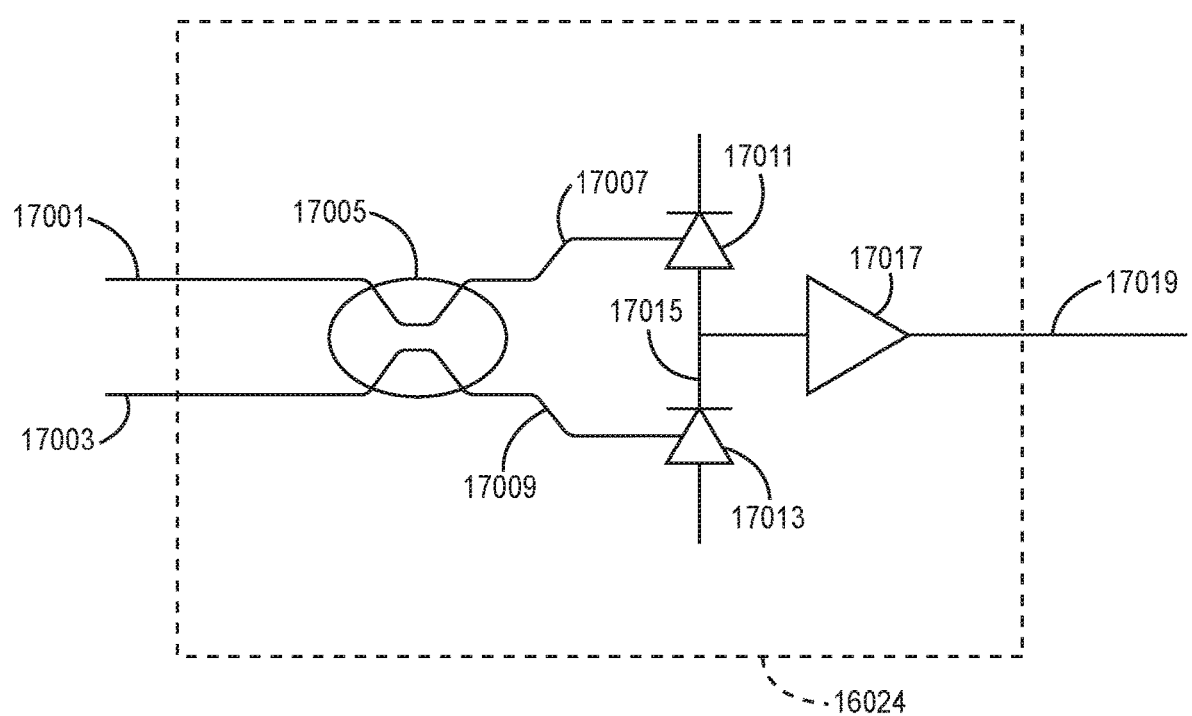
FIG. 17 is a diagram of a balanced heterodyne optical detector circuit, according to an embodiment.
Figure 18:
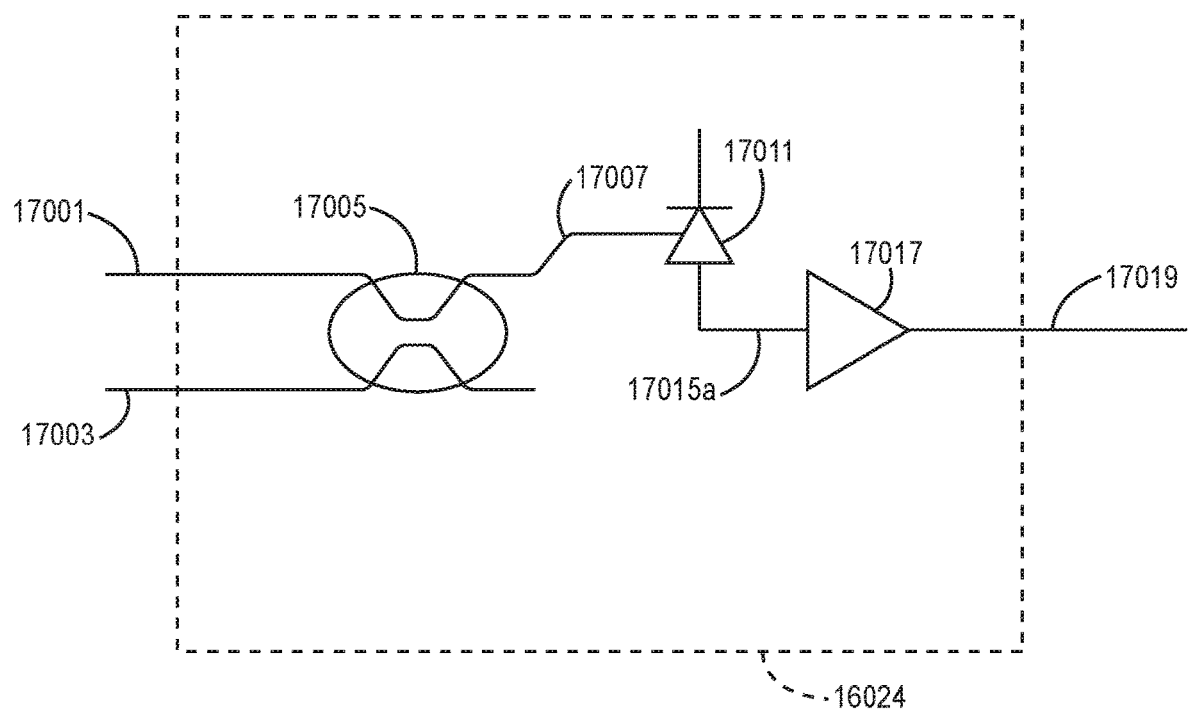
FIG. 18 is a diagram of a photodetector type heterodyner, according to an embodiment.

The optical receiver 16024 described in conjunction with FIGS. 16, 17, and 18 is comprised of photodetector sub-systems. Any of the many well-known photo-detecting techniques and devices may be employed. Possible implementation of the photodetection sub-systems will now be discussed.

Refer to FIG. 17, like parts correspond to like numbers. Optical signals enter the photodetector sub-system via optical paths 17001 and 17003, which are extensions of the paths 16034 and 16038 in the case of receiver 16024. The optical signals are equally split by optical coupler or beam splitter, 17005. The optical signal on path 17007 is composite signal comprised of half the optical power of path 17001 and half of the optical power arriving on path 17003. The optical signal on path 17007 is illuminated on optical detector 17011. The photocurrent of optical detector 17011 flows into electrical conductor 17015. Likewise, the optical signal on path 17009 is comprised of half the optical power on path 17001 and half of the optical power on path 17003. The optical signal on path 17009 is illuminated on optical detector 17013. The photo-current of optical detector 17013 flows out of electrical conductor 17015. Therefore, the photo-currents of optical detectors 17011 and 17013 are subtracted at electrical conductor or node 17015.

Photo-detectors 17011 and 17013 are, at least ideally, precisely matched in responsivity. The differential photo-current on electrical conductor 17015 is input into pre-amplifier 17017, amplified and is passed to electrical output 17019. The differential nature of the photo-detection rejects either of the self-optical interference power of the signals on paths 17001 and 17003 and receives only the cross-interference power between the two optical signals on paths 17001 and 17003. This particular optical detector architecture is called a balanced heterodyne optical detection scheme. The scheme is 3 dB more sensitive than all other heterodyne optical detection methods and offers the distinct advantage of rejecting local-oscillator noise.

FIG. 18 illustrates an alternative photo-detection scheme to FIG. 17. Light waves enter the receiver at paths 17001 and 17003. The optical coupler or beam splitter 17005 combines the light waves on paths 17001 and 17003 into a composite light wave on path 17007. The composite light wave on path 17007 illuminates the optical detector 17011. The photo-current of the optical detector caused by the self-interference and cross interference of light waves originating from optical paths 17001 and 17003 passes through conductor 17015a, is amplified by pre-amplifier 17017 and is passed to electrical output 17019.

The optical detector sub-system of FIGS. 17 and 18 correspond to optical receiver 16024 of FIG. 16. Paths 17001 and 17003 correspond to 16034 and 16038 and output 17019 corresponds outputs 16036 from optical receiver 16024. Either of the photo-detection schemes of FIG. 17 or 18 can be used for the optical receiver 16024. However, the photodetection scheme of FIG. 17 may be more suitable for some applications.

Still referring to FIGS. 17-18, alternate embodiments of the optical detector/receiver/modulator/mixer 16024 are contemplated. For example, embodiments described in conjunction with FIGS. 1-16 and 19-25 may be applicable to the optical detector/receiver/modulator/mixer 16024 of FIGS. 17-18.

Programmable Correlator System

Figure 19:
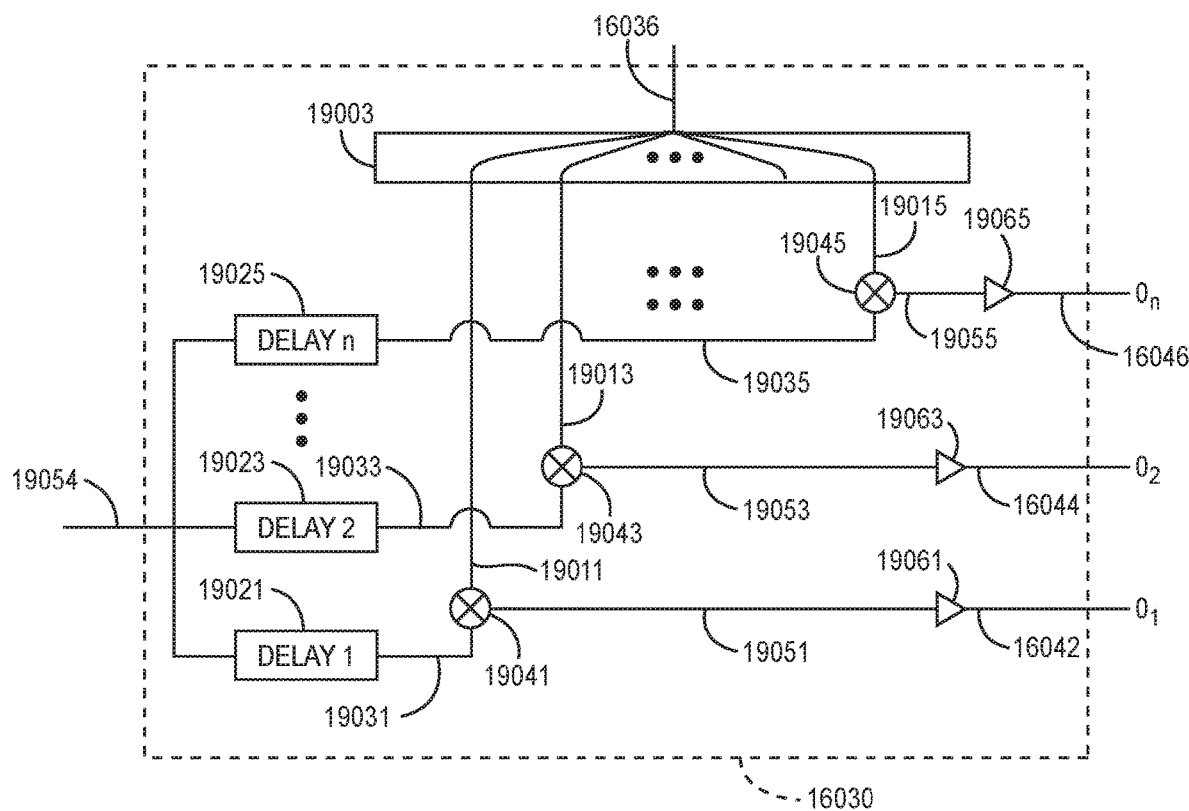
FIG. 19 is a diagram of a programmable correlator, which is configured to enable spatial sampling of optical signals on mandrel and non-mandrel spans of an optical fiber that is part of the optical assembly of FIG. 16 to provide a virtual array of acoustic-wave sensors along the optical fiber, according to an embodiment.

Referring to FIG. 19, the composite radio frequency signal, or r.f. composite reference beat signal, which electronically represents the received time-delay multiplexed optical signal, or composite back-propagation CW light wave $E_b(t)$ (redirected optical signal), is input into the correlator circuit 16030 at electrical input 16036. The composite radio frequency signal is n-way split with power splitter 19003 into a plurality (which upwardly may include a very large number, for instance 5,000) of electronic pathways including 19011, 19013 and 19015. The master correlation code c(t) is input into the correlator system 16030 at electrical input 19054. The correlation code is distributed to such a plurality of programmable delay circuits including 19021, 19023, and 19025. Each programmable delay circuit delays the master correlation code by the delay suitable to decode/demultiplex each time-delay multiplexed channel. The plurality of programmable delay circuits including 19021, 19023, and 19025 output a plurality of delayed correlation codes including those on electrical pathways 19031, 19033, and 19035, respectively. The corresponding plurality of delayed correlation codes including those on electrical pathways 19031, 19033, and 19035 are multiplied by a corresponding plurality of multipliers (or balanced mixers) including 19041, 19043, and 19045, respectively, by the radio-frequency signal on the plurality of electronic pathways including 19011, 19013, and 19015, which are amplified by a corresponding plurality of amplifiers including 19061, 19063, and 19065, respectively, to produce the corresponding plurality of outputs including $O_1$, $O_2$, ..., $O_n$ (on lines 16042, 16044, and 16046) respectively. Each of the outputs therefore produces the corresponding demultiplexed signal which is time-gated by the corresponding time-delay of the correlation code. The correlator system 16030 of FIG. 19 is an example implementation of the correlation system 16030 of FIG. 16.

The output $O_1$ corresponds to signal $B(t, L_1)$, which is hereinbefore discussed. The outputs $O_1, O_2, \ldots, O_n$ on lines 16042, 16044, and 16046, respectively, correspond to signals $S_1, S_2, \ldots, S_n$, which in turn are based upon the spatial delay associated with distances $L_1, L_2, \ldots, L_n$ indicated in FIG. 16. These spatial delays are based on the time of propagation for fly-back travel along these distances, which are arbitrary and programmable. The time-delay multiplexing of the optical signals comprising the composite back-propagating optical signal (redirected optical signal) on path 16038 of FIG. 16 arises from a plurality (which upwardly may include a very large number, for instance 5,000) of spatial locations causing a like plurality of time-delays. The correlator system 16030 spatially separates the components of the r.f. composite difference beat signal into channels, which each uniquely represent an optical signal (a component of the redirected optical signal) at a single spatial location.

The correlator system 16030 allows the spatial sampling of the optical signals so that a virtual array can be formed along the fiber span 16002 of FIG. 16.

Still referring to FIG. 19, alternate embodiments of the correlator circuit/system 16030 are contemplated. For example, embodiments described in conjunction with FIGS. 1-18 and 20-25 may be applicable to the correlator circuit/system 16030 of FIG. 19.

Phase Demodulation System

Figure 20:
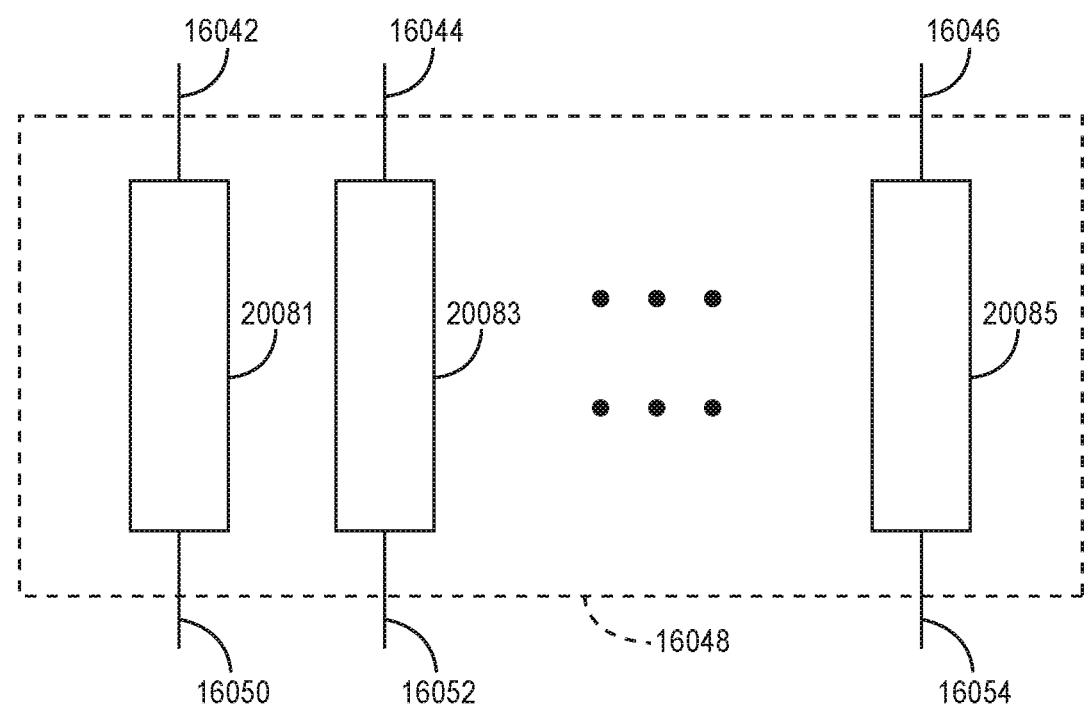
FIG. 20 is a diagram of a set of phase-demodulator circuits configured to receive outputs from the programmable correlator of FIG. 19, according to an embodiment.

The embodiment of phase demodulator circuit 16048 of FIG. 20, has two uses in system 16016. It either: (i) receives the outputs of the just described r.f. correlator subsection 16030, or (ii) is part of the integration of the polarization fading reduction system of U.S. Pat. No. 6,043,921 (as discussed above).

Referring to FIG. 20, the phase demodulation circuit 16048 is comprised of a plurality (which upwardly may include a very large number, for instance 5,000) of phase demodulators, 20081, 20083 and 20085. The inputs to the plurality of phase demodulators, 16042, 16044, and 16046 (the correlator outputs $O_1, O_2, \ldots, O_n$ discussed previously) are phase demodulated with phase demodulators 20081, 20083, and 20085, respectively. The outputs of these demodulators are passed on electrical pathways 16050, 16052, and 16054, respectively.

Figure 21:
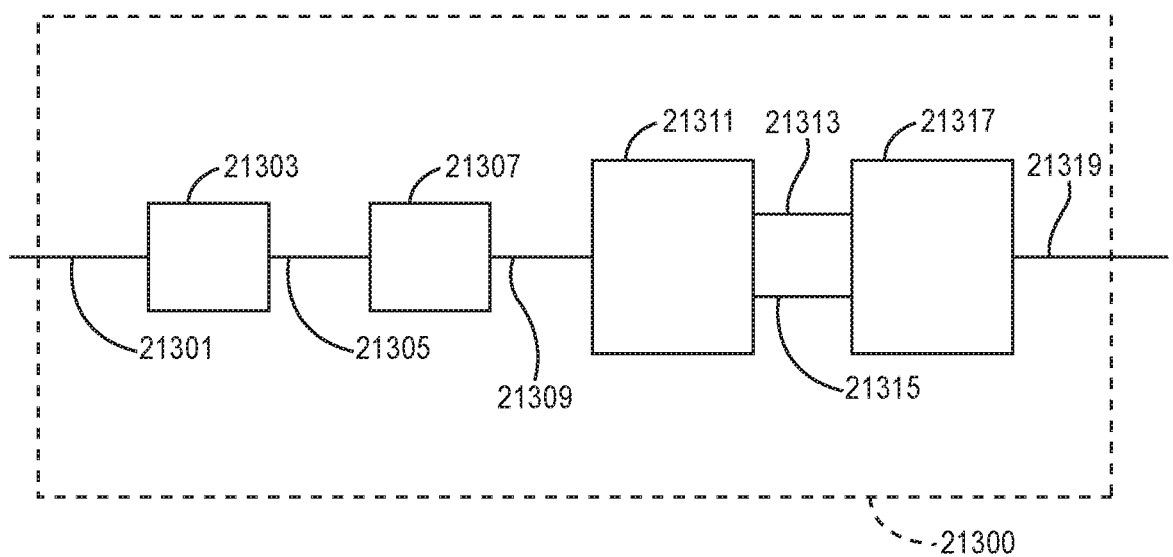
FIG. 21 is a diagram of one of the phase-demodulator circuits of FIG. 20, according to an embodiment.

Referring to FIG. 21, an example block diagram of any one of the just discussed phase demodulators 20081, 20083, and 20085 is shown as part 21300. The input electrical path 21301 corresponds to any one of electrical path 16042, 16044, 16046, etc. of the plurality of phase demodulators. The output electrical path 21319 corresponds to any one of electrical path 16050, 16052, 16054, etc. of the plurality of phase demodulators. A correlation-system output such as $O_1$, $O_2, \ldots, O_n$ is passed via electrical path 21301 into a bandpass filter 21303. The bandpass filter 21303 passes only a band of radian frequencies in the vicinity of $\Delta\omega$ so that only $B(t, Lm)$ passes through the filter (where m is an integer corresponding to the particular channel). The band-passed signal passes from 2103 via electrical path 21305 to amplitude control 21307. Amplitude control 21307 is either an analog automatic gain control circuit, an electronic clipper circuit, or a combination thereof. The amplitude control 21307 removes amplitude variations due to polarization fading or other types of signal fading. Because the signal B(t, $L_m$) is a result of a heterodyne interference, the phase remains the same after clipping. It is to be appreciated that other phase-demodulation schemes for fiber-optic signals use a phase-carrier technique that does not allow the clipping operation. Clipping is a suitable amplitude-control mechanism. The amplitude control 21307 passes an amplitude-stabilized signal via electrical path 21309 to I & Q demodulator 21311. The I & Q demodulator 21311 removes the carrier, that is it shifts the center radian frequency of the amplitude-stabilized B(t, $L_m$) from $\Delta\omega$ down to zero. The I & Q demodulator 21311 outputs a voltage proportional to $\cos(\Phi_m)$ on electrical path 21313 and a voltage proportional to $\sin(\Phi_m)$ on electrical path 21315. The $\cos(\Phi_m)$ and $\sin(\Phi_m)$ proportional voltages on electrical paths 21313 and 21315, respectively, are converted into an output signal proportional to $\Phi_m$ on electrical path 21319 by the phase detector 21317.

Reviewing the previous discussion, the plurality of phase demodulators 20081, 20083, and 20085 of FIG. 20 each function like the block diagram of 21300 of FIG. 21. The plurality (which upwardly may include a very large number, for instance 5000) of phase demodulators 21300 convert to a like plurality of signals B(t, B(t, $L_1$), B(t, $L_2$), ..., B(t, $L_n$) into a like plurality of signals proportional to $\Phi_1, \Phi_2, \ldots, \Phi_n$, which correspond to optical signals $S_1, S_2, \ldots, S_n$.

Still referring to FIGS. 20-21, alternate embodiments of the phase-demodulation circuit 16048 and phase demodulator 21300 are contemplated. For example, embodiments described in conjunction with FIGS. 1-19 and 22-25 may be applicable to the phase-demodulator circuit 16048 of FIG. 20 and the phase demodulator 21300 of FIG. 21.

I & Q Demodulator

Figure 22:
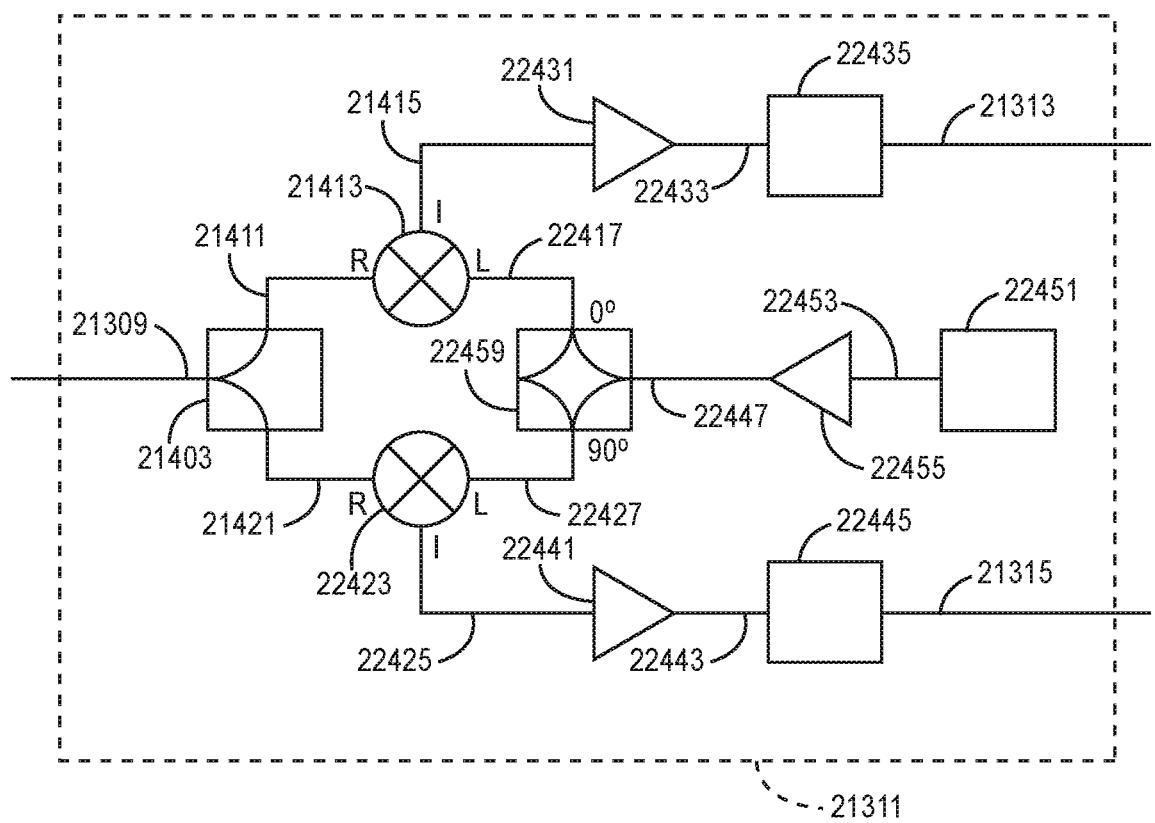
FIG. 22 is a diagram of an IQ demodulator circuit of the phase-demodulator circuit of FIG. 21, according to an embodiment.

An example implementation of the I & Q demodulator 21311 of FIG. 21 will now be presented. Referring to FIG. 22, an amplitude-stabilized B(t, $L_m$) signal (originating from the amplitude control 21307 of FIG. 21) is passed on electrical path 21309 to a power splitter 22403. Half of the signal power exiting from power splitter 22403 is passed to analog mixer, balanced mixer, Gilbert cell, or analog multiplier 21413 via electrical path 21411. The other half of signal power exiting from power splitter 21403 is passed to analog mixer, balanced mixer, Gilbert cell, or analog multiplier 21423 via electrical path 21421.

The reference oscillator 21451 generates an electronic wave proportional to $\cos(\Delta\omega t)$. In accordance with known principles of heterodyning light waves having fixed phase relationships, heterodyning the redirected optical signal from the fiber 16002 (FIG. 16) with the optical local oscillator signal from the acousto-optic modulator 16032 can produce a difference beat signal small enough to be in the r.f. signal range, but with the frequency difference sufficiently high to provide the heterodyning with a band pass allowing transforming a given binary code rate into corresponding code components of the beat signal, such as the code rate of the PRN code sequence produced by PRN code generator 16022. This reference oscillator wave is passed from the reference oscillator 22451 via the electrical path 22453 to amplifier 22455. The wave is amplified by amplifier 22455 and passed to hybrid coupler 22459 via electrical path 22447. The hybrid coupler splits the amplified reference oscillator electronic wave into two components, one proportional to $\cos(\Delta\omega t)$ on electrical path 22417 (providing the "I", or In-phase reference), and one proportional to $\sin(\Delta\omega t)$ on electrical path 22427 (providing the "Q", or Quadrature-phase reference).

The In-phase reference on electrical path 22417 is multiplied (or frequency mixed) with the signal on electrical path 22411 by multiplier 22413 to produce the output on electrical path 22415. The signal on electrical path 22415 is amplified by amplifier 22431 and passed to electronic lowpass filter 22435 via electrical path 22433. The lowpass filter 22435 removes high-frequency components of the multiplication or frequency-mixing process and results in an output at electrical path 21313 that is proportional to $\cos(\Phi_m)$.

The Quadrature-phase reference on electrical path 22427 is multiplied (or frequency mixed) with the signal on electrical path 22421 by multiplier 22423 to produce the output on electrical path 22425. The signal on electrical path 22425 is amplified by amplifier 22441 and passed to electronic lowpass filter 22445 via electrical path 22443. The lowpass filter 22445 removes high-frequency components of the multiplication or frequency-mixing process and results in an output at electrical path 21315 that is proportional to $\sin(\Phi_m)$.

Still referring to FIG. 22, alternate embodiments of the I & Q demodulator 21311 are contemplated. For example, embodiments described in conjunction with FIGS. 1-21 and 23-25 may be applicable to the I & Q demodulator 21311 of FIG. 22.

Phase Detector

Figure 23:
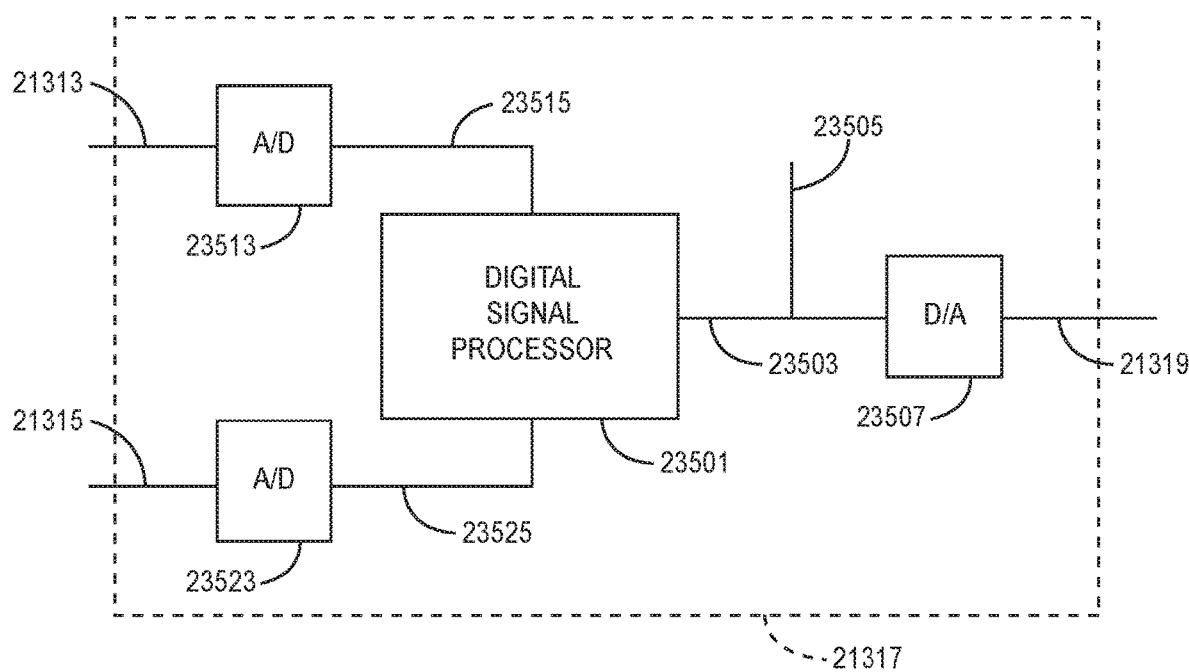
FIG. 23 is a diagram of a digital implementation of the phase-detector circuit of the phase-demodulator circuit of FIG. 21, according to an embodiment.

Referring to FIG. 23, example implementations of the phase detector 21317 of FIG. 21 is presented. An example digital phase detector implementation, 21317, is shown in the block diagram. The signal proportional to $\cos(\Phi_m)$ on electrical path 21313 is converted to a digital code or number by analog-to-digital converter (hereafter, A/D) 23513. The digital number proportional to $\cos(\Phi_m)$ is input into the digital signal processor 23501 via electrical path 23515. The signal proportional to $\sin(\Phi_m)$ on electrical path 21315 is converted to a digital code or number by A/D 23523. The digital number proportional to $\sin(\Phi_m)$ is input into the digital signal processor 23501 via electrical path 23525. The digital signal processor converts the numbers proportional to $\sin(\Phi_m)$ and $\cos(\Phi_m)$ into a number proportional to $\Phi_m$ as follows.

Suppose the constant of proportionality for the $\sin(\Phi_m)$ and $\cos(\Phi_m)$ is $V_m$. Then the digital signal processor can optimally select estimates of $\Phi_m$ and $V_m$ to minimize the calculated error function:

$$\epsilon(\hat{\Phi}_m, \hat{V}_m) = ((V_m \cos(\hat{\Phi}_m) - \hat{V}_m \cos(\hat{\Phi}_m))^2 + (V_m \sin(\Phi_m) - \hat{V}_m \sin(\hat{\Phi}_m))^2) \quad (42)$$

The digital signal processor can also calculate $\Phi_m$ directly by taking the inverse tangent function or the inverse cotangent function:

$$\Phi_m = a\tan\left(\frac{V_m \sin(\Phi_m)}{V_m \cos(\Phi_m)}\right) = a\cot\left(\frac{V_m \cos(\Phi_m)}{V_m \sin(\Phi_m)}\right) \quad (43)$$

If desired, the digital signal processor can also implement the differentiate and cross multiply (hereafter DCM) algorithm. The DCM method is as follows. The digital representation of the signals proportional to $\sin(\Phi_m)$ and $\cos(\Phi_m)$ are temporally differentiated and cross multiplied by the non-differentiated signals. The result $U_m(t)$ is integrated to produce the desired output, $\Phi_m$. Mathematically, this algorithm is:

$$U_m(t) = V_m \sin(\Phi_m) \frac{\partial}{\partial_t}(V_m \cos(\Phi_m)) - V_m \cos(\Phi_m) \frac{\partial}{\partial_t}(V_m \sin(\Phi_m)) \quad (44)$$

$$U_m(t) = V_m^2((\cos(\Phi_m))^2 + (\sin(\Phi_m))^2) \frac{\partial \Phi_m}{\partial t}$$

$$U_m(t) = V_m^2 \frac{\partial \Phi}{\partial t}$$

$$\Phi_m = \frac{1}{V_m^2} \int U_m(t) \partial t$$

The digital signal processor 23501 converts the signals arriving on electrical paths 23515 and 23525 into a digital output proportional to $\Phi_m$ on electronic path 23503. Optionally, the digital output is passed on electronic path 23505 to some other data sink such as a computer memory. The digital signal proportional to $\Phi_m$ on electronic path 23503 is converted back to an analog signal on electrical path 21319 by digital-to-analog converter 23507. By way of a summarization, the example digital phase detector 21317 accepts inputs 21313 and 21315, which originate from the I & Q demodulator 21311 of FIG. 21, and the digital phase detector 21317 outputs the phase signal $\Phi_m$ on electrical path 21319. Optionally, any of other well-known implementations of digital phase detectors may be employed.

Still referring to FIG. 23, alternate embodiments of the phase detector 21317 are contemplated. For example, embodiments described in conjunction with FIGS. 1-22 and 24-25 may be applicable to the phase detector 21317 of FIG. 23.

Figure 24:
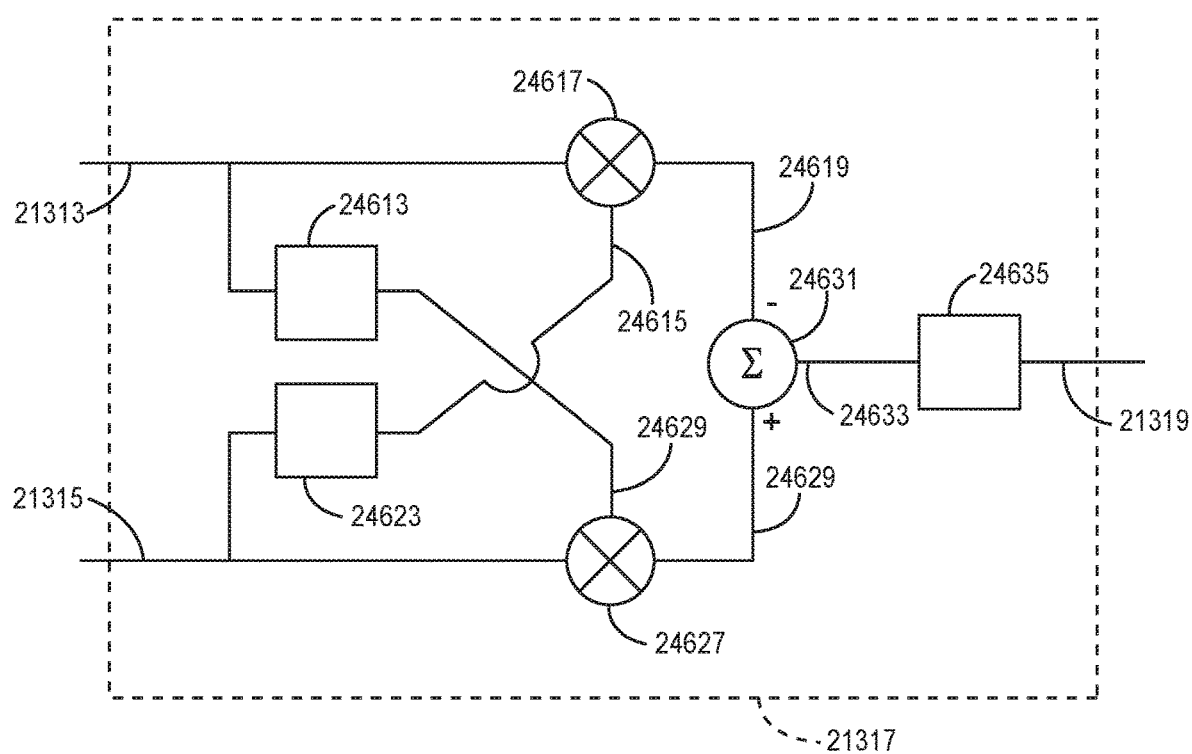
FIG. 24 is a diagram of an analog implementation of the phase-detector circuit of the phase-demodulator circuit of FIG. 21, according to an embodiment.

Refer to FIG. 24, an example analog phase detector implementation 21317' is shown in the block diagram. The example analog phase detector 21317' shown in FIG. 24 implements an analog version of the DCM algorithm discussed in the previous text. The signal proportional to $\cos(\Phi_m)$ on electrical path 21313 is input into analog temporal differentiator 24613 and analog multiplier 24617. The signal proportional to $\sin(\Phi_m)$ on electrical path 21315 is input into analog temporal differentiator 24623 and analog multiplier 24627. The differentiated cosine term on signal path 24625 is multiplied by the sine term on electrical path 21315 by analog multiplier 24627 producing the signal on electrical path 24629. The differentiated sine term on electrical path 24615 is multiplied by the cosine term on electrical path 21313 by analog multiplier 24617 producing the signal on electrical path 24619. The signals on electrical paths 24619 and 24629 are applied as inputs to differential summer 24631. The output of differential summer on electrical path 24633, which is the result of the differentiated sine and cosine product being subtracted from the differentiated cosine and sine product, corresponds to $U_m(t)$ of the DCM discussion. The signal on electrical path 24633 is integrated by analog integrator 24635 to produce the analog phase detector output proportional to $\Phi_m$ on electrical path and output 21319. By way of summarization, the example analog phase detector 21317 accepts inputs 21313 and 21315, which originate from the I & Q demodulator 21311 of FIG. 21, then the analog phase detector outputs the phase signal $\Phi_m$ on electrical path 21319. Optionally, any of other well-known implementations of analog phase detectors may be employed.

Still referring to FIG. 24, alternate embodiments of the phase detector 21317' are contemplated. For example, embodiments described in conjunction with FIGS. 1-23 and 25 may be applicable to the phase detector 21317' of FIG. 24.

Programmable Phase Difference

Figure 25:
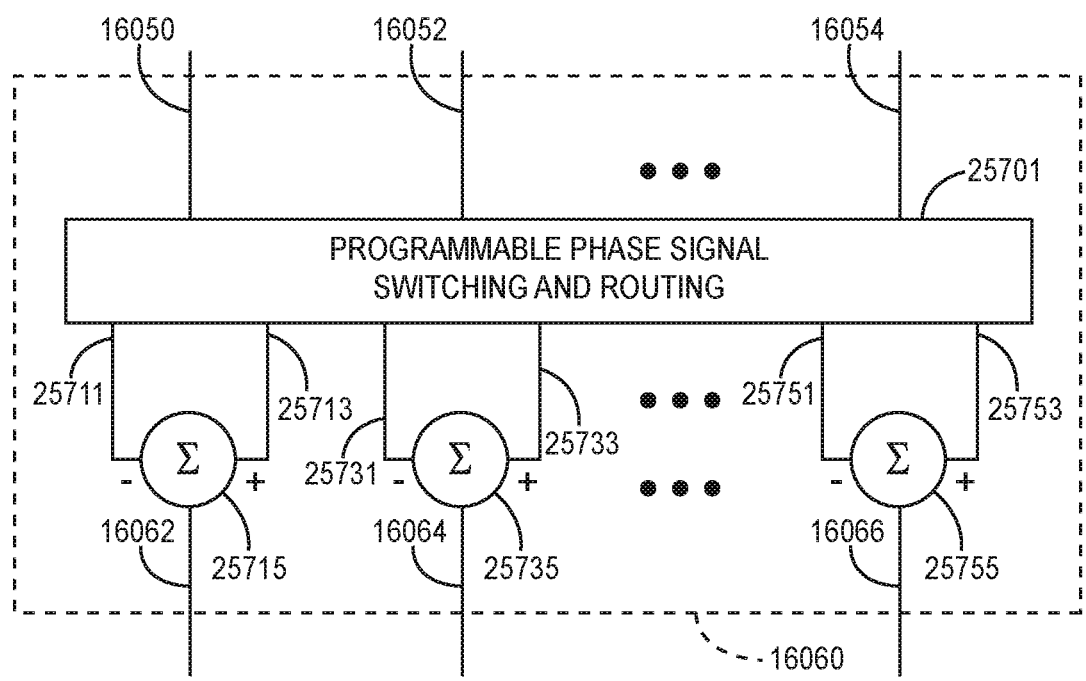
FIG. 25 is a diagram of a programmable routing-and-phase-signal-switching network configured to provide selective pairings of the outputs of the set of phase demodulators of FIG. 20 to provide differential phase signals across pairs of virtual acoustic-wave sensors along the optical fiber of the optical assembly of FIG. 16, according to an embodiment.

The example programmable phase difference implementation shown as part 16060 of FIG. 25 corresponds to phase differencer 16060 shown as a block in FIG. 16. Referring to FIG. 25, the plurality (which upwardly may include a very large number, for instance 5,000) of demodulated signals proportional to optical signal phases $\Phi_1, \Phi_2, \ldots, \Phi_n$ are input into the programmable phase signal switching and routing network 25701 via electrical paths 16050, 16052, and 16054, respectively. Network 25701 programmably selects on a basis of timed relation to code generator 16022 and routes on a basis of conventional "hold-in memory" and "transfer-from-memory", a plurality (which upwardly may include a very large number, for instance 5,000) of pairs of phase signals onto a plurality (which upwardly may include a very large number, for instance 5,000) of pairs of electronic paths 25711 and 25713, 25731 and 25733, and 25751 and 25753. The plurality of routed pairs of phase signals are applied to the corresponding subtractors 25715, 25735, and 25755 as shown in FIG. 25. The plurality of phase pairs on electronic pairs of paths 25711 and 25713, 25731 and 25733, and 25751 and 25753 are subtracted by subtractors 25715, 25735, and 25753, respectively, and the differential signals are output on a corresponding plurality of electrical paths 16062, 16064, and 16066, respectively. The following description focuses on the differencing channel output on electrical path 16062, it being understood that the modes of operation of other differencing channels in network 25701 are the same. Programmable phase switching and routing network 25701 selects one of the phase signals on one of the electrical paths 16050, 16052, or 16054 and routes the signal to electrical path 25711. The signal on electrical path 25711 is selected to be proportional to $\Phi_j$ (where j is of the set 1, 2, ..., n). Network 25701 also selects another of the phase signals on one of the other of the plurality of electronic paths 16050, 16052, or 16054 and routes the signal to electrical path 25713. The signal of electrical path 25713 is selected to be proportional to $\Phi_k$ (where k is of set 1, 2, ..., n). The signal on electrical path 25711 is subtracted from the signal on electrical path 25713 by subtractor 25715. The output of subtractor 25715 is passed on via electrical path 16062 and is proportional to $\Delta\Phi_{kj}$ hereinabove discussed. Employing this mode, network 25701 programmably makes selection from optical signal phases $\Phi_1, \Phi_2, \ldots, \Phi_n$ to provide other differential phase outputs on electrical paths 16062, 16064, and 16066. This may include a very large number of differential phase signals, for instance 5000. As an alternative to the just described type of circuitry employing subtractors 25715, 25735, and 25755 any of other well-known forms of producing a differential signal may be employed.

Still referring to FIG. 25, alternate embodiments of the phase differencer 16060 are contemplated. For example, embodiments described in conjunction with FIGS. 1-24 may be applicable to the phase differencer 16060 of FIG. 25.

An Alternative Viewpoint of the Partitioning of System 2.

As an alternative to the viewpoint inferable from the preceding sequence discussing FIG. 16, system 16016 may be considered as partitioned into: (i) an optical network for illuminating an optical fiber sensing span, or other light propagation medium sensing span, and retrieving back propagating portions of the illumination; and (ii) a photo-electronic network for establishing virtual sensors at predetermined locations along the span and picking up external physical signals incident to, or impinging upon, the sensors.

In general, the optical network for the illumination of, and for the retrieval of back-propagation from, fiber span 16002 comprises transmitter laser 16004, directional optical coupler 16010, and optical fiber, or other light propagation medium, 16002.

The photoelectronic network for establishing virtual sensors and picking up signals therefrom generally comprises two subdivisions. One subdivision provides a cyclically reiterative autocorrelatable form of modulation of the light wave illuminating fiber span 16002. This modulation is in the form of reiterated sequences having autocorrelatable properties. The other subdivision takes the retrieved back propagation and performs a heterodyning therewith to obtain an r.f. beat signal. It then picks up the signal from the virtual sensors by autocorrelation and further processes it into more useful forms.

In general, the subdivision providing the cyclical reiterative modulation of sequences illuminating fiber span 16002 comprises master correlation code generator 16022 (via one of its electrical pathway outputs) and optical modulator 16024.

In general, the subdivision for performing heterodyning with and picking up of virtual sensor signals from the retrieved back propagation (redirected optical signal) from fiber span 16002 includes a sequence of elements that perform processing upon the retrieved back propagation. First in the sequence of processing elements is an optical receiver 16024, which photo detects interference power "derived" by heterodyning the back-propagated illumination portion retrieved from fiber span 16002 with the output of an effective local oscillator (acousto-optic modulator) 16032. Laser 16004 and the output of the modulator 16032 are operated with a frequency difference to produce an r.f. beat signal, $\Delta\omega$. Then correlation system 16030 receives as one of its inputs another electrical pathway output from master correlation code generator 16022, and provides a series of channels which in turn respectively provide predetermined time delays in relation to the timing base of cyclic reiterative code generator 16022, to perform a series of autocorrelations of the respectively delayed inputs from code generator 16022 with the signal $\Delta\omega$. This picks up r.f. signals respectively representative of the affects in the light-wave domain of the external physical signals incident upon the respective virtual sensor. Phase demodulator system 16048 provides a linear phase signal derived from such r.f. signals representative of optical signals at the respective virtual sensors. Programmable phase differencer 16060 processes pairs of these linear phase signals occurring across segments of fiber span 16002 between programmably selected pairs of the virtual sensors.

Following is another overview description which more particularly calls attention to an aspect of one or more embodiments that the system elements which perform the autocorrelation enable providing an output in the form of an r.f. counterpart of a light-wave time-domain reflectometry output of signals incident to the virtual sensors as light-wave time-domain reflectometry outputs a CW light wave modulated by a continuously reiterated binary pseudorandom code sequence is launched into an end of a span of ordinary optical fiber cable. Portions of the launched light wave back propagate to the launch end from a continuum of locations along the span because of innate fiber properties including Rayleigh scattering. This is picked off the launch end and heterodyned to produce an r.f. beat signal. The r.f. beat signal is processed by a plurality (which can be thousands) of correlator type binary pseudonoise code sequence demodulators respectively operated in different delay time relationships to the timing base of the reiterated modulation sequences. The outputs of the demodulators provide r.f. time-domain reflectometry outputs representative of signals (e.g., acoustic pressure waves) incident to virtual sensors along the fiber at positions corresponding to the various time delay relationships.

Following is still another overview description which more particularly calls attention to an aspect of embodiments that the system elements performing the autocorrelation enable detection of unique spectral components representing a phase variations of external signals incident to the virtual sensors. A CW light wave modulated by a continuously reiterated pseudorandom code sequence is launched into an end of a span of ordinary optical fiber cable. Portions of the launched light wave back propagate to the launch end from a continuum of locations along the span because of innate fiber properties including Rayleigh scattering. This is picked off the launch end and heterodyned producing an r.f. beat signal. The r.f. beat signal is processed by a plurality (which can be thousands) of correlator type pseudonoise code sequence demodulation and phase demodulator units, operated in different time delay relationships to the timing base of the reiterated modulation sequences. These units provide outputs representative of phase variations in respective unique spectral components in the r.f. beat signal caused by acoustic, or other forms of signals, incident to virtual sensors at fiber positions corresponding to the various time delay relationships.

Following is yet another overview description which more particularly calls attention to an aspect of embodiments that a pair of the different delay time relationships of the autocorrelation system elements are effective to establish a virtual increment of the optical fiber span, and that a subtractor circuit of phase differencer 16060 enables representing the differential phase signal across the virtual increment. A CW light wave modulated by a continuously reiterated pseudorandom (PN) code sequence is launched into an end of a span of ordinary optical fiber cable. Portions of the launched light wave back propagate to the launch end from a continuum of locations along the span because of innate fiber properties including Rayleigh scattering. This is picked off the launch end and heterodyned producing an r.f. beat signal. The r.f. beat signal is processed by a plurality (which can be thousands) of correlator pseudonoise code sequence demodulation and phase demodulator units operated in different delay time relationships to the timing base of the reiterated modulation sequences. Pairs of outputs of the units are connected to respective subtractor circuits, each providing a signal representative of signal differential of incident acoustic signals, or other forms of signals, across virtual increments of the span established by a pair of said delay time relationships.

Mandrel-Modified Embodiment

FIG. 2 illustrates a so-called fiber-on-an-airbacked mandrel assembly 1006, useful in applications in which a fiber optic span 1010 is to be immersed in a liquid medium. Assembly 1006 comprises a hollow cylindrical mandrel form 2000 having formed therein a sealed central chamber 2004 containing air or other gaseous medium, which is compressible relative to the liquid medium. A segment of span 1010 of a ROSE system 16016 (FIG. 16), is helically wound about the cylindrical exterior surface of form 2000, and suitably fixedly bonded to the surface. The cylindrical wall of form 2000 is of a material so-chosen and of a thickness so chosen to form a containic membrane with a hoop stiffness that enables acoustic pressure wave signals incident upon assembly 1006 to be transformed into mandrel radial dimensional variations. As a result of mandrel 1006's geometry, these radial variations result in magnified longitudinal strain variations in fiber 1010. It is to be appreciated that the physical structure of assembly 1006 inherently provides a spatial succession of two locations along the fiber span, which a phase signal switch and routing network could select and route to become the virtual bounding positions of a differential phase signal virtual sensor. This is to say, positioning a mandrel wound span 1010 as a segment of a system total span 16002 of ROSE system 16016 can facilitate providing a sequential pair of virtual sensor locations along a span 16002, and the provision of a corresponding pair of delay circuits in correlator circuit 16030 would cause mandrel 1006 to operate as a differential signal sensor.

Advantages and New Features

Embodiments enable the interrogation or time-delay correlational multiplexing and demultiplexing of optical phase signals.

Embodiments enable the interrogation of ROSE (Rayleigh Optical Scattering and Encoding) fiber optic sensors. Embodiments enable the spatial sorting and separation of the temporal optical phases of backscattered optical signals arising from a plurality (which upwardly may include a very large number, for instance 5,000) of virtual optical sensors along fibers or other optical mediums. Embodiments enable the spatial decoding of backscattered optical signals with a bandwidth of tens of kilohertz. Embodiments enable the sensor locations along the fiber to be programmable. Embodiments allow the electronic separation or segmentation of the array of fiber sensors into programmable bounded lengths and positions. Because the correlation signal c(t) can be designed to be a continuous wave, embodiments increase the average optical power considerably over conventional pulsed optical phase sensor interrogation methods. Because the correlation signal c(t) can be chosen to have spectrum spreading properties for which dispreading electronic circuitry is readily available, undesired optical fiber system noises, such as reflection discontinuity noises due to cable couplings, can be materially attenuated.

In hypothetically assessing the potential achievable by embodiments with regard to employment of a common grade of optical fiber cable buried beneath the ground surface as a perimeter intrusion monitoring fiber span, the following assumptions have been made: (i) signal to noise ratio (S/N) degradation of Rayleigh effect light propagation in such an optical fiber cable are assumed to be 0.5 db/km; (ii) it is assumed there is a requirement for bandwidth of ten times that of the geo-acoustic intruder signal needs to be detected; (iii) and digital circuitry functions are performed employing conventional "high end" clock rates. Using these assumptions and employing conventional single-mode or multimode fiber buried 6-12 inches underground, and using conventional engineering methodology for noise-effect prediction, it can be shown that ROSE system 16016 has the potential of sensing intruder caused geoacoustic, (i.e., seismic) signals along a length of fiber span line as long as 8 km or 5 miles. (This assessment is based upon S/N degradations for fly-back travel of signals from the interrogation launch end of fiber span 16002 to its remote end and back.) The hypothetical segment resolution capability with such an 8-km, or 5-mile line, would be 1 meter.

Embodiments provide a new capability of heterodyne optical phase detection without resorting to dithered phase carrier methods. The phase demodulation method introduces heterodyne I & Q demodulation to produce cosine and sine phase components, clipped signal amplitude stabilization techniques and digital-signal-processing-based phase detection. The spatially differential phase detection method provided by embodiments enables the rejection of unwanted lead-in fiber phase signals.

The details, materials step of operation and arrangement of parts herein have been described and illustrated in order to explain the nature of the embodiments and techniques disclosed herein. Many modifications in these are possible by those skilled in the art within the teachings herein. For example, while in system 16016 the transformation from optical to r.f. signal takes place prior to processing by programmable correlator 16030, it is within the skill of the art to design optical receiver 16024 and correlator system 16030 to have the transformation take place otherwise. Also, the acoustic-optic modulator 16032 can be a Bragg Cell. The diffracted optical wave exiting the acousto-optic modulator will be Doppler shifted by an impinging-driving RF wave, that is translated into a sound wave in the acousto-optic modulator, and the so-called Bragg shifted-diffracted optical wave will exit the acousto-optical modulator with an optical frequency equivalent to a phase-locked laser if two lasers were used in a phase-locked-loop configuration where the second laser generates the optical local-oscillator signal. As described above, the acousto-optically generated light wave is sent along optical pathway 16034 and becomes the local oscillator input to heterodyne photoreceiver 16024. Accordingly, it is to be understood that changes may be made by those skilled in the art within the principle and scope of the teachings herein.

The methods and techniques described herein may be implemented in analog electronic circuitry, digital electronic circuitry, or with a programmable processor (for example, a special-purpose processor, a general-purpose processor such as a computer, a microprocessor, or microcontroller) or other circuit (for example, an FPGA), firmware, software, or in combinations of them. Apparatuses embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a mandrel, comprising: a connector having first and second aligned openings and a third opening between the first and second openings; and a form coupled to the connector at the third opening, having an outer surface, a cavity, an end, and fourth and fifth openings between the cavity and the outer surface, and configured to receive an optical fiber that extends into the first opening of the connector, through the third opening of the connector, into the cavity at the end of the form, and through the fourth opening of the form, that forms one or more turns around the outer surface of the form, and that extends through the fifth opening of the form into the cavity, out from the cavity at the end, into the third opening of the connector, and out from the second opening of the connector.

Example 2 includes the mandrel of Example 1, wherein the connector further comprises: a first section having first and second ends at which the first and second openings are disposed; and a second section having a first end coupled to the first section between the first and second ends of the first section, and having a second end at which the third opening is disposed.

Example 3 includes the mandrel of any of Examples 1-2, wherein the connector is T shaped.

Example 4 includes the mandrel of any of Examples 1-3, wherein at least a portion of the second section is orthogonal to the first section.

Example 5 includes the mandrel of any of Examples 1-4, wherein the second section comprises: a first portion that includes the first end of the second section and that is orthogonal to the first section; and a second portion that includes the second end of the second section and that is orthogonal to the first portion.

Example 6 includes the mandrel of any of Examples 1-5, wherein the second portion is moveable relative to the first portion.

Example 7 includes the mandrel of any of Examples 1-6, wherein the second portion is rotatable relative to the first portion.

Example 8 includes the mandrel of any of Examples 1-7, further comprising the optical fiber.

Example 9 includes the mandrel of any of Examples 1-8, further comprising a cover disposed over the optical fiber and the form.

Example 10 includes the mandrel of any of Examples 1-9, further comprising: the optical fiber; and at least one optical-signal redirector disposed in a portion of the optical fiber that forms one or more turns around the outer surface of the form.

Example 11 includes the mandrel of any of Examples 1-10, further comprising shrink wrap disposed over the optical fiber and the form.

Example 12 includes a method, comprising: inserting an end of an optical fiber through a first opening of a connector; inserting the end of the fiber through a second opening of the connector and into an end of a cavity within a form; running the end of the fiber from the cavity through a first opening in the form; wrapping the fiber around an outer side of the form; running the end of the fiber back into the cavity through a second opening in the form; running the end of the fiber out from the end of the cavity; inserting the end of the fiber into the second opening of the connector; and running the end of the fiber out from the connector though a third opening of the connector.

Example 13 includes the method of Example 12, further comprising attaching the form to the connector such that the end of the cavity is aligned with the second opening of the connector.

Example 14 includes the method of any of Examples 12013, further comprising moving the attached form relative to a portion of the connector.

Example 15 includes the method of any of Examples 12-14, further comprising forming a cover over the fiber and the outer side of the form.

Example 16 includes the method of any of Examples 12-15, further comprising covering the fiber and the outer side of the form with shrink wrap.

Example 17 includes a mandrel, comprising: an outer conduit having first and second ends; an inner conduit disposed inside of the outer conduit and having first and second ends; a first end cap having an outer end, an inner end coupled to the first end of the inner conduit and having a perimeter, and an optical-fiber path extending between the outer end and the perimeter; and a second end cap having an outer end, an inner end coupled to the second end of the inner conduit and having a perimeter, and an optical-fiber path extending between the outer end and the perimeter.

Example 18 includes the mandrel of Example 17, wherein: the inner end of the first end cap includes an outer receptacle; the inner end of the second end cap includes an outer receptacle; and the first and second ends of the outer conduit are respectively disposed in the outer receptacles of the first and second end caps.

Example 19 includes the mandrel of any of Examples 17-18, wherein the outer receptacles of the first and second end caps comprise respective slots.

Example 20 includes the mandrel of any of Examples 17-19, wherein: the inner end of the first end cap includes an inner receptacle; the inner end of the second end cap includes an inner receptacle; and the first and second ends of the inner conduit are respectively disposed in the inner receptacles of the first and second end caps.

Example 21 includes the mandrel of any of Examples 17-20, wherein: the inner receptacles of the first and second end caps comprise respective threads; and the first and second ends of the inner conduit comprise respective threads that are engaged with the threads of the inner receptacles of the first and second end caps, respectively.

Example 22 includes the mandrel of any of Examples 17-21, further comprising: a first fiber grip coupled to the outer end of the first cap; and a second fiber grip coupled to the outer end of the second end cap.

Example 23 includes the mandrel of any of Examples 17-22, wherein: the outer end of the first end cap includes a receptacle; the outer end of the second end cap includes a receptacle; and the first and second fiber grips are respectively disposed in the receptacles of the outer ends of the first and second end caps.

Example 24 includes the mandrel of any of Examples 17-23, wherein: the receptacles of the outer ends of the first and second end caps comprise respective threads; and the first and second fiber grips comprise respective threaded ends that are engaged with the threads of the receptacles of the outer ends of the first and second end caps, respectively.

Example 25 includes the mandrel of any of Examples 17-24, wherein the inner and outer conduits are cylindrical.

Example 26 includes the mandrel of any of Examples 17-25, further comprising an optical fiber that extends from the outer end of the first end cap, through the optical-fiber path of the first end cap, around the outer conduit one or more turns, through the optical-fiber path of the second end cap, and to the outer end of the second end cap.

Example 27 includes the mandrel of any of Examples 17-26, further comprising at least one optical-signal reflector disposed in a portion of the optical fiber that extends around the outer conduit one or more turns.

Example 28 includes the mandrel of any of Examples 17-27, further comprising an optical fiber that extends through the first fiber grip, the outer end of the first end cap, and the optical-fiber path of the first end cap, around the outer conduit one or more turns, and through the optical-fiber path of the second end cap, the outer end of the second end cap, and the second fiber grip.

Example 29 includes the mandrel of any of Examples 17-28, further comprising: an optical fiber that extends from the outer end of the first end cap, through the optical-fiber path of the first end cap, around the outer conduit one or more turns, through the optical-fiber path of the second end cap, and to the outer end of the second end cap; and an optical-fiber support member that extends from the outer end of the first end cap, through the inner conduit, and to the outer end of the second end cap.

Example 30 includes the mandrel of any of Examples 17-29, further comprising: an optical fiber that extends through the first fiber grip, the outer end of the first end cap, and the optical-fiber path of the first end cap, around the outer conduit one or more turns, and through the optical-fiber path of the second end cap, the outer end of the second end cap, and the second fiber grip; and an optical-fiber support member that extends through the first fiber grip, the outer end of the first end cap, the inner conduit, the outer end of the second end cap, and the second fiber grip.

Example 31 includes a method, comprising: inserting an optical fiber through an outer end of a first end cap and an optical-fiber path of the first end cap, and out from an outer perimeter of an inner end of the first end cap; wrapping the optical fiber one or more turns around an outer conduit having ends respectively engaged with the inner end of the first end cap and with an inner end of a second end cap; and inserting the optical fiber through an optical-fiber path of the second end cap from an outer perimeter of the inner end of the second end cap to an outer end of the second end cap.

Example 32 includes the method of Example 31, further comprising: inserting the optical fiber through a first fiber grip before inserting the optical fiber through the outer end of the first end cap; and inserting the optical fiber through a second fiber grip after inserting the optical fiber through the optical-fiber path of the second end cap.

Example 33 includes the method of any of Examples 31-32, further comprising: inserting the optical fiber through a first fiber grip before inserting the optical fiber through the outer end of the first end cap; inserting the optical fiber through a second fiber grip after inserting the optical fiber through the optical-fiber path of the second end cap; attaching the first fiber grip to the outer end of the first cap; and attaching the second fiber grip to the outer end of the second end path.

Example 34 includes the method of any of Examples 31-33, further comprising: inserting the optical fiber through a first fiber grip engaged with the outer end of the first end cap before inserting the optical fiber through the outer end of the first end cap; and inserting the optical fiber through a second fiber grip engaged with the outer end of the second end cap after inserting the optical fiber through the optical-fiber path of the second end cap.

Example 35 includes the method of any of Examples 31-34, further comprising inserting a fiber-support member through the first end cap, the outer conduit, and the second end cap.

Example 36 includes the method of any of Examples 31-35, further comprising: disengaging a fiber-support member from the optical fiber before inserting the optical fiber through the outer end of the first end cap; inserting the fiber-support member through the first end cap, the outer conduit, and the second end cap; and reengaging the fiber-support member with the optical fiber after inserting the optical fiber through the outer end of the second end cap.

Example 37 includes the method of any of Examples 31-36, further comprising inserting a fiber-support member through the first end cap, through an inner conduit that is disposed within the outer conduit and that has first and second ends respectively engaged with the inner ends of the first and second end caps, and through the second end cap.

Example 38 includes the method of any of Examples 31-37, further comprising: disengaging a fiber-support member from the optical fiber before inserting the optical fiber through the outer end of the first end cap; inserting the fiber-support member through the first end cap, through an inner conduit that is disposed within the outer conduit and that has first and second ends respectively engaged with the inner ends of the first and second end caps, and through the second end cap; and reengaging the fiber-support member with the optical fiber after inserting the optical fiber through the outer end of the second end cap.

Example 39 includes the method of any of Examples 31-38, further comprising: inserting the optical fiber through a first fiber grip before inserting the optical fiber through the outer end of the first end cap; inserting the optical fiber through a second fiber grip after inserting the optical fiber through the optical-fiber path of the second end cap; disengaging a fiber-support member from the optical fiber before inserting the optical fiber through the outer end of the first end cap; inserting the fiber-support member through the first fiber grip, through the first end cap, through an inner conduit that is disposed within the outer conduit and that has first and second ends respectively engaged with the inner ends of the first and second end caps, through the second end cap, and through the second fiber grip; and reengaging the fiber-support member with the optical fiber after inserting the optical fiber through the second fiber grip.

Example 40 includes an assembly, comprising: an optical fiber; and at least one mandrel each including a respective outer conduit having first and second ends and about which a respective portion of the optical fiber is wound; a respective inner conduit disposed inside of the outer conduit and having first and second ends; a respective first end cap having an outer end, an inner end coupled to the first end of the inner conduit and having a perimeter, and an optical-fiber path extending between the outer end and the perimeter and within which a respective portion of the optical fiber is disposed; and a respective second end cap having an outer end, an inner end coupled to the second end of the inner conduit and having a perimeter, and an optical-fiber path extending between the outer end and the perimeter and within which a respective portion of the optical fiber is disposed.

Example 41 includes a system, comprising: an optical fiber having an end; at least one mandrel each including a respective outer conduit having first and second ends and about which a respective portion of the optical fiber is wound; a respective inner conduit disposed inside of the outer conduit and having first and second ends; a respective first end cap having an outer end, an inner end coupled to the first end of the inner conduit and having a perimeter, and an optical-fiber path extending between the outer end and the perimeter and within which a respective portion of the optical fiber is disposed; and a respective second end cap having an outer end, an inner end coupled to the second end of the inner conduit and having a perimeter, and an optical-fiber path extending between the outer end and the perimeter and within which a respective portion of the optical fiber is disposed; and a signal detector configured to direct a source optical beam into the end of the optical fiber, to receive a redirected optical beam from the end of the optical fiber, and to detect an acoustic signal incident on at least one of the at least one mandrel in response to the redirected optical beam.

Example 42 includes the system of Examples 41, wherein each of the at least one mandrel is disposed inline relative to the optical fiber.

Example 43 includes the system of any of Examples 41-42, wherein the signal detector is configured to determine an amplitude and a frequency of the detected acoustic signal in response to the redirected optical beam.

Example 44 includes the system of any of Examples 41-43, wherein the signal detector is configured to determine a location of a source of the detected acoustic signal in response to components of the redirected optical beam, each component corresponding to a respective one of the at least one mandrel.

Example 45 includes the system of any of Examples 41-44, wherein the signal detector is configured to detect an acoustic signal incident on at least one portion of the optical fiber that is external to the at least one mandrel in response to the redirected optical beam.

Example 46 includes the system of any of Examples 41-45, wherein: the signal detector is configured to detect an acoustic signal incident on at least one portion of the optical fiber that is external to the at least one mandrel in response to the redirected optical beam; and the signal detector is configured to determine a location of a source of the detected acoustic signal in response to components of the redirected optical beam, each component corresponding to either a respective one of the at least one mandrel or to a respective one of the at least one portion of the optical fiber.

Example 47 includes the system of an of Examples 41-46, further comprising a fiber-support member that extends through the respective first end cap, the respective inner conduit, and the respective second end cap of at least one of the at least one mandrel and that engages at least one portion of the optical fiber external to the at least one mandrel.

Example 48 includes a method, comprising: sourcing an optical beam into an end of an optical fiber that extends through an optical-fiber path of a respective first end cap of each at least one mandrel, that is wound about a respective outer conduit of each of the at least one mandrel, and that extends through an output-fiber path of a respective second end cap of each of the at least one mandrel fiber; receiving a redirected optical beam from the end of the optical fiber; and detecting an acoustic signal incident on at least one of the at least one mandrel in response to the redirected optical beam.

Example 49 includes the method of Example 48, further comprising determining an amplitude and a frequency of the detected acoustic signal in response to the redirected optical beam.

Example 50 includes the method of any of Examples 48-49, further comprising determining a location of a source of the detected acoustic signal in response to components of the redirected optical beam, each component corresponding to a respective one of the at least one mandrel.

Example 51 includes the method system of any of Examples 48-50, further comprising detecting an acoustic signal incident on at least one portion of the optical fiber that is external to the at least one mandrel in response to the redirected optical beam.

Example 52 includes the method system of any of Examples 48-51, further comprising: detecting an acoustic signal incident on at least one portion of the optical fiber that is external to the at least one mandrel in response to the redirected optical beam; and determining a location of a source of the detected acoustic signal in response to components of the redirected optical beam, each component corresponding to either a respective one of the at least one mandrel or to a respective one of the at least one portion of the optical fiber.

Example 53 includes a system, comprising: a light source configured to generate a source optical signal; an optical assembly configured to direct the source optical signal into an end of an optical-fiber assembly that includes an optical fiber having at least one section each wrapped multiple turns around a respective one of at least one mandrel and each including respective mandrel zones, and to receive, from the end of the optical-fiber assembly, a return optical signal; and an electronic circuit configured to select a first mandrel zone of one of the at least one section of the optical fiber in response to a first component of the return optical signal redirected by the first mandrel zone, and to detect an acoustic signal incident on the one of the at least one mandrel around which the one of the at least one section of the optical fiber is wound in response to the first component of the return optical signal.

Example 54 includes the system of Examples 53, wherein the electronic circuit is further configured to select the first mandrel zone in response to the first component of the return optical signal having a characteristic that is closer to a target than at least one other component of the return optical signal each redirected by a respective other mandrel zone of the one of the at least one section of the optical fiber.

Example 55 includes the system of any of Examples 53-54, wherein the electronic circuit is further configured to select the first mandrel zone in response to the first component of the return optical signal having a lower noise component than at least one other component of the return optical signal each redirected by a respective other mandrel zone of the one of the at least one section of the optical fiber.

Example 56 includes the system of any of Examples 53-55, wherein the electronic circuit is further configured to select the first mandrel zone in response to the first component of the return optical signal having a higher optical power than at least one other component of the return optical signal each redirected by a respective other mandrel zone of the one of the at least one section of the optical fiber.

Example 57 includes the system of any of Examples 53-56, wherein the electronic circuit is further configured to determine a frequency of the acoustic signal in response to the first component of the return optical signal.

Example 58 includes the system of any of Examples 53-57, wherein the electronic circuit is further configured to determine a strength of the acoustic signal in response to the first component of the return optical signal.

Example 59 includes the system of any of Examples 53-58, wherein the electronic circuit is further configured to determine an amplitude of the acoustic signal in response to the first component of the return optical signal.

Example 60 includes the system of any of Examples 53-59, wherein the electronic circuit is further configured to determine a power of the acoustic signal in response to the first component of the return optical signal.

Example 61 includes the system of any of Examples 53-60, wherein the electronic circuit is further configured: to select a second mandrel zone of the one of the at least one section of the optical fiber in response to a second component of the return optical signal redirected by the second mandrel zone, and to detect the acoustic signal in response to the second component of the return optical signal.

Example 62 includes the system of any of Examples 53-61, wherein: the first mandrel zone is located along a half of the one of the at least one mandrel in a lengthwise dimension; and the electronic circuit is further configured: to select a second mandrel zone of the one of the at least one section of the optical fiber in response to a second component of the return optical signal redirected by the second mandrel zone, the second mandrel zone is located along another half of the one of the at least one mandrel in the lengthwise dimension, and to determine that the acoustic signal is incident on the one of the at least one mandrel in response to the first and second components of the return optical signal.

Example 63 includes the system of any of Examples 53-62, wherein: the first mandrel zone is located along a half of the one of the at least one mandrel in a lengthwise dimension; and the electronic circuit is further configured: to select a second mandrel zone of the one of the at least one section of the optical fiber in response to a second component of the return optical signal redirected by the second mandrel zone, the second mandrel zone is located along another half of the one of the at least one mandrel in the lengthwise dimension, to determine respective first and second values of a characteristic of the first and second components of the return optical signal, and to determine that the acoustic signal is incident on the one of the at least one mandrel in response to a combination of the first and second values.

Example 64 includes the system of any of Examples 53-63, wherein: the first mandrel zone is located along a half of the one of the at least one mandrel in a lengthwise dimension; and the electronic circuit is further configured: to select a second mandrel zone of the one of the at least one section of the optical fiber in response to a second component of the return optical signal redirected by the second mandrel zone, the second mandrel zone is located along another half of the one of the at least one mandrel in the lengthwise dimension, to determine respective first and second phases of the first and second components of the return optical signal, to determine that the acoustic signal is incident on the one of the at least one mandrel in response to a difference between the first and second phases.

Example 65 includes the system of any of Examples 53-64, wherein: the first mandrel zone is located along a half of the one of the at least one mandrel in a lengthwise dimension; and the electronic circuit is further configured: to select the first mandrel zone in response to the first component of the return optical signal having a lower noise component than at least one other component of the return optical signal each redirected by a respective other mandrel zone of the one of the at least one section of the optical fiber located along the half of the one of the at least one mandrel, to select a second mandrel zone of the one of the at least one section of the optical fiber located along another half of the one of the at least one mandrel in the lengthwise dimension in response to a second component of the return optical signal redirected by the second mandrel zone having a lower noise component than at least one other component of the return optical signal each redirected by a respective other mandrel zone of the one of the at least one section of the optical fiber located along the other half of the one of the at least one mandrel, to determine respective first and second phases of the first and second components of the return optical signal, and to determine that the acoustic signal is incident on the one of the at least one mandrel in response to a difference between the first and second phases.

Example 66 includes the system of any of Examples 53-65, wherein: the first mandrel zone is located along a half of the one of the at least one mandrel in a lengthwise dimension; and the electronic circuit is further configured: to select the first mandrel zone in response to the first component of the return optical signal having a higher optical power than at least one other component of the return optical signal each redirected by a respective other mandrel zone of the one of the at least one section of the optical fiber located along the half of the one of the at least one mandrel, to select a second mandrel zone of the one of the at least one section of the optical fiber located along another half of the one of the at least one mandrel in the lengthwise dimension in response to a second component of the return optical signal redirected by the second mandrel zone having a higher optical power than at least one other component of the return optical signal each redirected by a respective other mandrel zone of the one of the at least one section of the optical fiber located along the other half of the one of the at least one mandrel, to determine respective first and second phases of the first and second components of the return optical signal, and to determine that the acoustic signal is incident on the one of the at least one mandrel in response to a difference between the first and second phases.

Example 67 includes the system of any of Examples 53-66, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a combination of the first, second, and third phases.

Example 68 includes the system of any of Examples 53-67, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between a sum of the first and second phases and a sum of the third phases.

Example 69 includes the system of any of Examples 53-68, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between an average of the first and second phases and an average of the third phases.

Example 70 includes the system of any of Examples 53-69, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a combination of the first, second, and third phases.

Example 71 includes the system of any of Examples 53-70, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between a sum of the first and second phases and a sum of the third phases.

Example 72 includes the system of any of Examples 53-71, wherein: the first mandrel zone is located along an end third of the one of the at least one mandrel in a lengthwise dimension; and the electronic circuit is further configured: to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between an average of the first and second phases and an average of the third phases.

Example 73 includes the system of any of Examples 53-72, further comprising the optical-fiber assembly.

Example 74 includes a method, comprising: directing a source optical signal into an end of an optical-fiber assembly that includes an optical fiber having at least one section each wrapped multiple turns around a respective one of at least one mandrel and each including respective mandrel zones; receiving, from the end of the optical-fiber assembly, a return optical signal; selecting a first mandrel zone of one of the at least one section of the optical fiber in response to a first component of the return optical signal redirected by the first mandrel zone; and determining that an acoustic signal is incident on the one of the at least one mandrel around which the one of the at least one section of the optical fiber is wrapped in response to the first component of the return optical signal.

Example 75 includes the method of Example 74, further comprising selecting the first mandrel zone in response to the first component of the return optical signal having a characteristic that is closer to a target than at least one other component of the return optical signal each redirected by a respective other mandrel zone of the one of the at least one section of the optical fiber.

Example 76 includes the method of any of Examples 74-75, further comprising selecting the first mandrel zone in response to the first component of the return optical signal having a lower noise component than at least one other component of the return optical signal each redirected by a respective other mandrel zone of the one of the at least one section of the optical fiber.

Example 77 includes the method of any of Examples 74-76, further comprising selecting the first mandrel zone in response to the first component of the return optical signal having a higher optical power than at least one other component of the return optical signal each redirected by a respective other mandrel zone of the one of the at least one section of the optical fiber.

Example 78 includes the method of any of Examples 74-77, further comprising determining a frequency of the acoustic signal in response to the first component of the return optical signal.

Example 79 includes the method of any of Examples 74-78, further comprising determining a strength of the acoustic signal in response to the first component of the return optical signal.

Example 80 includes the method of any of Examples 74-79, further comprising determining an amplitude of the acoustic signal in response to the first component of the return optical signal.

Example 81 includes the method of any of Examples 74-80, further comprising determining a power of the acoustic signal in response to the first component of the return optical signal.

Example 82 includes the method of any of Examples 74-81, further comprising: selecting a second mandrel zone of the one of the at least one section of the optical fiber in response to a second component of the return optical signal redirected by the second mandrel zone; and determining that the acoustic signal is incident on the one of the at least one mandrel in response to the second component of the return optical signal.

Example 83 includes the method of any of Examples 74-82, further comprising: wherein the first mandrel zone is located along a half of the one of the at least one mandrel in a lengthwise dimension; selecting a second mandrel zone of the one of the at least one section of the optical fiber in response to a second component of the return optical signal redirected by the second mandrel zone, the second mandrel zone is located along another half of the one of the at least one mandrel in the lengthwise dimension; determining that the acoustic signal is incident on the one of the at least one mandrel in response to the first and second components of the return optical signal.

Example 84 includes the method of any of Examples 74-83, further comprising: wherein the first mandrel zone is located along a half of the one of the at least one mandrel in a lengthwise dimension; selecting a second mandrel zone of the one of the at least one section of the optical fiber in response to a second component of the return optical signal redirected by the second mandrel zone, the second mandrel zone is located along another half of the one of the at least one mandrel in the lengthwise dimension; determining respective first and second values of a characteristic of the first and second components of the return optical signal; and determining that the acoustic signal is incident on the one of the at least one mandrel in response to a combination of the first and second values.

Example 85 includes the method of any of Examples 74-84, further comprising: wherein the first mandrel zone is located along a half of the one of the at least one mandrel in a lengthwise dimension; selecting a second mandrel zone of the one of the at least one section of the optical fiber in response to a second component of the return optical signal redirected by the second mandrel zone, the second mandrel zone is located along another half of the one of the at least one mandrel in the lengthwise dimension; determining respective first and second phases of the first and second components of the return optical signal; and determining that the acoustic signal is incident on the one of the at least one mandrel in response to a difference between the first and second phases.

Example 86 includes the method of any of Examples 74-85, further comprising: wherein the first mandrel zone is located along a half of the one of the at least one mandrel in a lengthwise dimension; selecting the first mandrel zone in response to the first component of the return optical signal having a lower noise component than at least one other component of the return optical signal each redirected by a respective other mandrel zone of the one of the at least one section of the optical fiber located along the half of the one of the at least one mandrel; selecting a second mandrel zone of the one of the at least one section of the optical fiber located along another half of the one of the at least one mandrel in the lengthwise dimension in response to a second component of the return optical signal redirected by the second mandrel zone having a lower noise component than at least one other component of the return optical signal each redirected by a respective other mandrel zone of the one of the at least one section of the optical fiber located along the other half of the one of the at least one mandrel; determining respective first and second phases of the first and second components of the return optical signal; and determining that the acoustic signal is incident on the one of the at least one mandrel in response to a difference between the first and second phases.

Example 87 includes the method of any of Examples 74-86, further comprising: wherein the first mandrel zone is located along a half of the one of the at least one mandrel in a lengthwise dimension; selecting the first mandrel zone in response to the first component of the return optical signal having a higher optical power than at least one other component of the return optical signal each redirected by a respective other mandrel zone of the one of the at least one section of the optical fiber located along the half of the one of the at least one mandrel; selecting a second mandrel zone of the one of the at least one section of the optical fiber located along another half of the one of the at least one mandrel in the lengthwise dimension in response to a second component of the return optical signal redirected by the second mandrel zone having a higher optical power than at least one other component of the return optical signal each redirected by a respective other mandrel zone of the one of the at least one section of the optical fiber located along the other half of the one of the at least one mandrel; determining respective first and second phases of the first and second components of the return optical signal; and determining that the acoustic signal is incident on the one of the at least one mandrel in response to a difference between the first and second phases.

Example 88 includes the method of any of Examples 74-87, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; and determining that the acoustic signal is incident on the one of the at least one mandrel in response to a combination of the first, second, and third phases.

Example 89 includes the method of any of Examples 74-88, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; and determining that the acoustic signal is incident on the one of the at least one mandrel in response to a difference between a sum of the first and second phases and a sum of the third phases.

Example 90 includes the method of any of Examples 74-89, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; and determining that the acoustic signal is incident on the one of the at least one mandrel in response to a difference between an average of the first and second phases and an average of the third phases.

Example 91 includes the method of any of Examples 74-90, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; determining that the acoustic signal is incident on the one of the at least one mandrel in response to a combination of the first, second, and third phases.

Example 92 includes the method of any of Examples 74-91, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; and determining that the acoustic signal is incident on the one of the at least one mandrel in response to a difference between a sum of the first and second phases and a sum of the third phases.

Example 93 includes the method of any of Examples 74-92, further comprising: wherein the first mandrel zone is located along an end third of the one of the at least one mandrel in a lengthwise dimension; selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel; selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel; determining respective phases of the first, second, and third phases of the first, second, and third components of the return optical signal; and determining that the acoustic signal is incident on the one of the at least one mandrel in response to a difference between an average of the first and second phases and an average of the third phases.

Example 94 includes a computer-readable medium storing data that when executed by, or used to configure, an electronic circuit causes the electronic circuit, or one or more other electronic circuits under the control of the electronic circuit: to source an optical beam into an end of an optical fiber that extends through an optical-fiber path of a respective first end cap of each at least one mandrel, that is wound about a respective outer conduit of each of the at least one mandrel, and that extends through an output-fiber path of a respective second end cap of each of the at least one mandrel fiber; to receive a redirected optical beam from the end of the optical fiber; and to detect an acoustic signal incident on at least one of the at least one mandrel in response to the redirected optical beam.

Example 95 includes a computer-readable medium storing data that when executed by, or used to configure, an electronic circuit causes the electronic circuit, or one or more other electronic circuits under the control of the electronic circuit: to direct a source optical signal into an end of an optical-fiber assembly that includes an optical fiber having at least one section each wrapped multiple turns around a respective one of at least one mandrel and each including respective mandrel zones; to receive, from the end of the optical-fiber assembly, a return optical signal; to select a first mandrel zone of one of the at least one section of the optical fiber in response to a first component of the return optical signal redirected by the first mandrel zone; and to determine that an acoustic signal is incident on the one of the at least one mandrel around which the one of the at least one section of the optical fiber is wrapped in response to the first component of the return optical signal.

The invention claimed is:

1. A system, comprising:
a light source configured to generate a source optical signal;
an optical assembly configured
to direct the source optical signal into an end of an optical-fiber assembly that includes an optical fiber having at least one section each wrapped multiple turns around a respective one of at least one mandrel and each including respective mandrel zones, and
to receive, from the end of the optical-fiber assembly, a return optical signal; and
an electronic circuit configured
to select a first mandrel zone of one of the at least one section of the optical fiber in response to a first component of the return optical signal redirected by the first mandrel zone, and
to detect an acoustic signal incident on the one of the at least one mandrel around which the one of the at least one section of the optical fiber is wound in response to the first component of the return optical signal.

2. The system of claim 1 wherein the electronic circuit is further configured to select the first mandrel zone in response to the first component of the return optical signal having a characteristic that is closer to a target than at least one other component of the return optical signal each redirected by a respective other mandrel zone of the one of the at least one section of the optical fiber.

3. The system of claim 1 wherein the electronic circuit is further configured to select the first mandrel zone in response to the first component of the return optical signal having a lower noise component than at least one other component of the return optical signal each redirected by a respective other mandrel zone of the one of the at least one section of the optical fiber.

4. The system of claim 1 wherein the electronic circuit is further configured to select the first mandrel zone in response to the first component of the return optical signal having a higher optical power than at least one other component of the return optical signal each redirected by a respective other mandrel zone of the one of the at least one section of the optical fiber.

5. The system of claim 1 wherein the electronic circuit is further configured:
- to select a second mandrel zone of the one of the at least one section of the optical fiber in response to a second component of the return optical signal redirected by the second mandrel zone, and
- to detect the acoustic signal in response to the second component of the return optical signal.

6. The system of claim 1 wherein:
the first mandrel zone is located along a half of the one of the at least one mandrel in a lengthwise dimension; and
the electronic circuit is further configured:
- to select a second mandrel zone of the one of the at least one section of the optical fiber in response to a second component of the return optical signal redirected by the second mandrel zone, the second mandrel zone is located along another half of the one of the at least one mandrel in the lengthwise dimension, and
- to determine that the acoustic signal is incident on the one of the at least one mandrel in response to the first and second components of the return optical signal.

7. The system of claim 1 wherein:
the first mandrel zone is located along a half of the one of the at least one mandrel in a lengthwise dimension; and
the electronic circuit is further configured:
- to select a second mandrel zone of the one of the at least one section of the optical fiber in response to a second component of the return optical signal redirected by the second mandrel zone, the second mandrel zone is located along another half of the one of the at least one mandrel in the lengthwise dimension,
- to determine respective first and second values of a characteristic of the first and second components of the return optical signal, and
- to determine that the acoustic signal is incident on the one of the at least one mandrel in response to a combination of the first and second values.

8. The system of claim 1 wherein:
the first mandrel zone is located along a half of the one of the at least one mandrel in a lengthwise dimension; and
the electronic circuit is further configured:
- to select a second mandrel zone of the one of the at least one section of the optical fiber in response to a second component of the return optical signal redirected by the second mandrel zone, the second mandrel zone is located along another half of the one of the at least one mandrel in the lengthwise dimension,
- to determine respective first and second phases of the first and second components of the return optical signal,
- to determine that the acoustic signal is incident on the one of the at least one mandrel in response to a difference between the first and second phases.

9. The system of claim 1 wherein:
the first mandrel zone is located along a half of the one of the at least one mandrel in a lengthwise dimension; and
the electronic circuit is further configured:
- to select the first mandrel zone in response to the first component of the return optical signal having a lower noise component than at least one other component of the return optical signal each redirected by a respective other mandrel zone of the one of the at least one section of the optical fiber located along the half of the one of the at least one mandrel,
- to select a second mandrel zone of the one of the at least one section of the optical fiber located along another half of the one of the at least one mandrel in the lengthwise dimension in response to a second component of the return optical signal redirected by the second mandrel zone having a lower noise component than at least one other component of the return optical signal each redirected by a respective other mandrel zone of the one of the at least one section of the optical fiber located along the other half of the one of the at least one mandrel,
- to determine respective first and second phases of the first and second components of the return optical signal, and
- to determine that the acoustic signal is incident on the one of the at least one mandrel in response to a difference between the first and second phases.

10. The system of claim 1 wherein:
the first mandrel zone is located along a half of the one of the at least one mandrel in a lengthwise dimension; and
the electronic circuit is further configured:
- to select the first mandrel zone in response to the first component of the return optical signal having a higher optical power than at least one other component of the return optical signal each redirected by a respective other mandrel zone of the one of the at least one section of the optical fiber located along the half of the one of the at least one mandrel,
- to select a second mandrel zone of the one of the at least one section of the optical fiber located along another half of the one of the at least one mandrel in the lengthwise dimension in response to a second component of the return optical signal redirected by the second mandrel zone having a higher optical power than at least one other component of the return optical signal each redirected by a respective other mandrel zone of the one of the at least one section of the optical fiber located along the other half of the one of the at least one mandrel,
- to determine respective first and second phases of the first and second components of the return optical signal, and
- to determine that the acoustic signal is incident on the one of the at least one mandrel in response to a difference between the first and second phases.

11. The system of claim 1 wherein:
the first mandrel zone is located along an end third of the one of the at least one mandrel in a lengthwise dimension; and
the electronic circuit is further configured:
- to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel,
to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel,
to determine respective phases of the first, second, and third phases of the first, second, and third components of the return optical signal, and
to determine that the acoustic signal is incident on the one of the at least one mandrel in response to a combination of the first, second, and third phases.

12. The system of claim 1 wherein:
the first mandrel zone is located along an end third of the one of the at least one mandrel in a lengthwise dimension; and
the electronic circuit is further configured:
to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel,
to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel,
to determine respective phases of the first, second, and third phases of the first, second, and third components of the return optical signal, and
to determine that the acoustic signal is incident on the one of the at least one mandrel in response to a difference between a sum of the first and second phases and a sum of the third phases.

13. The system of claim 1 wherein:
the first mandrel zone is located along an end third of the one of the at least one mandrel in a lengthwise dimension; and
the electronic circuit is further configured:
to select the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel,
to select third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel,
to determine respective phases of the first, second, and third phases of the first, second, and third components of the return optical signal, and
to determine that the acoustic signal is incident on the one of the at least one mandrel in response to a difference between an average of the first and second phases and an average of the third phases.

14. The system of claim 1 wherein:
the first mandrel zone is located along an end third of the one of the at least one mandrel in a lengthwise dimension; and
the electronic circuit is further configured:
to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel,
to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel,
to determine respective phases of the first, second, and third phases of the first, second, and third components of the return optical signal, and
to determine that the acoustic signal is incident on the one of the at least one mandrel in response to a combination of the first, second, and third phases.

15. The system of claim 1 wherein:
the first mandrel zone is located along an end third of the one of the at least one mandrel in a lengthwise dimension; and
the electronic circuit is further configured:
to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between a sum of the first and second phases and a sum of the third phases.

16. The system of claim 1 wherein:
the first mandrel zone is located along an end third of the one of the at least one mandrel in a lengthwise dimension; and
the electronic circuit is further configured:
to select the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel, to select third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel, to determine respective phases of the first, second, and third phases of the first, second, and third components of the return optical signal, and to determine that the acoustic signal is incident on the one of the at least one mandrel in response to a difference between an average of the first and second phases and an average of the third phases.

17. The system of claim 1, further comprising the optical-fiber assembly.

18. A method, comprising:
directing a source optical signal into an end of an optical-fiber assembly that includes an optical fiber having at least one section each wrapped multiple turns around a respective one of at least one mandrel and each including respective mandrel zones;

receiving, from the end of the optical-fiber assembly, a return optical signal;

selecting a first mandrel zone of one of the at least one section of the optical fiber in response to a first component of the return optical signal redirected by the first mandrel zone; and determining that an acoustic signal is incident on the one of the at least one mandrel around which the one of the at least one section of the optical fiber is wrapped in response to the first component of the return optical signal.

19. The method of claim 18, further comprising determining a frequency of the acoustic signal in response to the first component of the return optical signal.

20. The method of claim 18, further comprising determining a strength of the acoustic signal in response to the first component of the return optical signal.

21. The method of claim 18, further comprising determining an amplitude of the acoustic signal in response to the first component of the return optical signal.

22. The method of claim 18, further comprising determining a power of the acoustic signal in response to the first component of the return optical signal.

23. The method of claim 18, further comprising:
selecting a second mandrel zone of the one of the at least one section of the optical fiber in response to a second component of the return optical signal redirected by the second mandrel zone; and determining that the acoustic signal is incident on the one of the at least one mandrel in response to the second component of the return optical signal.

24. The method of claim 18, further comprising:
wherein the first mandrel zone is located along an end third of the one of the at least one mandrel in a lengthwise dimension;

selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel;

selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel;

determining respective phases of the first, second, and third phases of the first, second, and third components of the return optical signal; and determining that the acoustic signal is incident on the one of the at least one mandrel in response to a combination of the first, second, and third phases.

25. The method of claim 18, further comprising:
wherein the first mandrel zone is located along an end third of the one of the at least one mandrel in a lengthwise dimension;
selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel;
selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel;
determining respective phases of the first, second, and third phases of the first, second, and third components of the return optical signal; and
determining that the acoustic signal is incident on the one of the at least one mandrel in response to a difference between a sum of the first and second phases and a sum of the third phases.

26. The method of claim 18, further comprising:
wherein the first mandrel zone is located along an end third of the one of the at least one mandrel in a lengthwise dimension;
selecting the first mandrel zone and at least one second mandrel zone located along the end third of the one of the at least one mandrel in response to the first component of the return optical signal and at least one second component of the return optical signal respectively redirected by the at least one second mandrel zone having lower noise components than at least one other component of the return optical signal each redirected by a respective other mandrel zone of the one of the at least one section of the optical fiber located along the end third of the one of the at least one mandrel;
selecting third mandrel zones of the one of the at least one section of the optical fiber located along another end third of the one of the at least one mandrel in the lengthwise dimension in response to third components of the return optical signal redirected by the third mandrel zones having lower noise components than at least one other component of the return optical signal each redirected by a respective other mandrel zone of the one of the at least one section of the optical fiber located along the other end third of the one of the at least one mandrel;
determining respective phases of the first, second, and third phases of the first, second, and third components of the return optical signal; and
determining that the acoustic signal is incident on the one of the at least one mandrel in response to a difference between an average of the first and second phases and an average of the third phases.

27. The method of claim 18, further comprising:
wherein the first mandrel zone is located along an end third of the one of the at least one mandrel in a lengthwise dimension;
selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel;
selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel;
determining respective phases of the first, second, and third phases of the first, second, and third components of the return optical signal;
determining that the acoustic signal is incident on the one of the at least one mandrel in response to a combination of the first, second, and third phases.

28. The method of claim 18, further comprising:
wherein the first mandrel zone is located along an end third of the one of the at least one mandrel in a lengthwise dimension;
selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel;
selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel;
determining respective phases of the first, second, and third phases of the first, second, and third components of the return optical signal; and determining that the acoustic signal is incident on the one of the at least one mandrel in response to a difference between a sum of the first and second phases and a sum of the third phases.

29. The method of claim 18, further comprising:

wherein the first mandrel zone is located along an end third of the one of the at least one mandrel in a lengthwise dimension;

selecting the first mandrel zone and at least one second mandrel zone located along the end third of the one of the at least one mandrel in response to the first component of the return optical signal and at least one second component of the return optical signal respectively redirected by the at least one second mandrel zone having higher optical powers than at least one other component of the return optical signal each redirected by a respective other mandrel zone of the one of the at least one section of the optical fiber located along the end third of the one of the at least one mandrel;

selecting third mandrel zones of the one of the at least one section of the optical fiber located along another end third of the one of the at least one mandrel in the lengthwise dimension in response to third components of the return optical signal redirected by the third mandrel zones having higher optical powers than at least one other component of the return optical signal each redirected by a respective other mandrel zone of the one of the at least one section of the optical fiber located along the other end third of the one of the at least one mandrel;

determining respective phases of the first, second, and third phases of the first, second, and third components of the return optical signal; and determining that the acoustic signal is incident on the one of the at least one mandrel in response to a difference between an average of the first and second phases and an average of the third phases.

30. A non-transitory computer-readable medium storing data that when executed by, or used to configure, an electronic circuit causes the electronic circuit, or one or more other electronic circuits under the control of the electronic circuit:

to direct a source optical signal into an end of an optical-fiber assembly that includes an optical fiber having at least one section each wrapped multiple turns around a respective one of at least one mandrel and each including respective mandrel zones;

to receive, from the end of the optical-fiber assembly, a return optical signal;

to select a first mandrel zone of one of the at least one section of the optical fiber in response to a first component of the return optical signal redirected by the first mandrel zone; and to determine that an acoustic signal is incident on the one of the at least one mandrel around which the one of the at least one section of the optical fiber is wrapped in response to the first component of the return optical signal.

31. The system of claim 1 wherein:

the optical assembly is further configured
to modulate the source optical signal with a correlation code, and
to direct the source optical signal by directing the modulated source optical signal into the end of the optical-fiber assembly; and the electronic circuit is further configured to generate the first component of the return optical signal by demodulating the return optical signal with the correlation code.

32. The method of claim 18, further comprising:

modulating the source optical signal in response to a correlation code;

wherein directing the source optical signal includes directing the modulated source optical signal into the end of the optical-fiber assembly; and demodulating the return optical signal in response to the correlation code to generate the first component of the return optical signal.

\* \* \* \* \*

UNITED STATES PATENT AND TRADEMARK OFFICE
CERTIFICATE OF CORRECTION

PATENT NO. : 11,115,757 B2
APPLICATION NO. : 16/563578
DATED : September 7, 2021
INVENTOR(S) : Doll et al.

Page 1 of 2

It is certified that error appears in the above-identified patent and that said Letters Patent is hereby corrected as shown below:

On the Title Page

Item (72) Inventors, Line 3: "James Alexander Philip" should read --James Alexander Philp--

Item (56) Other Publications, Line 1: "pp. 13" should read --Page(s) 1-3--

On Page 2, Item (56) Foreign Patent Documents, Line 2: "WO 2016033192 A1 6/2016" should read --WO 2016033192 A1 03/2016--

In the Specification

At Column 4, Line 31: "type heterodyner" should read --type heterodyne--

At Column 15, Line 28: "elbow join" should read --elbow joint--

At Column 16, Line 1: "portion 2002" should read --portion 2008--

At Column 30, Line 34: "$\vec{E}(E_{px}, E_{py}, \Phi_{px}, \Phi_{py}, \omega_p, t) = \begin{bmatrix} E_{px}(t)\cos(\omega_p t + \Phi_{px}) \\ E_{py}(t)\cos(\omega_p t + \Phi_{py}) \end{bmatrix}$" should read --$\vec{E}_p(E_{px}, E_{py}, \Phi_{px}, \Phi_{py}, \omega_p, t) = \begin{bmatrix} E_{px}(t)\cos(\omega_p t + \Phi_{px}) \\ E_{py}(t)\cos(\omega_p t + \Phi_{py}) \end{bmatrix}$--

At Column 32, Lines 62-64: "$v_{LS}(t) = 2AR_L \Re \sqrt{P_L(t)P_S(t)}(\cos(\Delta\theta)\cos(\Delta\psi)\cos(\Delta\phi)+\sin(\Delta\theta)\sin(2\psi)\sin(\Delta\phi))$" should read --$v_{LS}(t) = 2AR_L \Re \sqrt{P_L(t)P_S(t)}(\cos(\Delta\theta)\cos(\Delta\psi)\cos(\Delta\phi) + \sin(\Delta\theta)\sin(2\overline{\psi})\sin(\Delta\phi))$--

Signed and Sealed this
Twenty-fourth Day of May, 2022

*Katherine Kelly Vidal*

Katherine Kelly Vidal
*Director of the United States Patent and Trademark Office*

CERTIFICATE OF CORRECTION (continued)
U.S. Pat. No. 11,115,757 B2

At Column 37, Lines 1-8: "
$$B_1(t, L_1) = \langle B(t, L_1)\cos(\Delta\omega t)\rangle$$
$$B_1(t, L_1) \approx V_E r_{L_1} \cos\left(\Phi_{L_1} + \frac{2\mu_L \omega_S}{c_L}\right)$$
$$B_Q(t, L_1) = \langle B(t, L_1)\sin(\Delta\omega t)\rangle$$
$$B_Q(t, L_1) \approx -V_E r_1 \sin\left(\Phi_{L_1} + \frac{2\mu_L \omega_S}{c_L}\right)\int_0^{L_1} p(t, x)dx = V_1\cos(\phi_1)$$
" should read $$B_1(t, L_1) = \langle B(t, L_1)\cos(\Delta\omega t)\rangle$$
$$B_1(t, L_1) \approx V_E r_{L_1} \cos\left(\Phi_{L_1} + \frac{2\mu_L \omega_S}{c_L}\right)\int_0^{L_1} p(t, x)dx = V_1\cos(\phi_1)$$
$$B_Q(t, L_1) = \langle B(t, L_1)\sin(\Delta\omega t)\rangle$$
$$B_Q(t, L_1) \approx -V_E r_1 \sin\left(\Phi_{L_1} + \frac{2\mu_L \omega_S}{c_L}\int_0^{L_1} p(t, x)dx\right) = -V_1\sin(\Phi_1)$$
--

At Column 38, Lines 5-8: "
$$\Phi_k - \Phi_j - \Delta\Phi_{kj} = \left(\Phi_{L_k} + \frac{2\mu_L\omega_S}{c_L}\int_0^{L_k} p(t, x)dx\right) - \left(\Phi_{L_1} + \frac{2\mu_L\omega_S}{c_L}\int_{c_L}^{L_j} p(t, x)dx\right)$$
" should read $$\Phi_k - \Phi_j - \Delta\Phi_{kj} = \left(\Phi_{L_k} + \frac{2\mu_L\omega_S}{c_L}\int_0^{L_k} p(t, x)dx\right) - \left(\Phi_{L_1} + \frac{2\mu_L\omega_S}{c_L}\int_0^{L_j} p(t, x)dx\right)$$
--

At Column 43, Line 55: "signal." should read --signal).--

At Column 45, Lines 12-13: "$O_1, O_2, \ldots, \ldots, O_n$" should read --$O_1, O_2, \ldots, O_n$--

At Column 53, Line 6: "$U_m(t) = V_m^2 \frac{\partial \Phi}{\partial t}$" should read --$U_m(t) = V_m^2 \frac{\partial \Phi_m}{\partial t}$--